(12) United States Patent
Kloepfer et al.

(10) Patent No.: US 12,539,923 B2
(45) Date of Patent: Feb. 3, 2026

(54) HALF-ROUND CARGO CONTAINER AND TRAILER

(71) Applicant: Titan Trailers Inc., Delhi (CA)

(72) Inventors: Christopher Howard Kloepfer, Tillsonburg (CA); Michael Kloepfer, Delhi (CA); Andrew Joseph Maertens, Delhi (CA)

(73) Assignee: Titan Trailers Inc., Delhi (CA)

( * ) Notice: Subject to any disclaimer, the term of this patent is extended or adjusted under 35 U.S.C. 154(b) by 825 days.

(21) Appl. No.: 17/790,465

(22) PCT Filed: Dec. 30, 2021

(86) PCT No.: PCT/CA2021/051900
§ 371 (c)(1),
(2) Date: Jun. 30, 2022

(87) PCT Pub. No.: WO2022/147612
PCT Pub. Date: Jul. 14, 2022

(65) Prior Publication Data
US 2024/0182085 A1   Jun. 6, 2024

Related U.S. Application Data

(60) Provisional application No. 63/133,994, filed on Jan. 5, 2021.

(51) Int. Cl.
*B62D 33/04*  (2006.01)
*B61D 17/04*  (2006.01)
(Continued)

(52) U.S. Cl.
CPC ......... *B62D 33/044* (2013.01); *B61D 17/041* (2013.01); *B61D 17/08* (2013.01); *B62D 53/062* (2013.01); *B62D 63/06* (2013.01)

(58) Field of Classification Search
CPC ...... B65D 88/127; B65D 90/08; B65D 88/06; B62D 53/06; B62D 33/044; B62D 63/06; B61D 17/041; B61D 17/08
See application file for complete search history.

(56) References Cited

U.S. PATENT DOCUMENTS 4,356,615 A * 11/1982 Dearman ........... B23K 37/0533
29/234
4,492,015 A *  1/1985 Dearman ............. B23K 9/0286
269/43

(Continued)

FOREIGN PATENT DOCUMENTS

CA        2006581 A1    6/1990
DE      19808123 A1    9/1999
(Continued)

OTHER PUBLICATIONS

PCT International Search Report and Written Opinion dated Mar. 14, 2022, issued in connection with Int'l App. No. PCT/CA2021/051900 (11 pages).

(Continued)

*Primary Examiner* — Cheng Lin
(74) *Attorney, Agent, or Firm* — McCarter & English, LLP

(57) ABSTRACT

A half-round cargo container comprises a plurality of curved panels and has a longitudinal axis. Each curved panel has a cross-sectional profile in a plane perpendicular to the longitudinal axis, wherein the respective cross-sectional profiles of the curved panels have curved shapes with a common curvature. Adjacent pairs of the curved panels are joined at respective abutting longitudinal edges parallel to the longitudinal axis to form a semi-cylindrical shell. The half-round cargo container has a top opening.

17 Claims, 36 Drawing Sheets

(51) Int. Cl.
    *B61D 17/08*     (2006.01)
    *B62D 53/06*     (2006.01)
    *B62D 63/06*     (2006.01)

(56) References Cited

U.S. PATENT DOCUMENTS

| | | | | |
|---|---|---|---|---|
| 4,504,047 | A * | 3/1985 | Jantzen | B23K 9/0284 |
| | | | | 269/287 |
| 5,482,356 | A * | 1/1996 | Goodson, Jr. | B62D 21/20 |
| | | | | 298/17 R |
| 6,688,673 | B2 * | 2/2004 | Kloepfer | B62D 33/046 |
| | | | | 296/184.1 |
| 8,550,542 | B1 * | 10/2013 | Booher | B62D 33/02 |
| | | | | 296/183.1 |
| 10,792,719 | B2 * | 10/2020 | Maiorana | B62D 33/023 |
| 11,034,278 | B2 * | 6/2021 | Kloepfer | B21C 37/08 |
| 11,780,359 | B2 * | 10/2023 | Kloepfer | B62D 53/06 |
| | | | | 296/182.1 |
| 11,840,398 | B2 * | 12/2023 | Kloepfer | B62D 33/044 |

FOREIGN PATENT DOCUMENTS

| | | | |
|---|---|---|---|
| WO | 2018/112622 A1 | 6/2018 | |
| WO | 2019/056089 A1 | 3/2019 | |

OTHER PUBLICATIONS

Office Action dated Dec. 18, 2023, issued in connection with Canadian Patent Application No. 3,171,911 (3 pages).

* cited by examiner

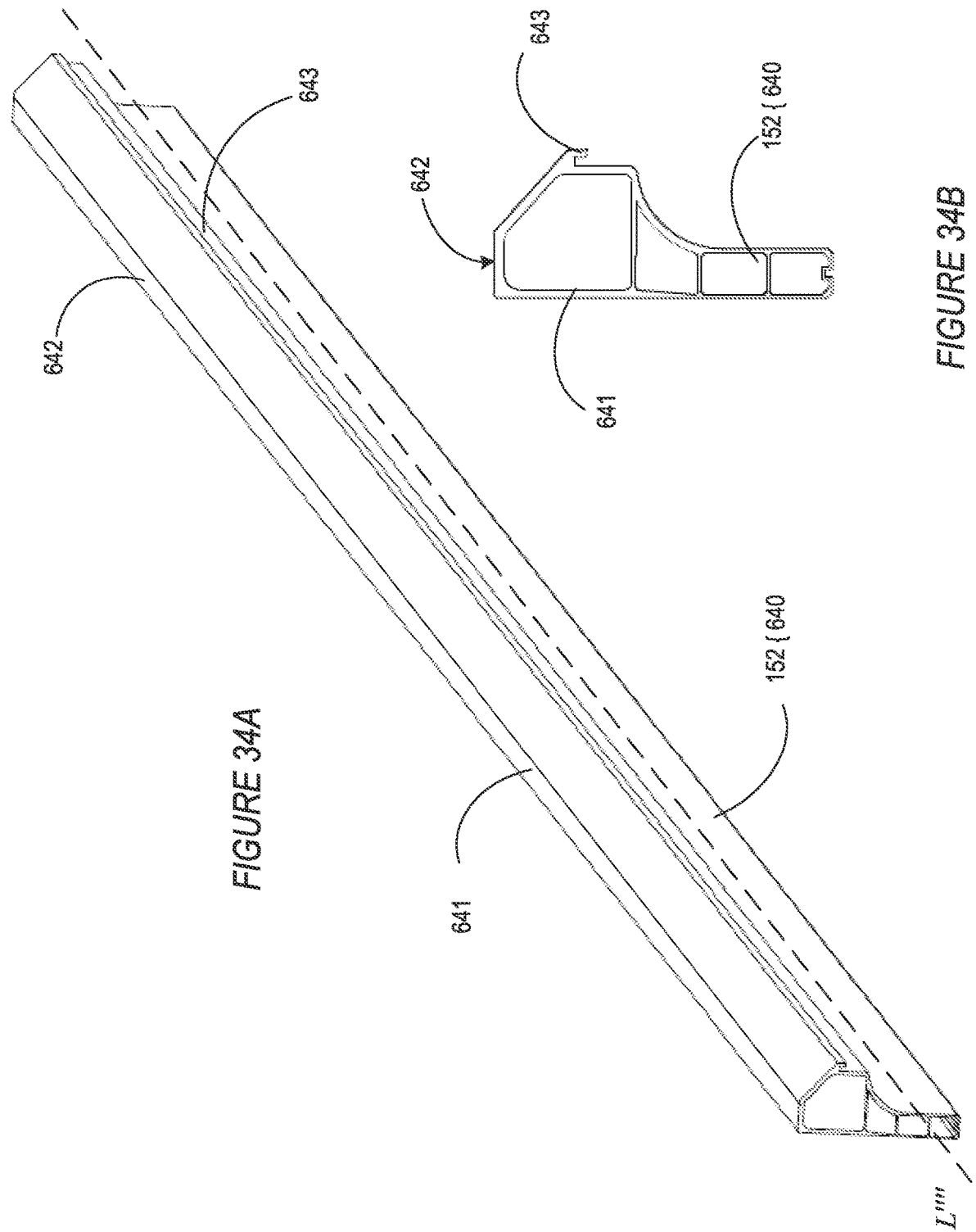

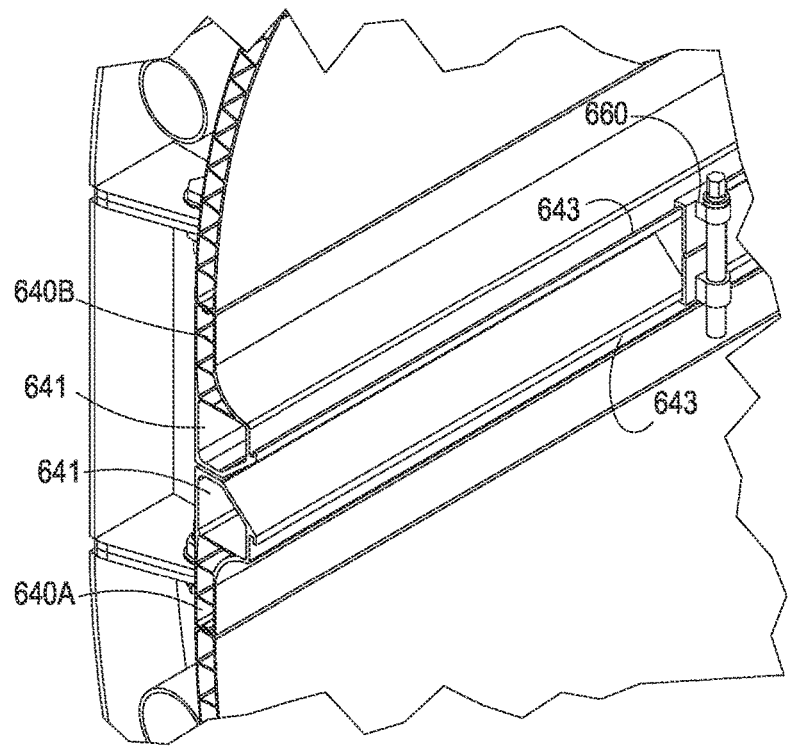
FIGURE 35A
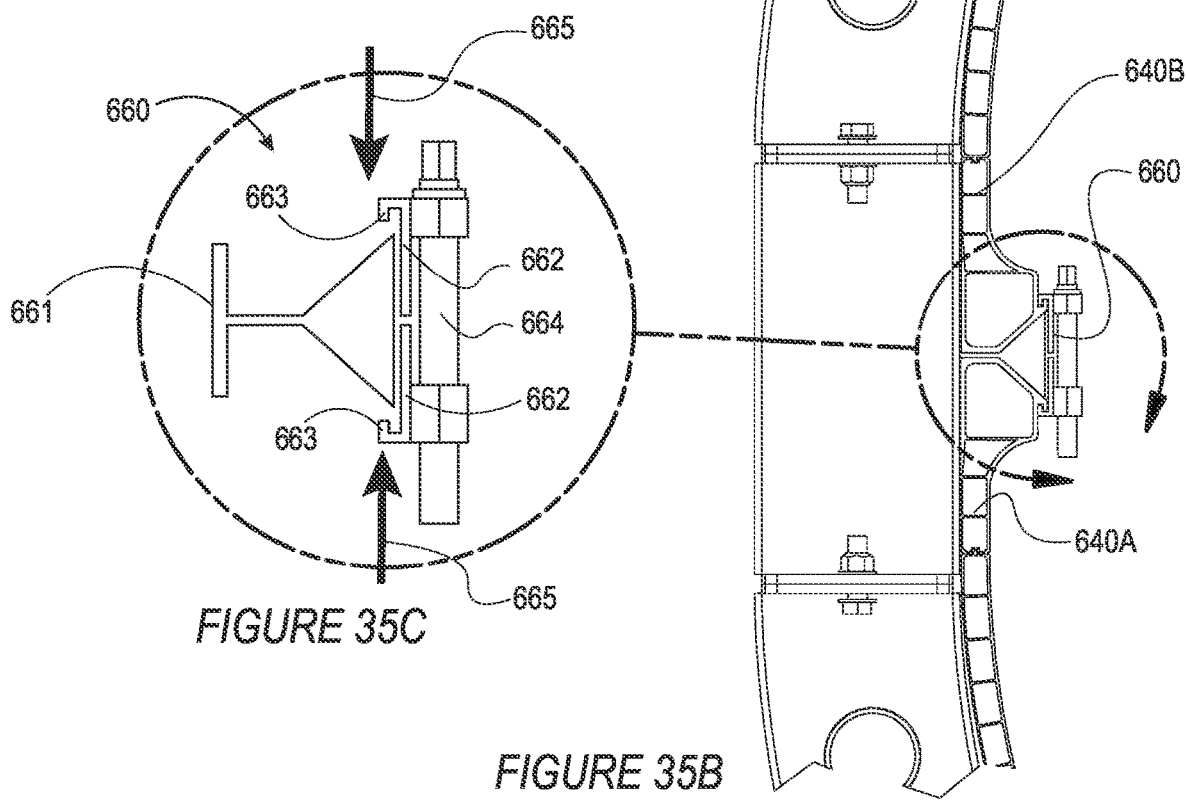
FIGURE 35C
FIGURE 35B

HALF-ROUND CARGO CONTAINER AND TRAILER

RELATED APPLICATIONS

The present application is a U.S. National Phase Application under 35 U.S.C. § 371 of International Application No. PCT/CA2021/051900 filed on Dec. 30, 2021, which claims the benefit of priority to U.S. Provisional Patent Application Ser. No. 63/133,994 filed on Jan. 5, 2021, the entire disclosures of which are expressly incorporated by reference herein.

FIELD

The present disclosure relates generally to cargo containers including cargo containers for tanker trucks, trailers, and railcars, and more particularly to half-round cargo containers such as containers for dump trucks, dump trailers, and dump railcars.

BACKGROUND

Half-round cargo containers, such as the containers for dump trucks, dump trailers, and dump railcars, are widely used to transport various materials such as dry bulk cargo on roads or rails. Whether incorporated in a truck where the container is mounted on a chassis and wheeled suspension commonly with the truck, or a trailer where the container is mounted on its own chassis and wheeled suspension which is towed by a tractor, or a railroad car, the container is typically semi-cylindrical in shape and is mounted on and supported by a chassis and wheeled suspension. Other configurations are possible.

Half-round cargo containers have many advantages which explain their widespread use. Such cargo containers typically have a fully or at least partly open top which enables loading of cargo from above. Loading from above may be convenient when the cargo is bulk dry cargo, such as construction aggregate (for example, sand, gravel, crushed stone, slag, or recycled crushed concrete), agricultural bulk materials (for example, soil, compost, or mulch), bulk agricultural products (for example, grain, seeds, leaf crops, food crops, textile crops), or industrial or municipal waste. Such materials may be conveniently conveyed and loaded into a container from above by heavy self-powered equipment such as loaders (for example, backhoe loaders, crawler loaders, front-end loaders, tractor loaders, wheel loaders, track loaders, skid steer loaders), or excavators, or by stationary conveyancing infrastructure (for example, conveyor systems, elevators, or chutes).

Moreover, based on simple geometry, for any given volume a cylinder has a smaller surface area than a typical rectangular, box-shaped cargo container. As such, all other factors being equal, a cylindrical container can have both a higher ratio of cargo weight to container weight, and of cargo weight to container materials than a container of another shape. Moreover, cylindrical containers typically have a more aerodynamic shape. Both of these factors result in a lesser towing or carrying load, and thus lesser truck or tractor power requirements, and better fuel economy. The same advantages apply to half-round cargo containers when compared to typical rectangular, box-shaped cargo containers of similar outside dimensions.

Typically, such half-round cylindrical containers have a construction including a skin formed of a rigid and resilient plate material, usually metal, such as rolled sheet steel or aluminum, and a frame structure, such as semi-annular and longitudinal ribbed beam structure, to provide shape and strength, and to support the skin, which is affixed to the frame, sometimes by fasteners or welds. In other cases, a less sturdy and resilient material is used, such as fiberglass or reinforced plastic. In any event, the frame is typically mounted on and supported by the chassis of the truck, trailer, or railcar, and thus the weight of any load contained by the container is communicated to the chassis ultimately by this frame.

Sometimes the structural frame is disposed at least partly outside of the sheet metal skin, such that at least part of the structural frame is exposed to the outside. Doing so usually has the disadvantage of degrading the aerodynamics of the container resulting from wind resistance at the projecting portions. In order to avoid such disadvantages, the structural frame can be completely or mostly enveloped by the sheet metal skin. In some cases, doing so presents a different kind of disadvantage, including for example reduction of the useful volume of the container, or inclusion of obstructions within the container which may impede movement of its contents.

In addition, since the container skin is typically formed of sheet metal or other material which provides inadequate structural strength and stiffness to the container, the structural frame required in conventional containers requires at least some structure to provide support midway along the length of the container, in order to prevent the container sidewalls from buckling or bowing outwardly under load.

For example, in some cases, a transverse cross-member is provided at or near the top opening which bridges the two top edges of the container. Such a cross-member can function to reduce outward bowing of the container sidewalls at or near the midway portion of the container. The cross-member represents an obstacle, however, to the loading of the container with bulk material, and to the safe entry into the container of heavy equipment, such as a bucket of an excavator or front-end loader.

Alternatively, or additionally, some conventional containers have a structural cradle at or about midway along the length of the container, and which extends upwardly or either side of the container to or near the top edges of the opposite sides of the container. When the container sidewall is formed of a material such as sheet metal which does not possess sufficient structural strength to prevent bowing outwardly under load, it may be necessary for such a cradle to extend to the opposite top edges or very nearly to the top edges in order to prevent or reduce outward bowing of the upper portions of the sidewall skin.

In the case particularly of frameless dump trailers, when the container is formed of a sheet metal skin, it is typically required to provide a midway cradle which extends to the top edge or nearly so on either side of the container, in order to compensate for torsional flexure of the container during the dumping procedure. Specifically, conventional frameless dump trailers employ draft arms mounted on opposing sides of the container about midway along its length, to provide lateral stabilization as the container is lifted by the hoist at or near the front end of the container, and to cause the container rear end and the tractor to draw together relatively, where typically one of the container rear wheels and tractor is kept stationary. Any torsional flexure of the container during the dumping procedure under the stress of the hoisting action and the movement of the load can laterally destabilize the tractor-trailer combination, risking roll-over of the trailer. In order to reduce torsional flexure of the container formed with a sheet metal skin, a mid-way cradle which extends to the top edge or nearly so on both sides is conventionally provided, in order to provide structural rigidity to the container structure.

Both of the above-described measures—the provision of a mid-way cross-member, and the provision of a mid-way full cradle—may add weight and reduce aerodynamic efficiency, and may add material and operational costs, among other disadvantages.

Moreover, in connection with any type of cargo, it is desirable to achieve yet greater efficiencies and advantages from improved construction and use of half-round containers which reduce cost and provide new and enhanced uses.

There thus remains a need for improved constructions and uses of half-round cargo containers.

BRIEF DESCRIPTION OF THE DRAWINGS

Embodiments will now be described, by way of example only, with reference to the attached Figures.

FIGS. 34A & 34B respectively show perspective and end views of a longitudinally-extended flat extension panel with an integrated top rail.

FIG. 35A shows a partial perspective view of an assembled full-round shell with a clamping jig. FIG. 35B shows a corresponding end view, and FIG. 35C shows the clamping jig in isolation.

Figure 1:
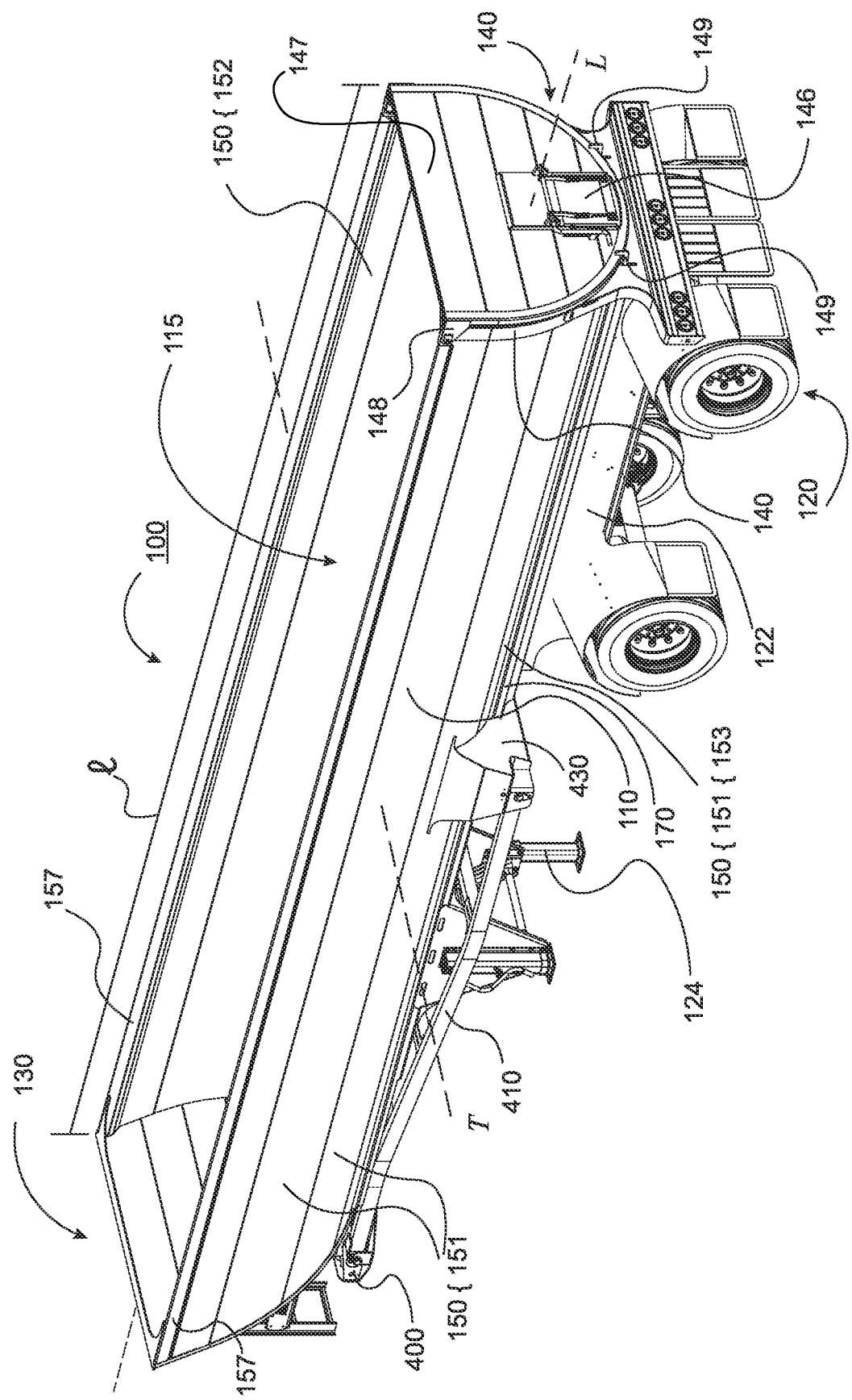
FIG. 1 shows a rear upper perspective view of a trailer having a half-round cargo container formed of longitudinally-extended panels.

Throughout the drawings, sometimes only one or fewer than all of the instances of an element visible in the view are designated by a lead line and reference character, for the sake only of simplicity and to avoid obfuscation. It will be understood, however, that in such cases, in accordance with the corresponding description, that all other instances are likewise designated and encompassed by the corresponding description.

In the drawings and this description, the use of a brace ('{' or '}') between reference characters designates a genus and species relationship, such that "A{B" indicates that 'B' is a species of a broader genus 'A'. A numerical reference character suffixed by a letter (e.g. "800A", "900B") designates a separate instance of the element designated by the numerical reference character (e.g. "800A", "800B" are each separate instances of the element designated by "800").

DESCRIPTION

A half-round cargo container is disclosed herein, as well as a dump truck, dump trailer, and dump railcar having the half-round cargo container. A method of manufacturing a half-round container and an apparatus for performing the method are also disclosed herein.

Figure 2:
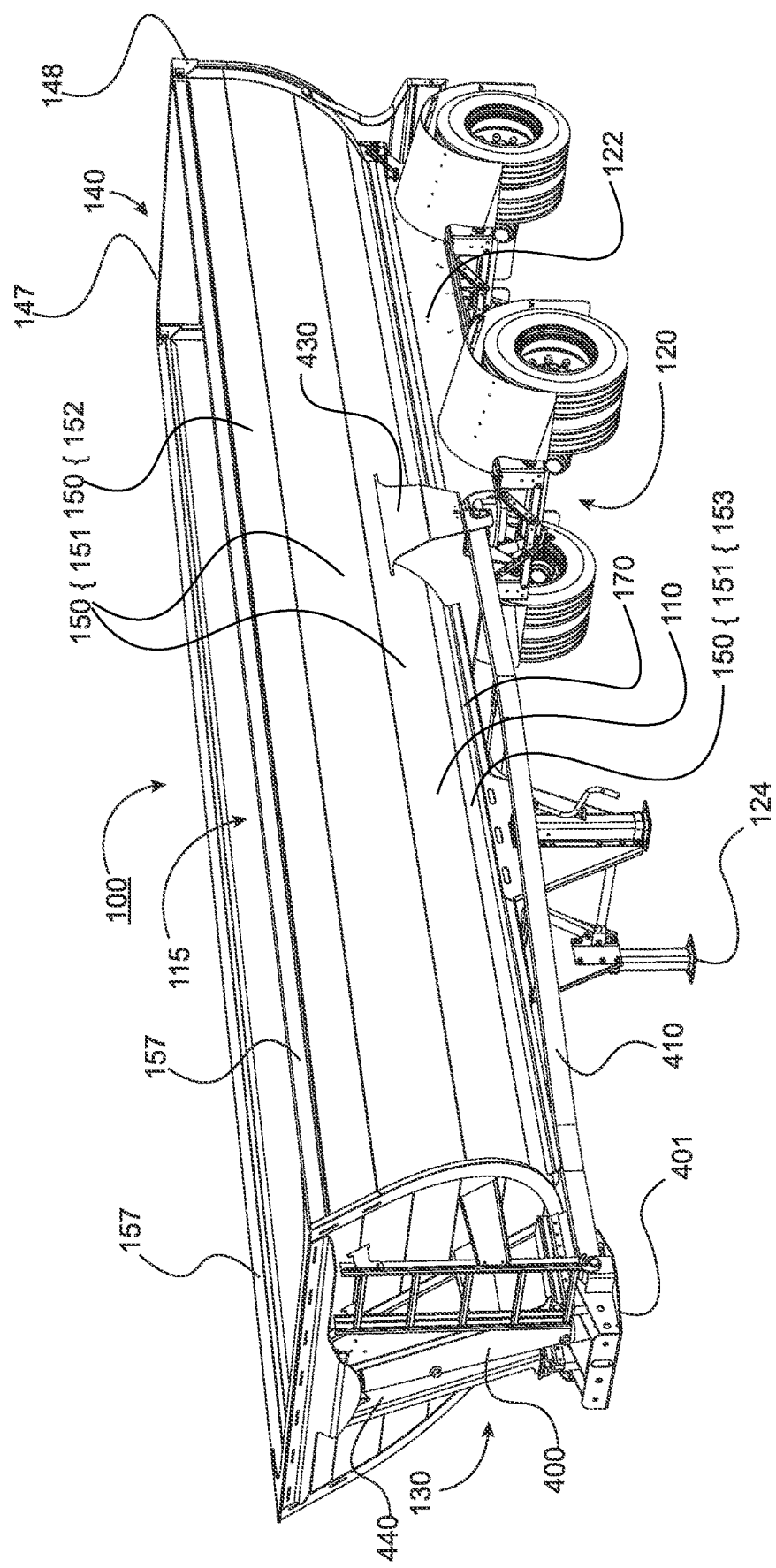
FIG. 2 shows a forward upper perspective view of the trailer of FIG. 1.
Figure 3:
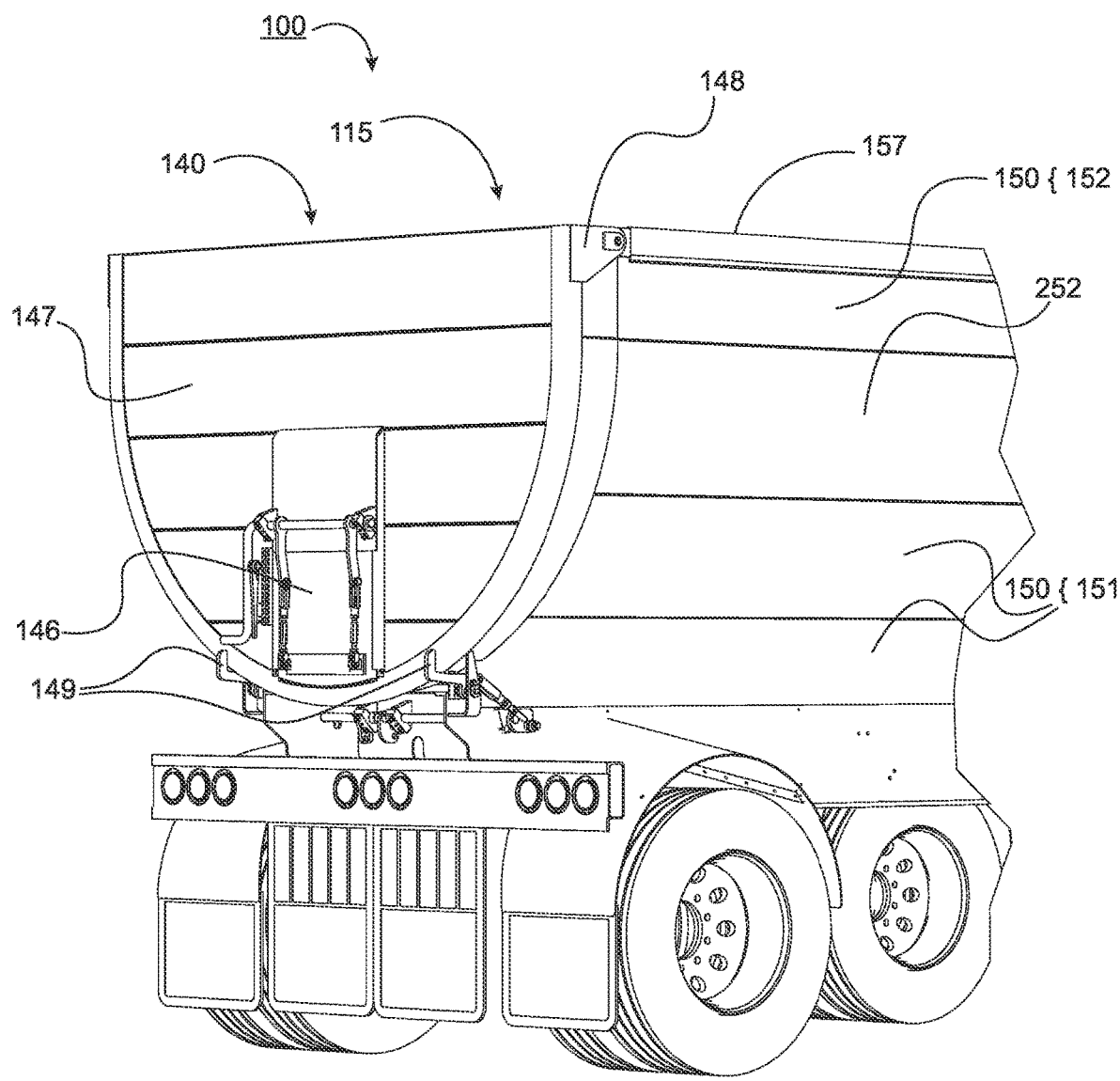
FIG. 3 shows a partial rear perspective view of the trailer of FIG. 1.
Figure 4:
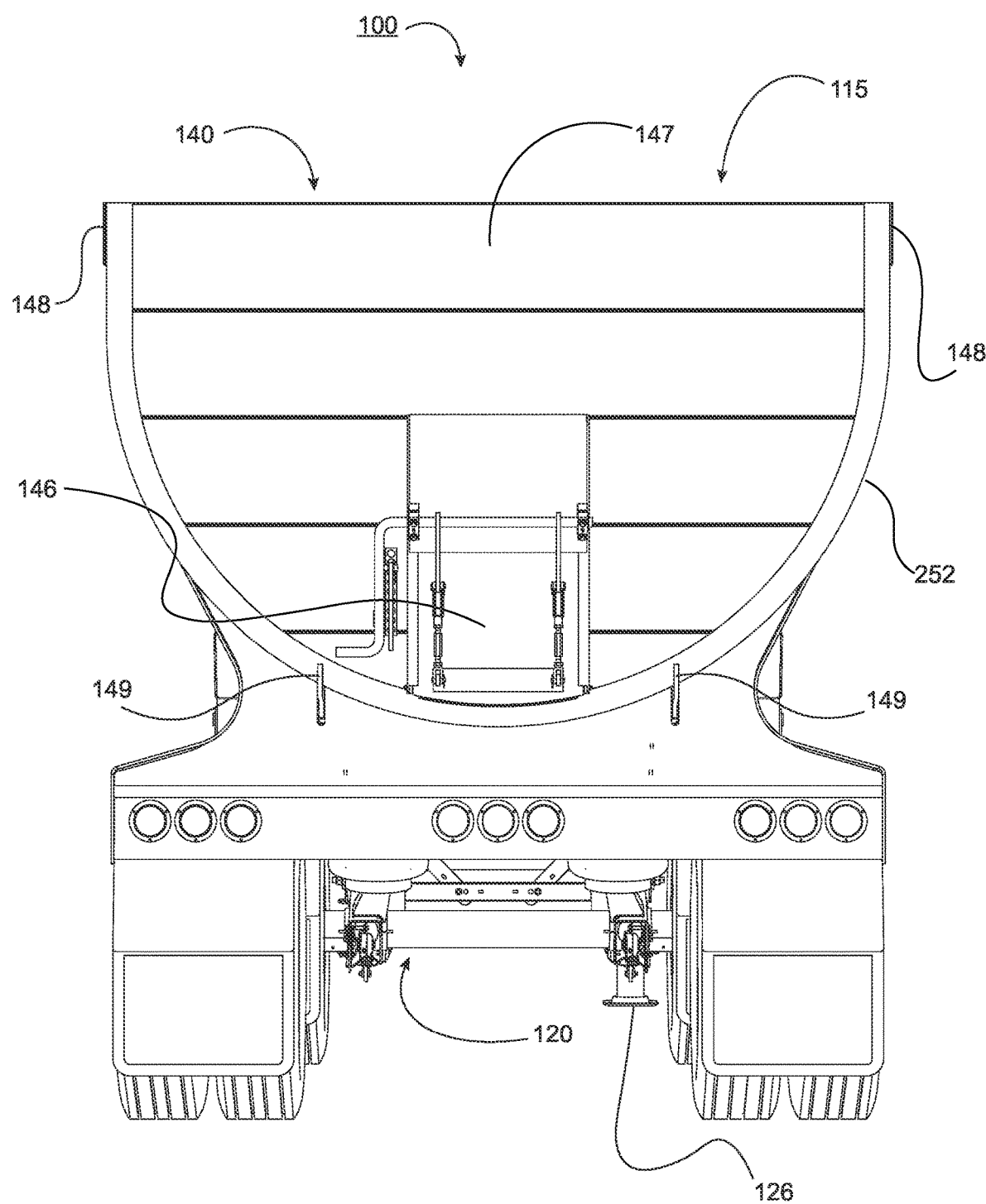
FIG. 4 shows a rear elevation view of the trailer of FIG. 1.
Figure 5:
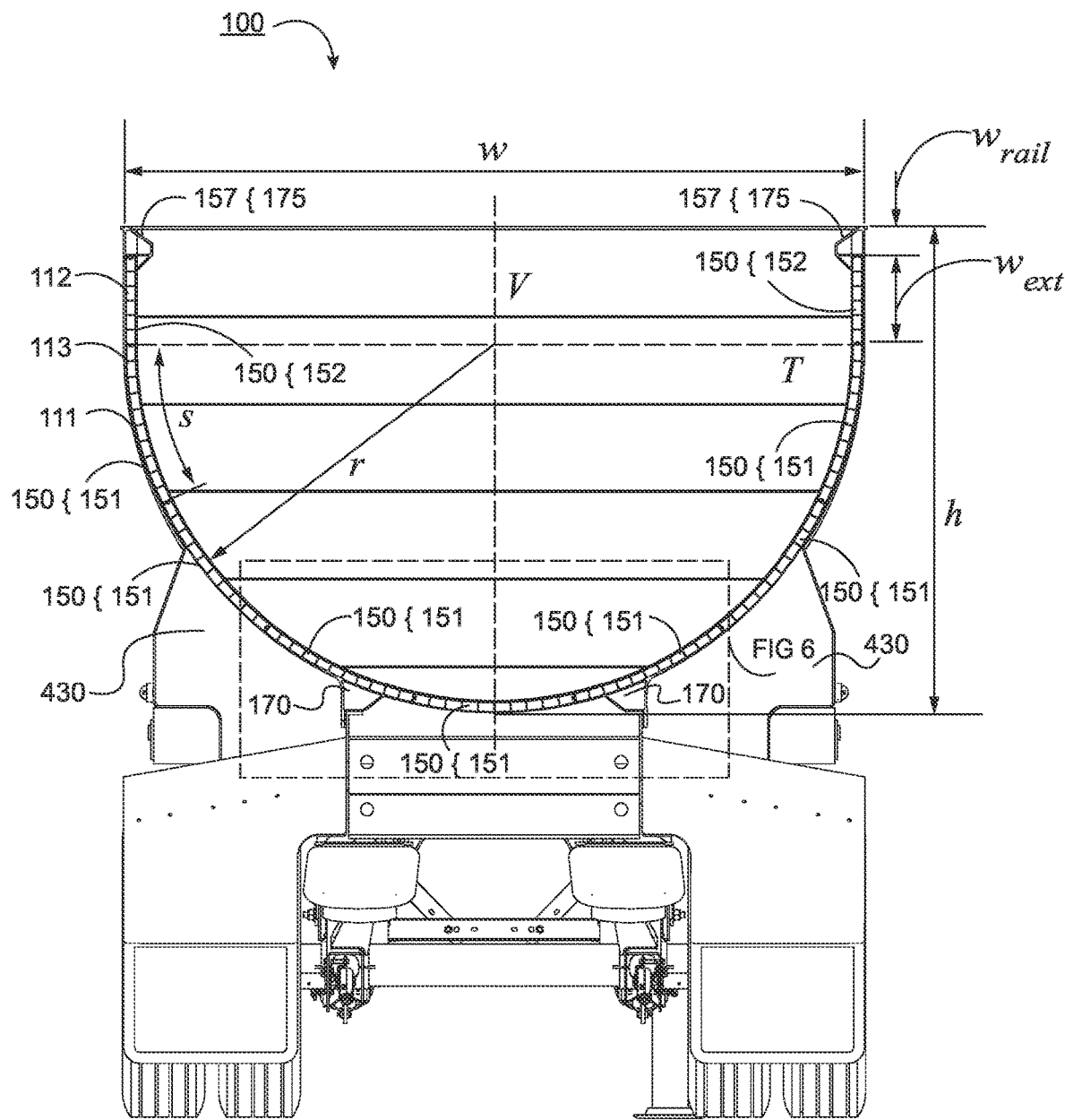
FIG. 5 shows a transverse cross-sectional view of the trailer of FIG. 1.

FIGS. 1 to 5 show a half-round cargo trailer 100. The trailer 100 has a half-round container 110 mounted on and supported by a wheeled suspension 120. The container 110 has a generally half-round shape, having a corresponding length & along a longitudinal axis L of the container (shown in FIG. 1). The container 110 has a top opening 115. The half-round shape of the container may be either semi-cylindrical or semi-obround. For example, and as shown in FIG. 5, the container 110 may have a generally semi-obround transverse cross-section characterized by a vertical height h along a vertical axis V orthogonal to the longitudinal axis L and a traverse width w along a transverse axis T orthogonal to both of the longitudinal axis L and vertical axis V. In particular, the container 110 may include a semi-obround shell 113 including a semi-cylindrical shell 111 and flat extension panels 112. The semi-cylindrical shell 111 may be characterized by a radius of r equal to one-half of the transverse width w. Alternatively, the container 110 may include the semi-cylindrical shell 111 without the rectangular extension panels 112, and thus have a generally semi-cylindrical shape. As shown in FIGS. 1 & 2, the container 110 has a front end 130 and a rear end 140 oppositely disposed along the longitudinal axis L of the container 110, and these may be configured in any desired manner, which may depend at least in part on an intended function of the trailer.

Figure 14:
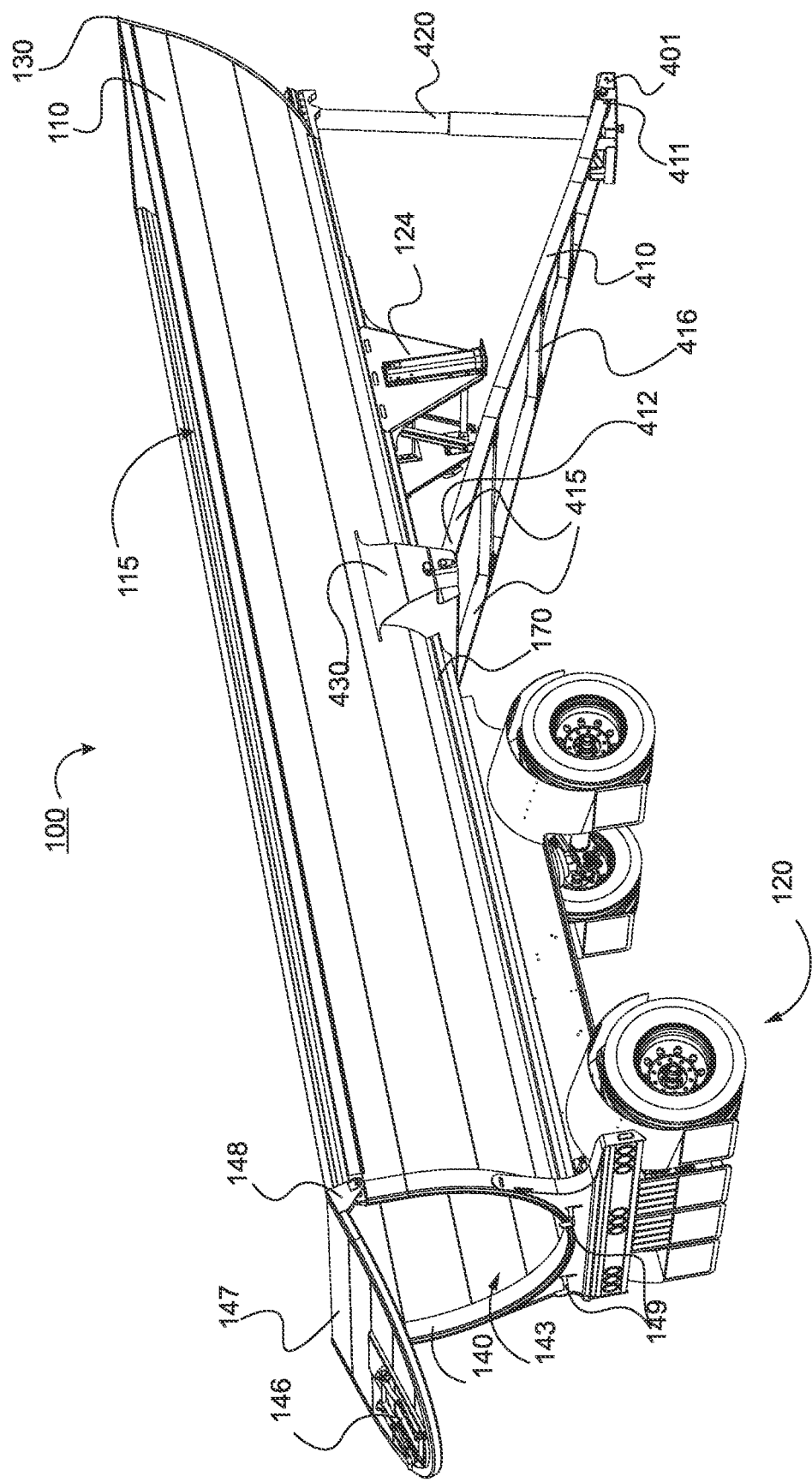
FIG. 14 shows a rear perspective view of the trailer of FIG. 1 in a dumping position.
Figure 15:
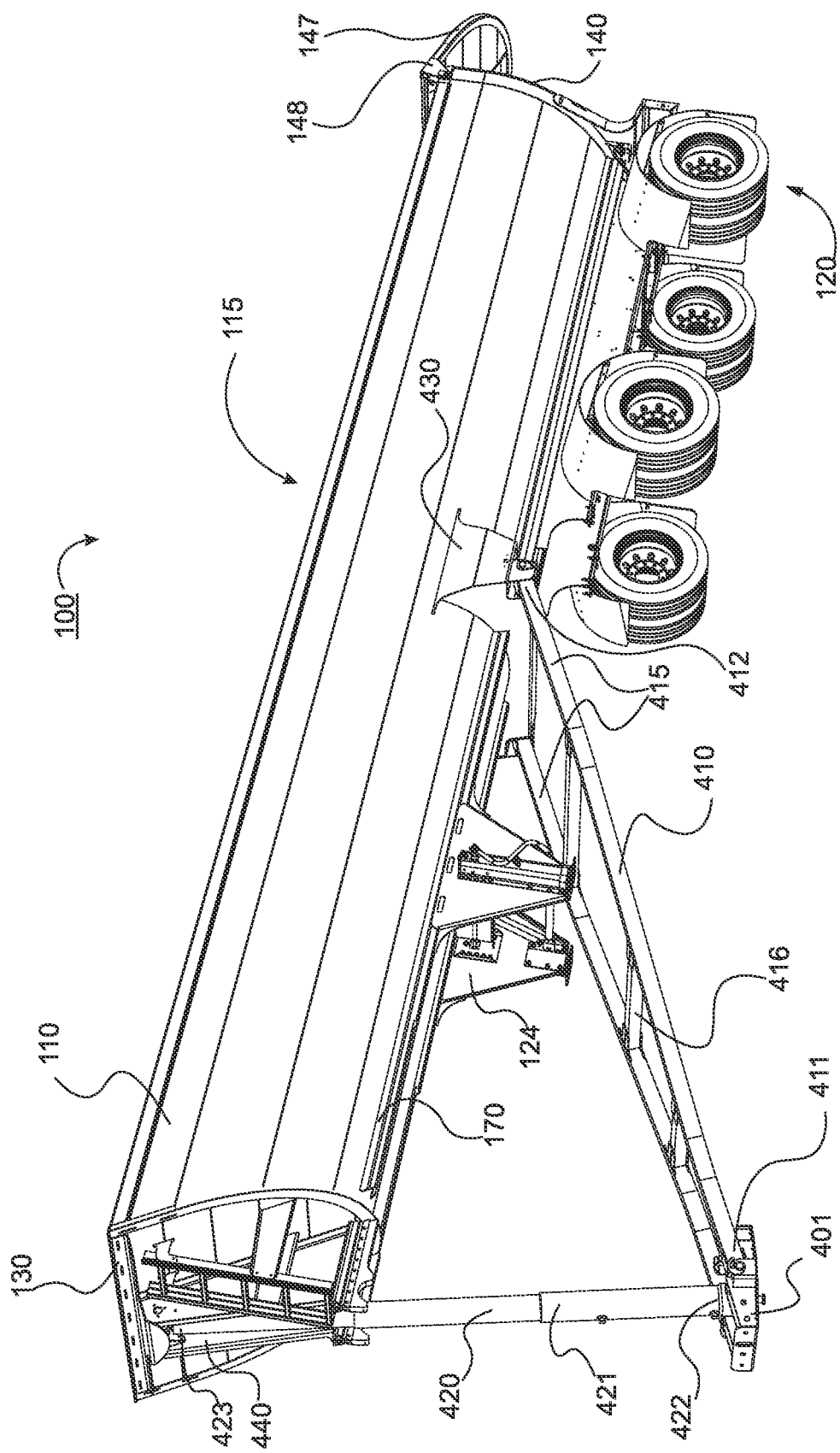
FIG. 15 shows a forward perspective view of the trailer of FIG. 1 in a dumping position.
Figure 16:
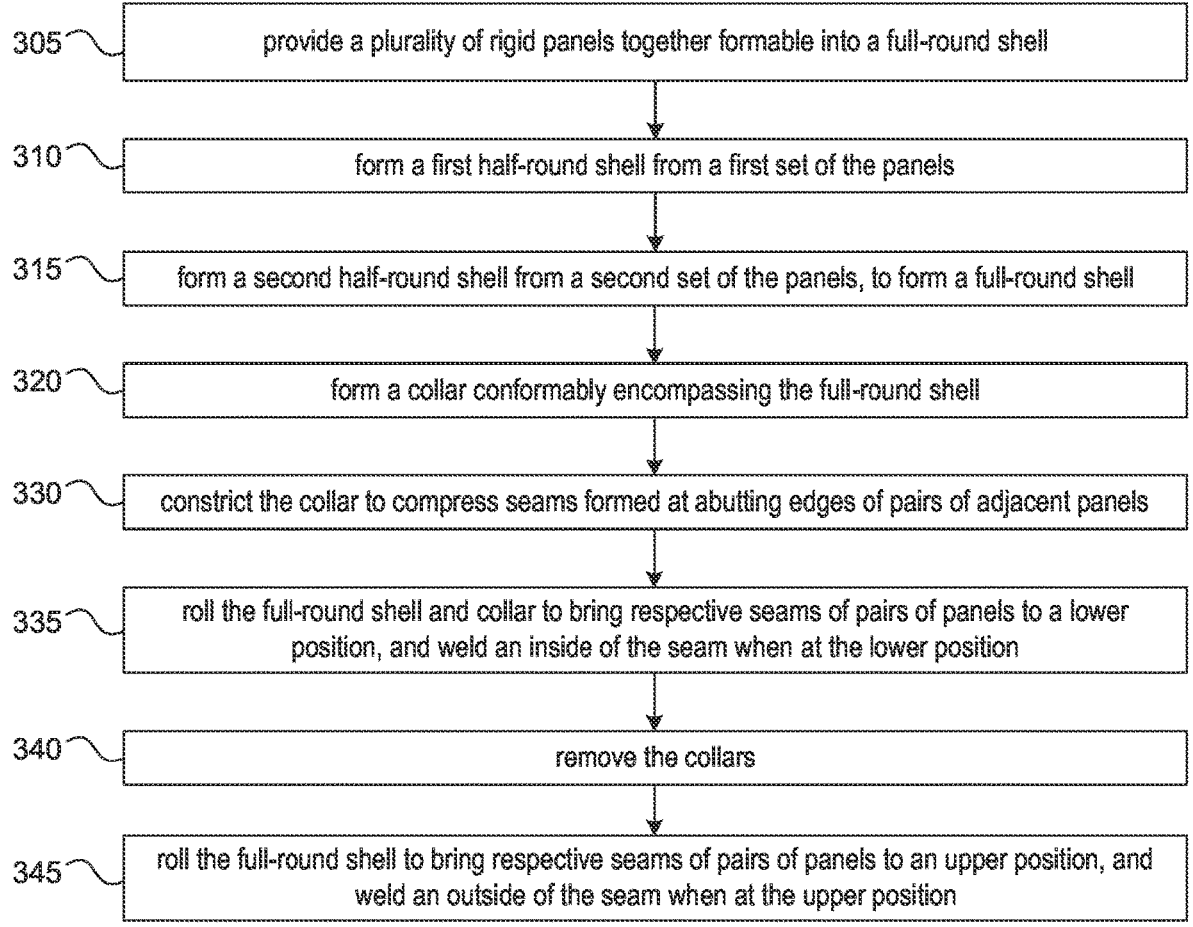
FIG. 16 shows a flowchart of a method of manufacturing a half-round container.

The container 110 may have a tailgate 147 also having a half-round shape, which may be semi-circular or semi-obround (shown especially in FIG. 4), as the case may be, and thus sized and shaped for closing a rear opening of the container 110. The tailgate 147 may be movably mounted at or adjacent a perimeter of a rear opening 143 of the container 110 in any convenient manner. For example, the tailgate 147 may be hingedly mounted, at or adjacent an edge of the tailgate 147, at or adjacent an upper edge of the opening, such that the tailgate 147 is openable by rotating the tailgate 147 upwardly using the hinges 148, and closeable by the opposite motion, as shown in FIGS. 14 & 15. Alternatively, the tailgate 147 may be hingedly mounted, at or adjacent an edge of the tailgate 147, at or adjacent a lateral edge, such as a right edge or left edge, of the rear opening such that the tailgate 147 is openable by rotating the tailgate 147 laterally, that is to one side, using the hinges, and closeable by the opposite motion. The container 110 may include an appropriate tailgate locking mechanism 149 selectively to maintain the tailgate 147 in a closed configuration or to permit the tailgate 147 to open. In this way, the tailgate 147 may be closed to retain cargo in the container 110, and opened to permit loading or discharge of cargo to or from the container 110. The tailgate 147 may further have an inspection port 146 which is openable to permit visual inspection of the container 110 load and securely closeable to prevent spillage of the load through the inspection port 146.

Figure 8:
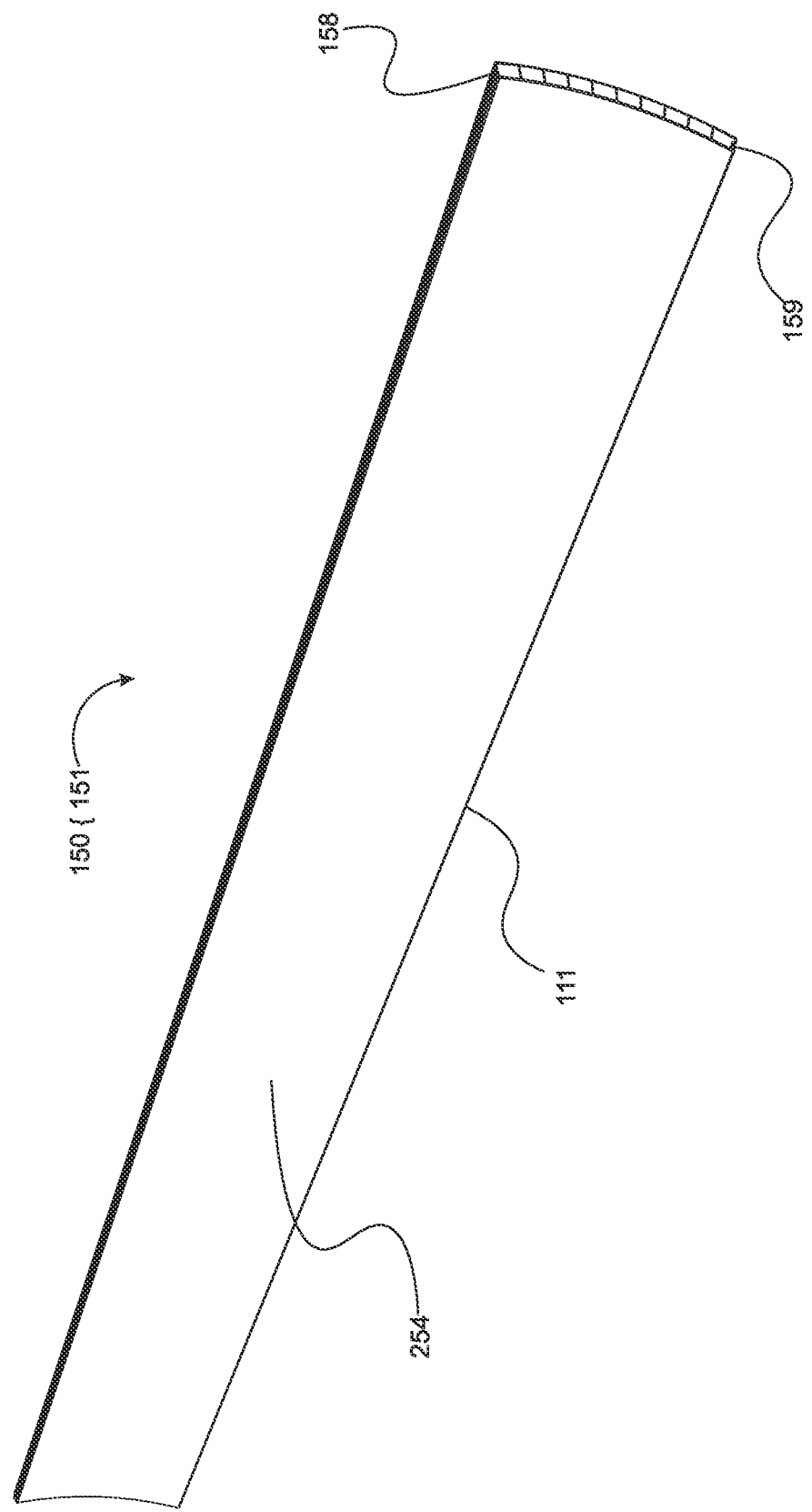
FIG. 8 shows a perspective view of a longitudinally-extended curved panel in isolation.
Figure 9:
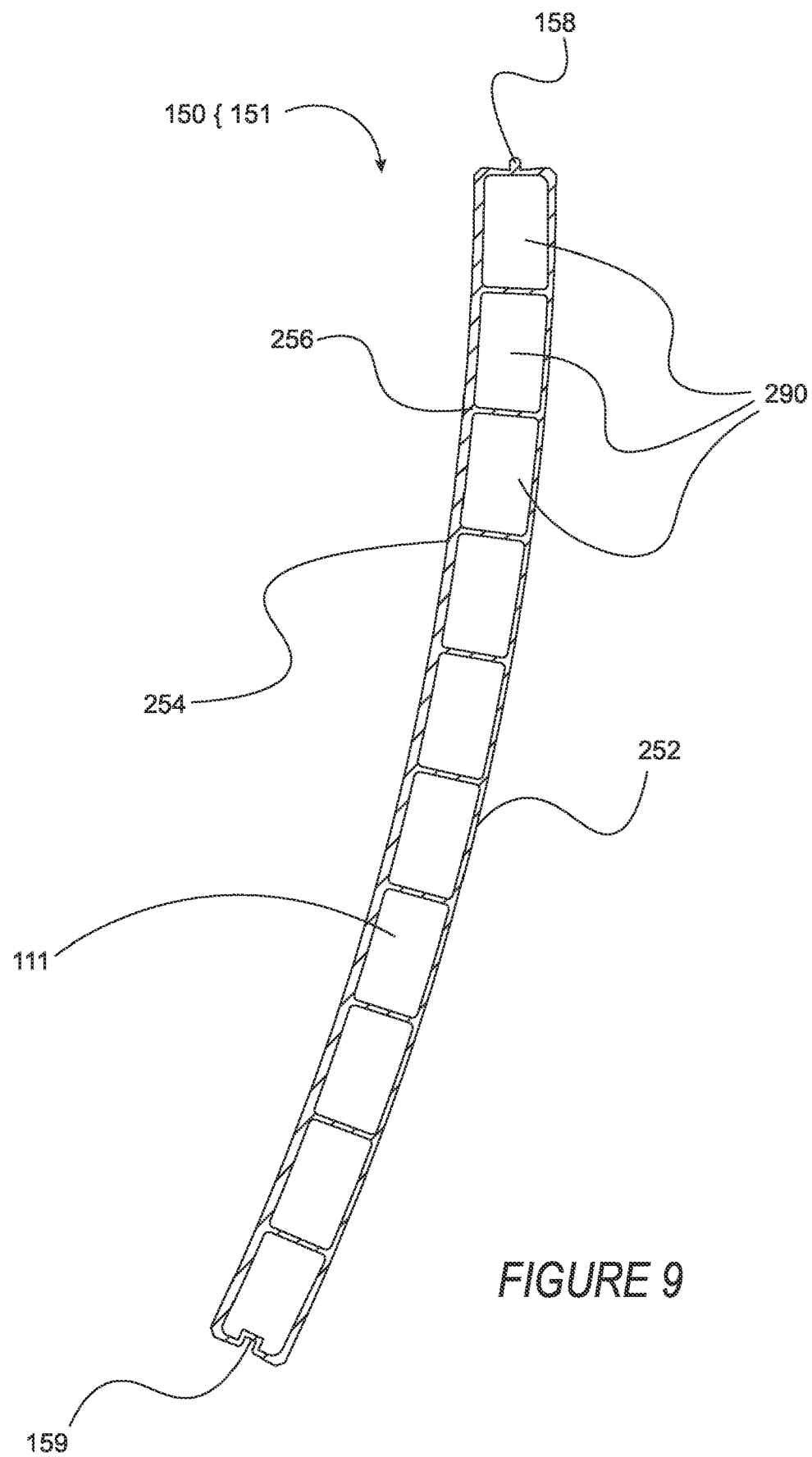
FIG. 9 shows a lateral cross-sectional view of the curved panel of FIG. 8.
Figure 10:
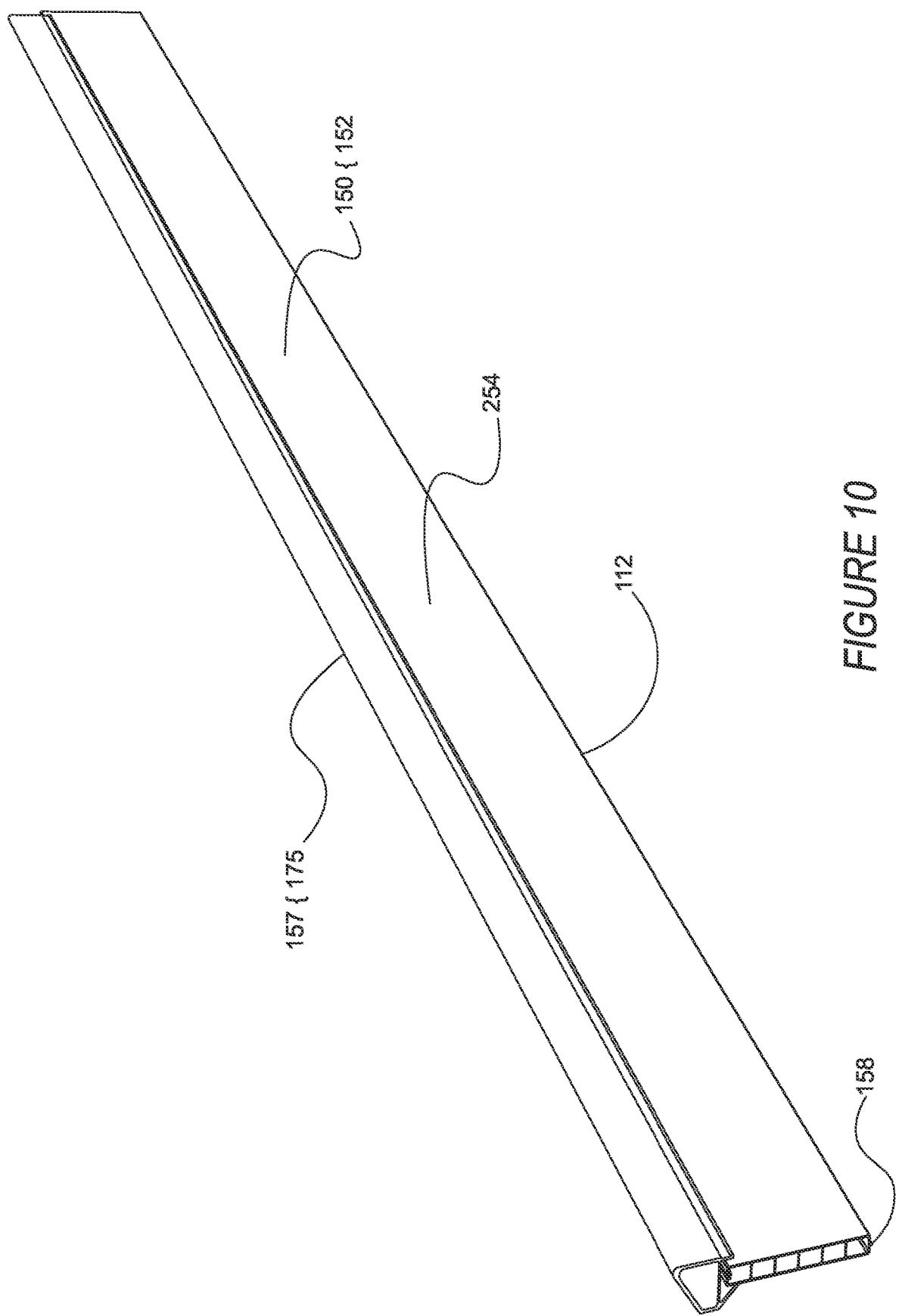
FIG. 10 shows a perspective view of a longitudinally-extended flat extension panel in isolation.

The container 110 may be formed of a plurality of longitudinally extended panels 150 which may include longitudinally extended curved panels 151, shown in isolation in FIGS. 8 and 9. When the container 110 has a semi-obround shape, the container 110 may also include longitudinally extended flat extension panels 152, shown in isolation in FIGS. 10 and 11. The curved panels 151 may be formed of a continuous thickness of resilient plate material and shaped, which may be by bending, extrusion, rolling, or any other suitable technique, to provide the longitudinal curved panels 151 with a common curvature. The flat extension panels 152 may be formed of a continuous thickness of resilient plate material and shaped, which may be by bending, extrusion, rolling, or any other suitable technique. The container 110 may have a lower semi-cylindrical shell 111 and an upper rectangular extension 112 which together form a semi-obround shell 113. The lower semi-cylindrical shell 111 may be formed of the curved panels 151. The upper rectangular extension 112 may include at least one flat extension panel 152 at each side of the container 110.

The panels 150 may be formed of any suitable material, which may be a metal, which may be steel or aluminum, and have any suitable dimensions including thickness. The following are non-limited examples. In some embodiments, the panels 150 have a thickness of between 0.5" and 6" (1.27 cm and 15.24 cm), or between 1" and 4" (2.54 cm and 10.16 cm), or about 1.5" (3.81 cm). Other materials and manufacturing techniques are possible, and the principles disclosed herein are not necessarily limited to any particular materials or manufacturing techniques to produce the panels. For example, the principles disclosed herein may be applicable where the panels are formed of non-metals including plastics, for example thermoplastics, including for example high density polyethylene, or fiberglass. So long as the panels are sufficiently rigid and strong in view of the principles disclosed herein, any and all different materials, dimensions, and manufacturing techniques are possible.

Each curved panel 151 may have a cross-section generally arcuate in shape, shown especially in FIG. 9, which for all of the curved panels 151 may have a common arc radius r, or degree of curvature, as shown in FIG. 5. Thus, each curved panel 151 may form a hollow cylinder segment, meaning a portion of a hollow cylinder (or tube) bounded by corresponding radial planes extending through the longitudinal rotational axis of the cylinder, such that, if assembled, the curved panels 151 together would form a semi-cylindrical shell, meaning a 3D semi-annulus, being a projection of a 2D semi-annulus along the axis of rotational symmetry of the 3D semi-annulus—or, in other words, a hollow semi-cylinder, or semi-tube, or half-round tube, or semi-annular right prism. The curved panels 151 may all have the same arc length s, shown in FIG. 5, or some of the curved panels 151 may have a different arc length s from other ones of the curved panels 151. Any suitable combination is possible. The following are non-limiting examples. In some embodiments, the curved panels 151 have an arc radius r of between 2.5' and 6' (0.762 m and 1.8288 m), or between 3.5' and 5' (1.0668 m and 1.524 m), or about 51" (1.2954 m). In some embodiments, the curved panels 151 have an arc length s of between 10" and 32" (25.4 cm and 81.28 cm), or between 18" and 26" (45.72 cm and 66.04 cm), or about 22" (55.88 cm).

Figure 7:
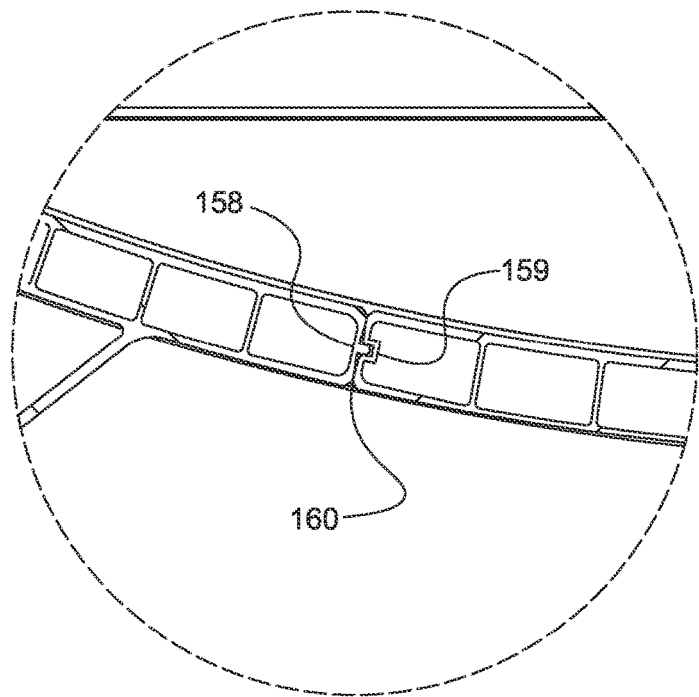
FIG. 7 is a detail view based on FIG. 6.
Figure 11:
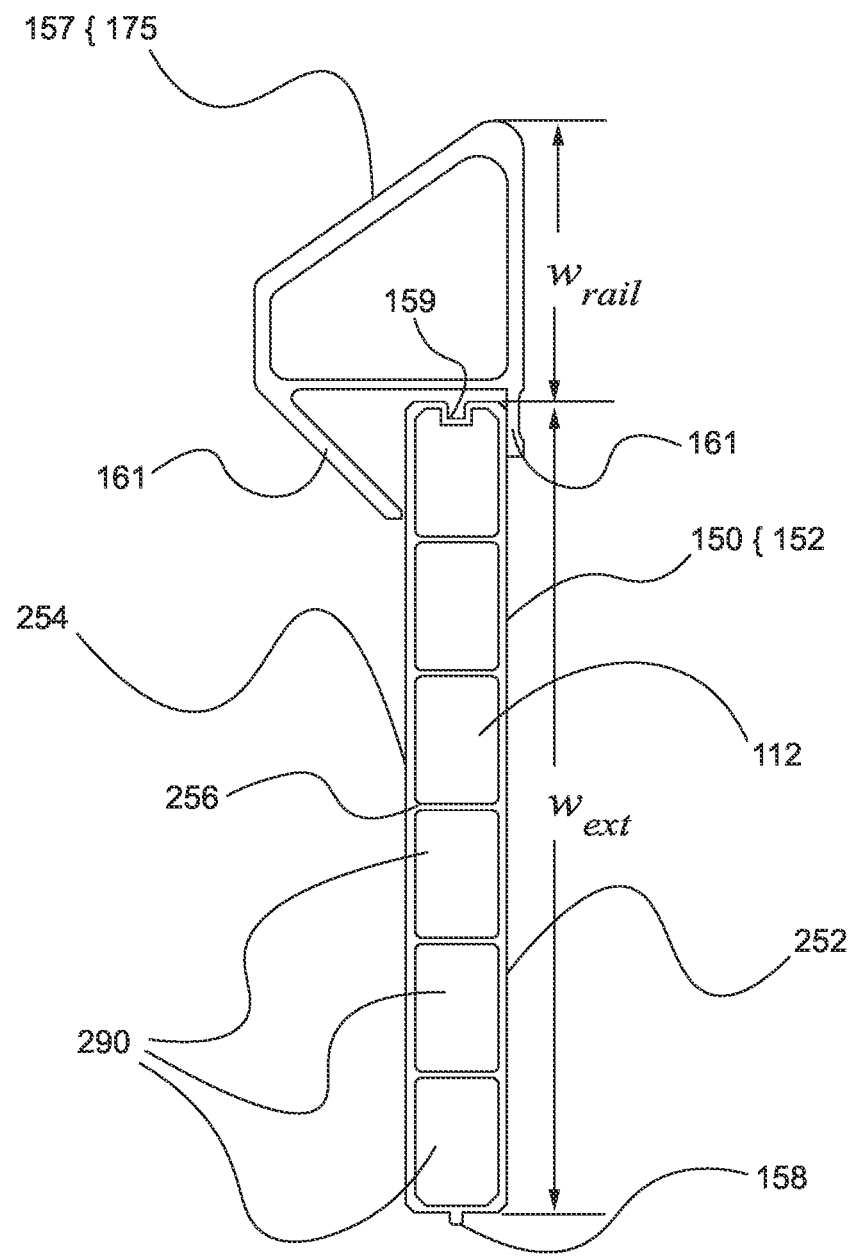
FIG. 11 shows a lateral cross-sectional view of the curved panel of FIG. 10.

As shown particularly in FIGS. 9 & 11, at least one, some, or each panel 150 may be formed with a tongue 158 at a first longitudinal edge and a groove 159 at an opposite longitudinal edge opposite the first longitudinal edge. The tongues 158 and grooves 159 of the different panels 150 may be configured with respective sizes and shapes to couple fittingly. In this way, a plurality of the panels 150 may be joined at abutting edges by mating the tongue 158 of one panel 150 with the groove 159 of an abutting panel 150 to form a joint 160, as shown especially in FIG. 7, and multiple panels may be so joined in sequence to form the semi-cylindrical tube. Each of the joints 160 so formed may be cemented or affixed by any suitable means, which may include fasteners or welds. Other mating means or techniques are possible. For example, in one or more instances, a panel 150 may be formed with two tongues 158 or two grooves 159, one on each end of the panel 150, to accommodate a desired ordering of panels 150 in the formation of the semi-cylindrical tube. Such an instance is the panel 153 shown in FIG. 13, which has two tongues 158, one at each circumferential end of the curved panel 153. In another example, instead of a tongue-and-groove arrangement, the edge of one adjacent panel may be rounded with a preconfigured convex curvature, and the edge of the mating adjacent panel may be rounded with a preconfigured concave curvature matching the convex curvature, such that the first convex rounded edge abuts fittingly the second concave rounded edge. Other suitable mating arrangements may be used.

The panels 150 may be of any desired length, which may include a length which bridges the front end 130 and the rear end 140 of the container 110—in other words, the entire length l of the container 110. All of the panels 150 may have the same length, or first ones of the panels 150 may have a first length different from a second length of second ones of the panels 150. Further combinations are possible. The following are non-limiting examples. In some embodiments, the panels 150 have a length of between 20' and 100' (6.096 m and 30.48 m), or between 40' and 80' (12.192 m and 24.384 m), or between 50' and 60' (15.24 m and 18.288 m), or about 56' (17.0688 m), or about 53' (16.1544 m).

Figure 6:
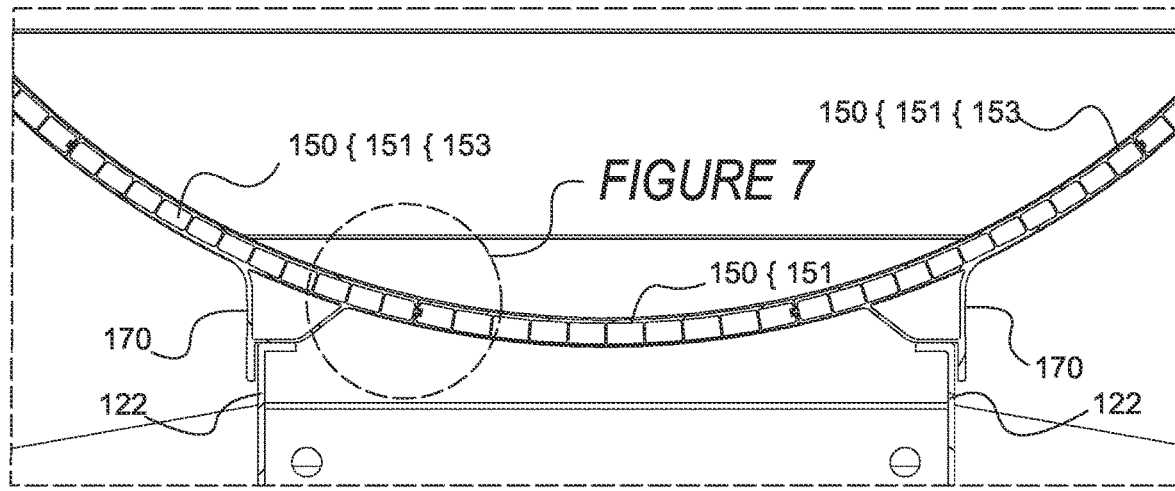
FIG. 6 is a detail view based on FIG. 5.
Figure 12:
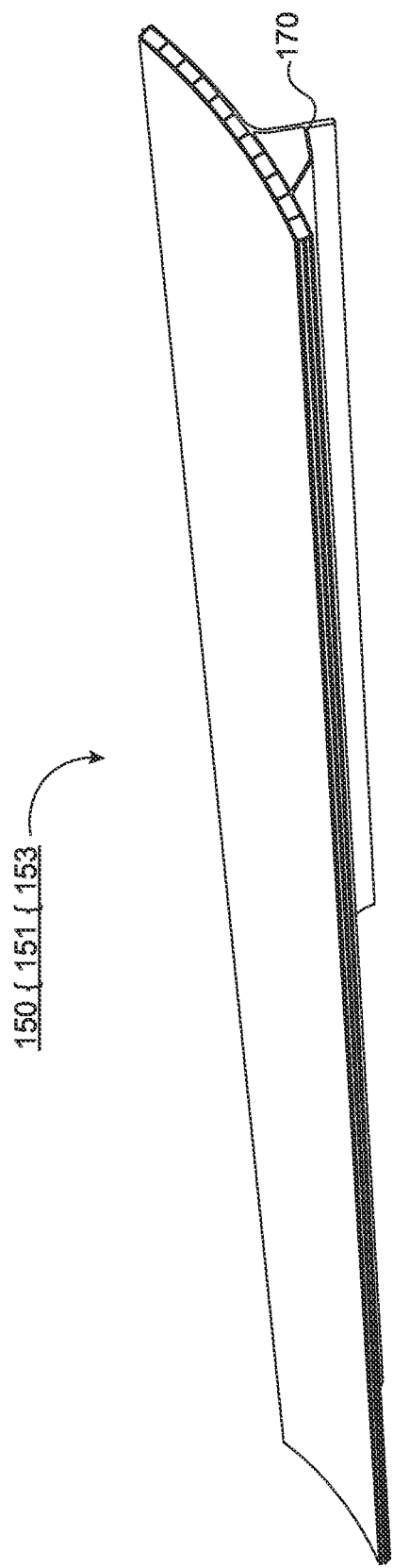
FIG. 12 shows a perspective view of a longitudinally-extended curved panel with extruded rail, in isolation.

Some of the panels 150 may include panels 153 formed with a profile including one or more projections configured for selected purposes. For example, and as shown particularly in FIGS. 6, 12 & 13, one or more, which may be two, of the panels 153 may be formed with longitudinally extended rails 170 or flanges to be coupled to a chassis 122 (shown most clearly in FIG. 6) of the wheeled suspension 120 (shown in FIG. 1), for example by fasteners or welds, for mounting the container 110 to the wheeled suspension 120. In such case, the profiles, include the two profiles, may be configured in such a way that the mounting rails 170 or flanges are positioned and shaped in such a way that is generally symmetrical relative to a vertical plane longitudinally bisecting the container 110, as shown particularly in FIG. 6. Such mounting rails 170 may also be configured, sized, and shaped to provide structural strength to the container 110. Other projections may instead or also be included in the extrusion profile of one or more panels 150 for any desired purpose, for example for attachment of landing gear 124 of the container 110.

At least one flat extension panel 152 may be provided at each transversely opposite side of the container 110. A longitudinal top rail 157 may be provided atop and in longitudinal alignment with each flat extension panel 152. The top 157 rail may be formed with a tongue or groove for coupling to the corresponding flat extension panel 152 having a matching groove or tongue, respectively, in a substantially similar manner as the joints formed by adjacent pairs of panels 150, as described above. Alternatively, the top rail 157 may be integral with and a part of the flat extension panel 152. For example, when the flat extension panel 152 is formed by extrusion, an extrusion profile of the flat extension panel 152 may include the top rail 157. Further alternatively, and as shown in FIG. 11, the top rail 157 may be top rail 175 which has legs 161 sized, shaped, and configured to sandwich and contact opposing surfaces of the flat extension panel 152 at or near a top end of the flat extension panel 152, and the legs 161 may be fastened to the flat extension panel 152 at or about portions of the legs 161 which contact the flat extension panel 152, which may be by welds. Alternatively, the top rail 157 may be omitted, and the flat extension panel 152 may simply have a closed top edge, or be coupled to a U-shaped top cap (not shown).

As shown especially in FIGS. 5 & 11, the one or more flat extension panels 152 on each transverse side of the container 110 collectively have a common total vertical dimension when installed, or width $w_{ext}$. Each top rail 157 may have a height of $w_{rail}$. As shown in FIG. 5, a height of the semi-cylindrical shell 111 equals its radius, i.e. r. As such, a total height h of the container 110 may be $h=r+w_{ext}+w_{rail}$. In some embodiments, the panels 152 have a common total vertical dimension, or width $w_{ext}$, of between 3" and 24" (7.62 cm and 60.96 cm). In some embodiments, the top rails 157 may have a common total vertical dimension, or width $w_{rail}$, of between 3" and 9" (7.62 cm and 22.86 cm). Other dimensions are possible.

While the container 110 described above and shown in the drawings possesses the upper rectangular extension 112 including the one or more flat extension panels 152, it will be appreciated that, alternatively, the container 110 may not have the upper rectangular extension 112. In such case, the container 110 may include a lower semi-cylindrical shell 111 which ends at the longitudinal upper edges of the outermost and uppermost curved panels 151 forming the lower semi-cylindrical shell 111. Such outermost and uppermost curved panels 151 may be formed such that their longitudinal upper edges are closed and smooth, and for example do not possess either a tongue or groove. Alternatively or additionally, the upper rails 157 described and shown herein may be mounted in longitudinal alignment atop the outermost and uppermost curved panels 151 on or at their longitudinal upper edges, in a substantially similar way as described above relative to the extension panels 152, and thus for example may either be joined to the corresponding outermost and uppermost curved panels 151 by tongue-and-groove joints, or by providing the top rail 157 with legs 161 and cementing, fastening, or welding the legs at or about the longitudinal upper edges of the outermost and uppermost curved panels 151, or may be integral with the corresponding outermost and uppermost curved panels 151. In such case, the tailgate 147 hinges 148 may be mounted to, at, adjacent, or near the longitudinal upper edges of the outermost and uppermost curved panels 151, and the tailgate 147 itself may be sized and shaped so as to represent substantially a semi-circle, which may lack an upper rectangular extension, so as to fit the semi-circular rear opening 143 formed by the container 110.

As noted above, the panels 150, including the curved panels 151 and flat extension panels 152, which form the container 110, may be formed of any suitable materials and by any suitable manufacturing process. Further advantages may be obtained by forming the panels 150 as longitudinal extruded panels formed of any suitable material, which may be a metal, which may be steel or aluminum.

Figure 13:
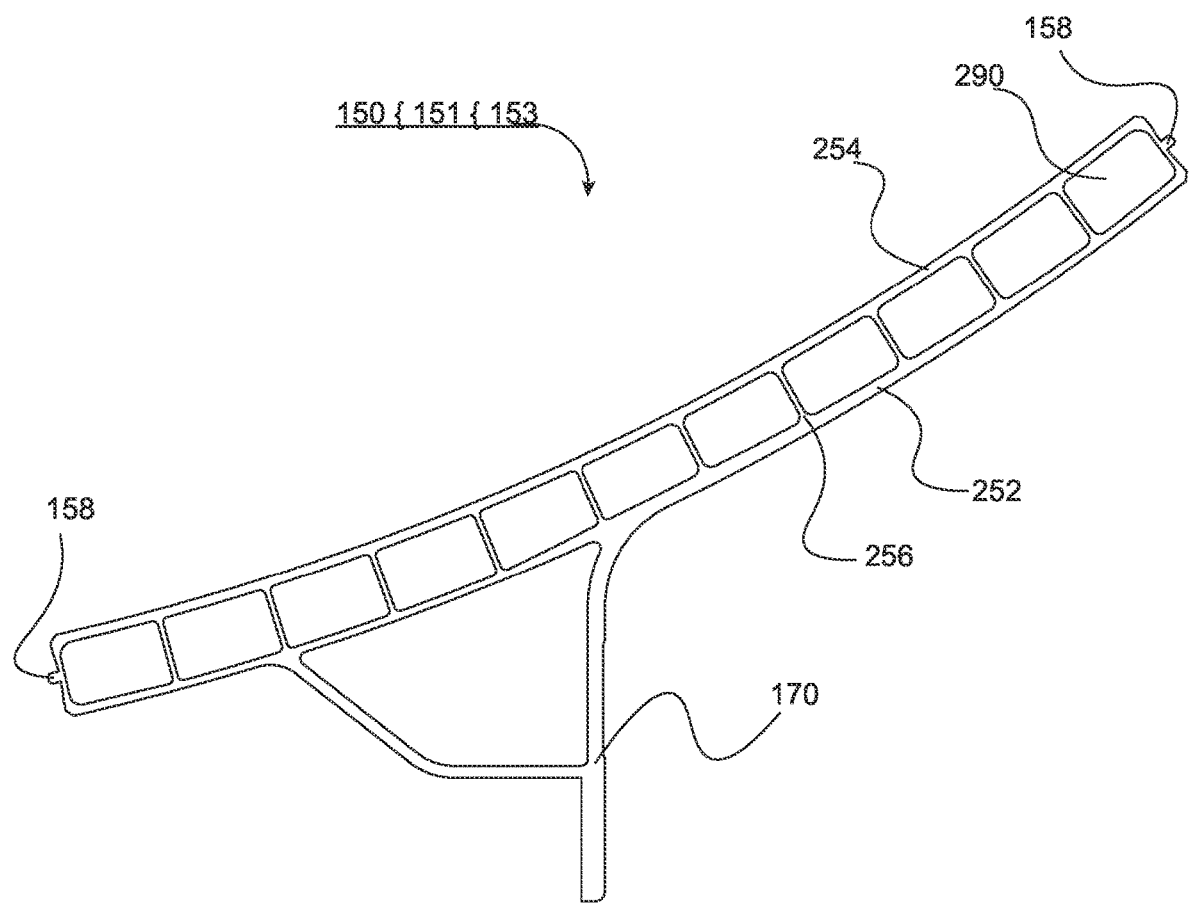
FIG. 13 shows a lateral cross-sectional view of the curved panel of FIG. 12.

As shown particularly in FIGS. 9, 11 & 13, each longitudinal panel 150 may have an outer skin 252, an inner skin 254, and a plurality of webs 256 spanning the outer skin 252 and the inner skin 254. The panels 150 may be formed of any suitable material, which may be a metal, which may be steel or aluminum. The outer skin 252, the inner skin 254, and the webs 256 may have any respective dimensions. The following are non-limiting examples. The outer skin 252 may have a thickness of at least 1 mm, or from 1 mm to 4 mm, or from 2 mm to 3 mm, or about 2.5 mm. The inner skin 254 may have a thickness of at least 2 mm, or from 2 mm to 5 mm, or from 3 mm to 4 mm, or about 3.5 mm. The webs 256 may each have a thickness of at least 1 mm, or from 1 mm to 4 mm, or from 2 mm to 3 mm, or about 2.5 mm. The outer skin 252 and the inner skin 254 may be spaced by a gap of at least 30 mm, or from 30 mm to 45 mm, or from 35 mm to 40 mm, or about 38 mm. The webs 256 may be provided in any desired number, which may be at least 6, or 6 to 12, or 8 to 10, or about 9. The webs 256 may be spaced by a gap or at least 15 mm, or 15 mm to 35 mm, or 20 mm to 30 mm, or about 25 mm. Other configurations are possible.

As shown particularly in FIGS. 9 & 13, each curved panel 151 may be extruded having a cross-section generally arcuate in shape, which for all of the panels 151 may have a common arc radius r, or degree of curvature, as shown in FIG. 5. The panels 151 may all have the same arc length s, or some of the panels 151 may have a different arc length s from other ones of the panels. Any functional combination is possible. Each flat extension panel 152 may be extruded with a generally flat profile, with a cross-section having a generally rectilinear shape.

As shown particularly in FIGS. 9, 11 & 13, each panel 150 may be extruded with a tongue 158 at a first edge at one end of the arc and a groove 159 at an opposite edge at an opposite end of the panel 150. The tongues 158 and grooves 159 of the different panels 150 may be configured with respective sizes and shapes to couple fittingly. In this way, a plurality of the panels 150 may be joined at abutting edges by mating the tongue 158 of one panel 150 with the groove 159 of an abutting panel 150 to form a joint 160, and multiple panels 150 may be so joined in sequence to form the half-round cargo container 110.

Where the panel 153 has a mounting rail 170, the outer skin 252, the inner skin 254, and/or one or more of the webs 256 of the panel 153 may be respectively formed with a greater thickness to provide additional strength and rigidity at or about the portion of the panel 153 adjoining the rail 170, so as better to communicate the weight of the container 110 and its contents to the rail 170 and thence to the wheeled suspension 120. The panel 153 may be formed with its outer skin 252, inner skin 254, and/or webs 256 having respective thicknesses which are uniformly greater relative to the corresponding thicknesses of other ones of the panels 150 not having the rail 170. Alternatively, the panel 153 may be formed such that the respective thicknesses of its outer skin 252 and/or inner skin 254 are generally similar to those of neighbouring panels 150 where the panel 153 adjoins neighbouring panels 150, i.e. at or about its tongue 158 and groove 159, but where the respective thicknesses of its outer skin 252 and/or inner skin 254 grow approaching the portion of the panel 153 which is adjacent to and/or adjoins the rail 170. Similarly, the webs 256 of the panel 153 in the portion of the panel 153 which is adjacent to and/or adjoins the rail 170 may have a thickness which is relatively greater than a thickness of the remaining webs 256 of the panel 153, where the thickness of such remaining webs may be substantially similar to the webs 256 of the other panels 150 not having the rail 170. As with the outer skin 252 and the inner skin 254 of the panel 153, the webs 256 may grow in thickness approaching the portion of the panel 153 which is adjacent to and/or adjoins the rail 170.

The panels 150 so provided, assembled, joined, and affixed, to form the half-round cargo container 110, may be configured to function as structural members, and provide each panel 150, and the assembled container 110 as a whole, with structural strength and rigidity both along and transverse the longitudinal axis L of the container. As such, no further reinforcing means may be required, such as semi-annular bands or ribs required by conventional half-round cargo containers.

Indeed, the inventors surprisingly discovered through field trials that a half-round container 110 formed from the longitudinally extended extruded panels 150 described above, formed of aluminum, possessed sufficient strength and rigidity to resist buckling or outward bowing of the container 110 under full load of bulk material, namely crushed stone and gravel, even at the mid-way point along the length of the container.

As a result, the half-round cargo container 110 may be free, or substantially free, of exterior or interior, or both, reinforcing means or structure, such as but not limited to one or more of bands, ribs, buttresses, flanges, collars, struts, or the like. Moreover, both the inner and outer surfaces of the container 110 may be made completely or substantially smooth, without projections or with minimal projections. With respect to the outer surface of the container 110, this provides the container with an optimal aerodynamic profile. With respect to the inner surface of the container 110, this completely or maximally reduces the catching, or snagging, or other such impediment to movement of the cargo within the container 110 along the inner surface, thereby facilitating loading and unloading of cargo from the container 110.

Depending upon the intended use of the container 110, the particular configuration of the panels provides yet further advantages.

For example, the outer skin 252 of the panels 150 may provide protection against impact or puncture from a collision or other blow coming from outside of the container 110. In such case, the blow may cause a rupture in the outer skin 252 of a panel 150, but nevertheless the inner skin 254 may remain intact and its structural integrity unaffected or minimally affected by the presence of the rupture in the outer skin 252.

A similar advantage may be realized when the trailer 100 is configured for the transport of waste, such as municipal or industrial garbage. One issue related to the transport of such waste is that it typically exudes leachate, being liquid which has passed through or about the solid waste and which has extracted soluble or suspended solids. It is desirable to avoid the release of leachate in an uncontrolled manner, as it is regarded to be an environmental hazard. It is desirable, therefore, to ensure that it is not released during transport. Municipal or industrial waste typically includes hard objects, however, which may puncture a surface of a container upon impact. In such case, the present half-round container 110, by virtue of the panels 150 having both an inner skin 254 and an outer skin 252, may provide a means of prevention of discharge of leachate, inasmuch as the release of any leachate following puncture of the inner skin 254, for example by impact with hard objects contained in the waste, may be contained by the outer skin 252. Moreover, the webs 256 of the panel 150 may provide one or more channels 290 (shown in FIGS. 9, 11 & 13) which limit movement of the leachate.

The trailer 100 shown and described herein may be configured and adapted to any desired purpose and functionality in connection with the transport of bulk cargo. For example, the trailer 100 may be configured as a dump trailer, i.e. to be tiltable, to raise selectively the front end 130 to urge or permit flow or movement of the bulk cargo within the container 110 in a direction from the front end 130 toward to rear end 140 of the container 110 to flow out of the rear opening 143 of the container 110. In particular, the trailer 100 may have a lift mechanism 420, which may be an electric hoist, a hydraulic hoist, or any other suitable hoist, which is operable to raise the front end 130 of the container 110.

The trailer 100 may be configured as a frame-type dump trailer, having a separate frame mounted on the wheeled suspension and configured to support the container, which is mounted hingedly to the frame at or near the rear end of the trailer, such that when the hoist raises the front end of the container, the frame and wheeled suspension, including all wheels, continue to rest on the ground, while only the container is tilted by the hoist to empty the container.

Alternatively, and as shown particularly in FIGS. 14 & 15, the trailer 100 may be configured as a frameless dump trailer. In such case, the trailer 100 may include a hitch assembly 401 for coupling the trailer 100 to a tractor (not shown). The hitch assembly 401 may be pivotably coupled to a draft arm assembly 410 and lift mechanism 420. The draft arm assembly 410 may be pivotably coupled to the hitch assembly 401 at or proximal a forward end 411 of the draft arm assembly 410. The draft arm assembly 410 may have arms 415 pivotably connected at a rearward end 412 of the draft arm assembly 410 to a cradle 430 on respective transversely opposite sides of the container 110, and the cradle 430 may be in turn connected to and supports the container 110. The draft arm assembly 410 may further have one or more cross-members 416 transversely spanning the arms 415. The draft arm assembly 410 may be formed of any rigid, durable material such as metal, which may be steel or aluminum. The lift mechanism 420 may have a shaft 421 with telescoping segments which move relative to one another to an extended configuration to lift the front end 130 of the container 110 as shown in FIGS. 14 & 15, or to a collapsed configuration to lower the front end 130 of the container 110 as shown in FIG. 2. The lift mechanism 420 may be at least partially enclosed by a housing 440 at the front end 130 of the container 110. The lift mechanism 420 may be pivotably mounted to the hitch assembly 401 at a lower end 422 of the lift mechanism, and may be pivotably mounted to the housing 440 at an upper end 423 of the lift mechanism 420.

In particular, as described above, the inventors surprisingly discovered that a half-round container 110 formed from the longitudinal extruded panels 150 described above, formed of aluminum, possessed sufficient strength and rigidity to resist buckling or outward bowing of the container 110 under full load of bulk material, namely crushed stone and gravel.

As such, the container 110 may exhibit during the dumping procedure reduced or minimal torsional flexure, in particular as compared to the torsional flexure exhibited by conventional half-round containers formed from sheet metal skins. As such, each of the arms of the cradle 430 extending upwardly on either transverse side of the container 110 may extend only partway up each side of the container 110 and yet provide sufficient resistance of any torsional flexure of the container 110 otherwise exhibited. More specifically, in different embodiments, the cradle 430 arms may extend upwardly on each side of the container 110 from a lowermost point of the lower semi-cylindrical shell 111, no more than 75%, or no more than 70%, or no more than ⅔, or no more than 60%, or no more than 50%, or no more than 40%, or no more than ⅓, or no more than 30%, or no more than 25%, or no more than 20%, or no more than 10%, of the vertical height h of the container 110, or of the height of the lower semi-cylindrical shell 111 which is equal to its radius r.

Alternatively, the container 110 may not require the cradle 430 at all in order to reduce torsional flexure for safe performance of the dumping procedure. In other words, the extruded hollow-core structure of the longitudinal panels 150 may be fully sufficient to provide the container 110 with sufficient strength and rigidity sufficiently to prevent or reduce torsional flexure during the dumping procedure such that additional structure support is not required. In such case, the opposing arms 415 of the draft arm assembly 410 may be mounted to the opposing sides of the container 110 in a manner not requiring the cradle 430. For example, in some embodiments the arms 415 of the draft arm assembly 410 may be rotatably mounted instead to the mounting rails 170 provided on opposing sides of the container 110. As noted above, the mounting rails 170 may be as part of the extrusion profile of panels 153 (shown in FIG. 13), and in particular the panel 153 may be formed with a predetermined thickness sufficient to provide additional strength and rigidity at or about the portion of the panel 153 adjoining the rail 170, so as better to communicate the weight of the container 110 and its contents to the rail 170 and thence to the draft arm assembly 410.

For the sake of clarity, the trailer 100 need not be configured as a dump trailer as shown and described herein. Other configurations are possible and contemplated. For example, the container 110 may be mounted to the wheeled suspension 120 and be configured with the hitch assembly 401 and landing gear 124 as shown and described herein, which may employ the longitudinal mounting rails 170. Such a trailer 100 may possess advantages over conventional half-round trailers inasmuch as the trailer having container 110 formed from panels 150 which are the extruded aluminum panels shown may possess sufficient structure strength and rigidity so as not to require additional structural support such as ribs, cradles, cross-members, or other such structures as are typically required in conventional half-round containers formed from sheet material such as sheet metal.

As noted above, the above-described half-round cargo container 110 possesses numerous advantages over previous cargo containers. There is further advantage in an efficient and reliable method 300 of manufacturing such a half-round cargo container 110, as shown in FIGS. 16-37. The method 300 may involve manufacturing two half-round containers 110 in a single manufacturing operation, which may provide the advantages of reduced cost, complexity, and time in the manufacture of a plurality of half-round containers 110. The method may provide the additional advantages of improved quality at least with respect to optimal structural symmetry of the half-round containers 110 and optimal weld quality, and therefore structural strength and durability.

The method 300 includes providing a plurality of rigid panels 150 together formable into a full-round shell (step 305) including a first half-round shell and a second half-round shell. The first half-round shell may be a first semi-cylindrical shell 111A formed from curved panels 151A of a first set of curved panels 151. Alternatively, the first half-round shell may be a first semi-obround shell 113A including the first semi-cylindrical shell 111A and at least a first pair of flat extension panels 152A, being instances of flat extension panel 152, provided at each transverse side of the first semi-cylindrical shell 111A (step 310). Similarly, the second half-round shell may be a second semi-cylindrical shell 111B formed from curved panels 151B of a second set of curved panels 151. Alternatively, the second half-round shell may be a second semi-obround shell 113B including the second semi-cylindrical shell 111B and at least a second pair of flat extension panels 152B, being instances of flat extension panel 152, provided at each transverse side of the second semi-cylindrical shell 111B (step 315). One or more collars 530 may be formed which conformably encompass the full-round shell (step 320). The collars 530 may be constricted to compress joints 160 formed at abutting longitudinal edges of pairs of adjacent panels 150 (step 330). The full-round shell and collars 530 may then be rolled about a longitudinal axis L' of the full-round shell (shown in FIG. 26) to bring respective joints 160 of pairs of panels 150 to or proximal a lower position 540, and inner seams 545 of the joints 160 may be welded when at or proximal the lower position 540 to form a welded inner seam (step 335). The collars 530 may then be removed (step 340), and the full-round shell may then be rolled about the longitudinal axis L' of the full-round shell to bring respective joints 160 of pairs of panels 150 to or proximal an upper position, and an outer seam of the joint 160 may then be welded when at or proximal the upper position to form a welded outer seam (step 345).

While in the examples that follow the full-round shell is an obround shell, and likewise the first half-round shell and second half-round shell are semi-obround shells, it is contemplated that the full-round shell may instead be a cylindrical shell and the first and second half-round shells may each be semi-cylindrical shells.

As noted above, the obround shell 505 may include two instances 113A, 113B of semi-obround shell 113. The method 300 may be useful to make two containers 110A, 110B, being instances of container 110, in a single manufacturing process, as opposed to separate manufacturing processes, and thus may provide the advantages of increased manufacturing efficiency and reduced manufacturing time and cost.

As shown in FIGS. 17 & 25-27, a plurality of pairs of ring segments 565 may be provided, and each ring segment 565 may be sized and shaped to conform to a corresponding one of the semi-cylindrical shells 111A, 111B, such that a radially inner surface 566 of the ring segment 565 conformably contacts a radially outer surface 114 of the semi-cylindrical shell 111 when the ring segment 565 and semi-cylindrical shell 111A, 111B are in concentric alignment. Each ring segment 565 may be half of the shape of an annulus shape, i.e. a semi-annulus. A bridge segment 509 may be provided extending between each pair of facing ends the ring segments 565, and together with these may form an obround collar 530. The outer surface 114 of the semi-cylindrical shells 111A, 111B and the inner surface 566 of the ring segments 565 may have, or be characterized by, the common curvature r (shown in FIG. 5) and the bridge segments 509 may be so sized such that the assembled obround collars 530 fittingly encompass the obround shell 505. Each of the ring segments 565 and the bridge segments 509 may be formed of any suitable material of sufficient durability, rigidity, and strength, including in some embodiments steel, stainless steel, or aluminum.

Figure 18:
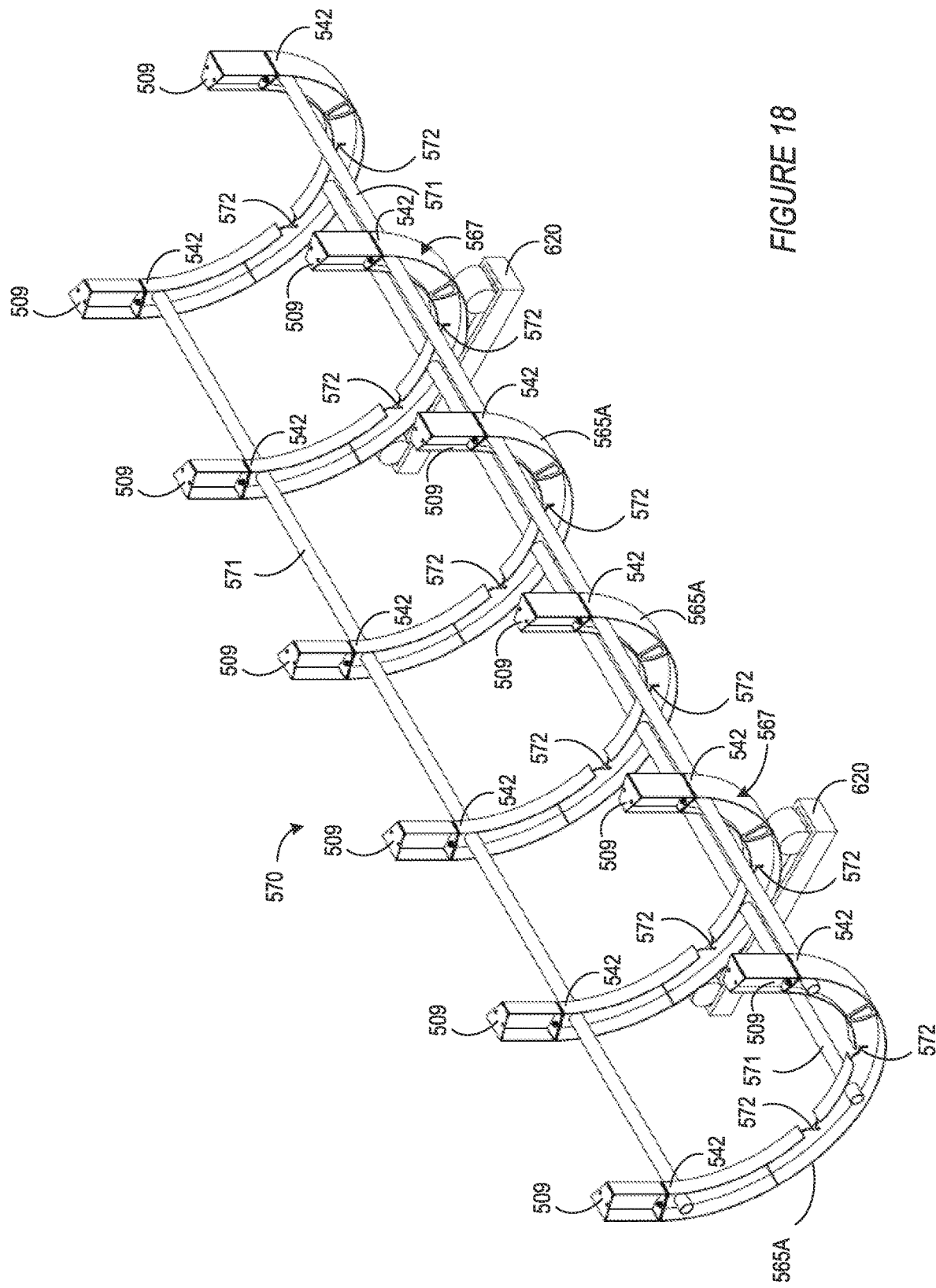
FIG. 18 shows a perspective view of a partial manufacturing apparatus including cradle and tank rollers for assembly of a half-round shell.

As best seen in FIG. 18, a first set of the ring segments 565 may be ring segments 565A which form a cradle 570, wherein the ring segments 565A are longitudinally spaced and aligned concentrically to form a semi-cylindrical frame conformable to the first semi-cylindrical shell 111A. By "aligned concentrically", it is meant that the respective circular axes of symmetry of the ring segments 565A, being the circular axis of symmetry of the annulus of which the ring segment 565A is a half, are generally aligned, which may include being coincident. By "longitudinally spaced", it is meant that the ring segments 565A are spaced along a longitudinal axis parallel to longitudinal axis L' of the obround shell 505 (shown in FIG. 26), which may include that coincident circular axis of symmetry. The longitudinal spacing of the ring segments 565A may be uniform, or irregular. The cradle 570 may further include one or more longitudinal frame members 571, and the ring segments 565A may be rigidly mounted on the frame members 571 to space the ring segments 565A longitudinally and align them concentrically.

Figure 19:
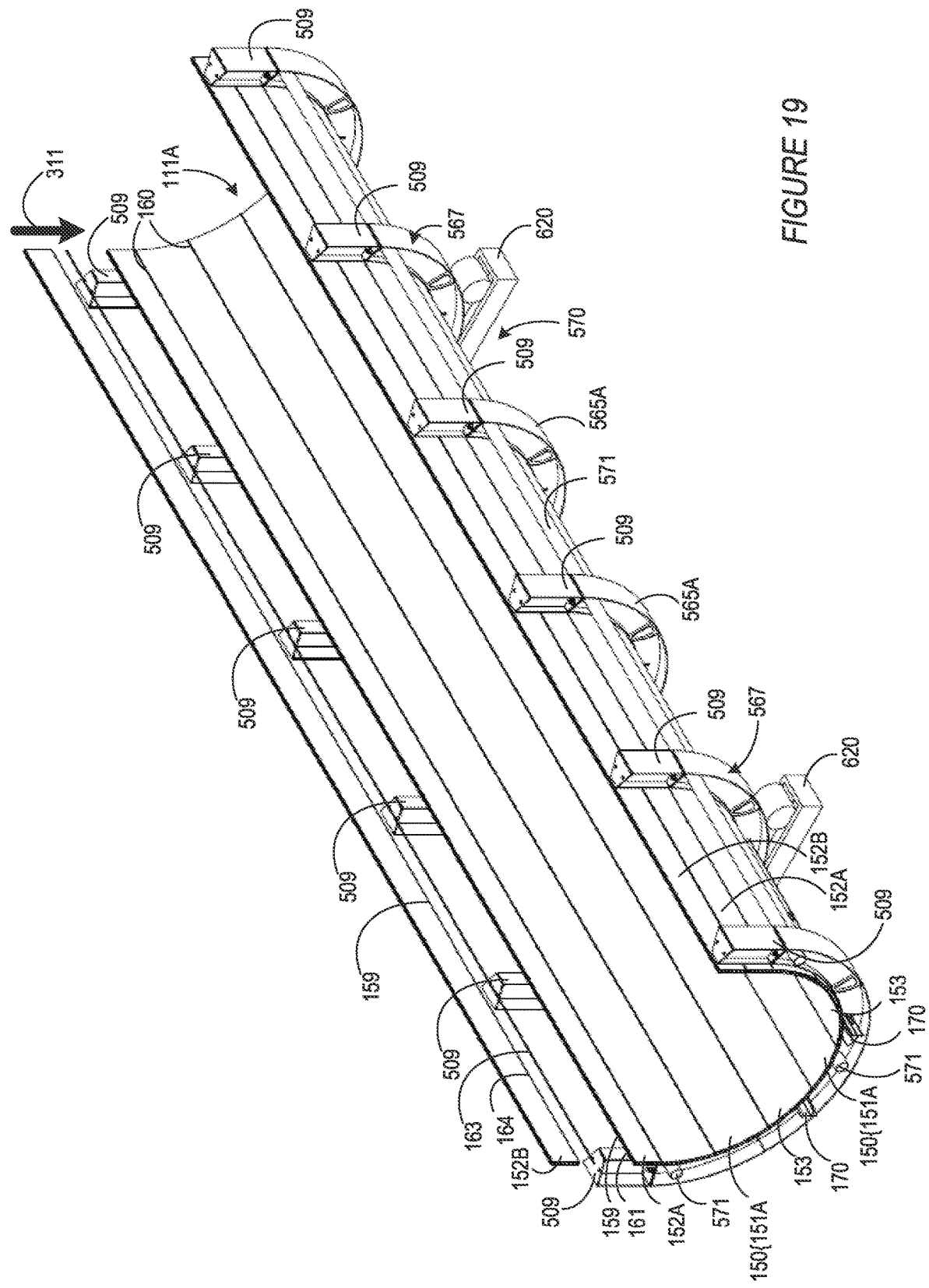
FIG. 19 shows a perspective view of the partial manufacturing apparatus of FIG. 18 and assembly of a first half-round shell and initial coupling using an alignment bar with a flat extension panel of a second half-round shell.
Figure 20:
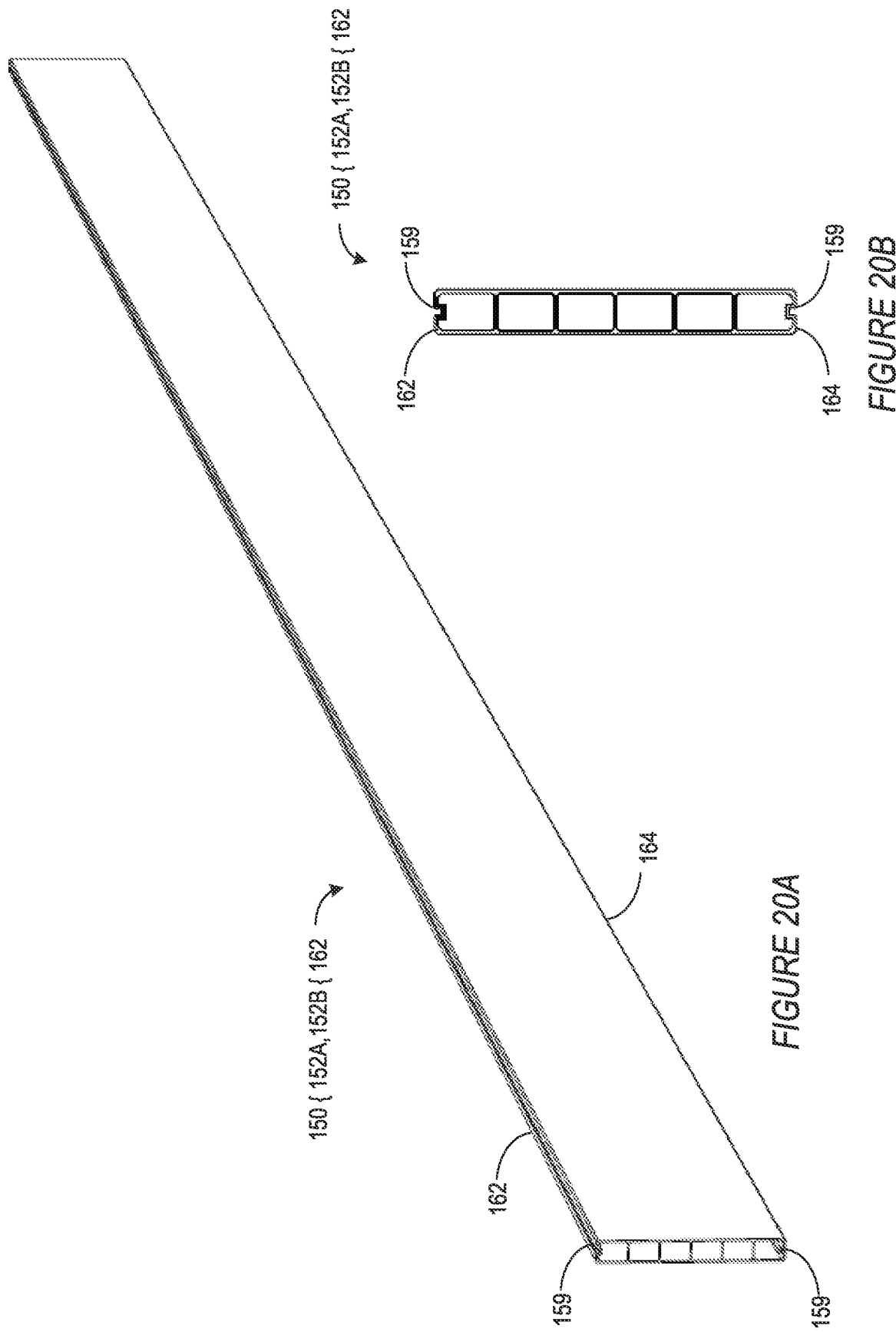
FIG. 20A shows a perspective view of a longitudinally-extended flat extension panel having grooves at both upper and lower edges.
FIG. 20B shows a transverse cross-sectional view of the panel of FIG. 20A.
Figure 21:
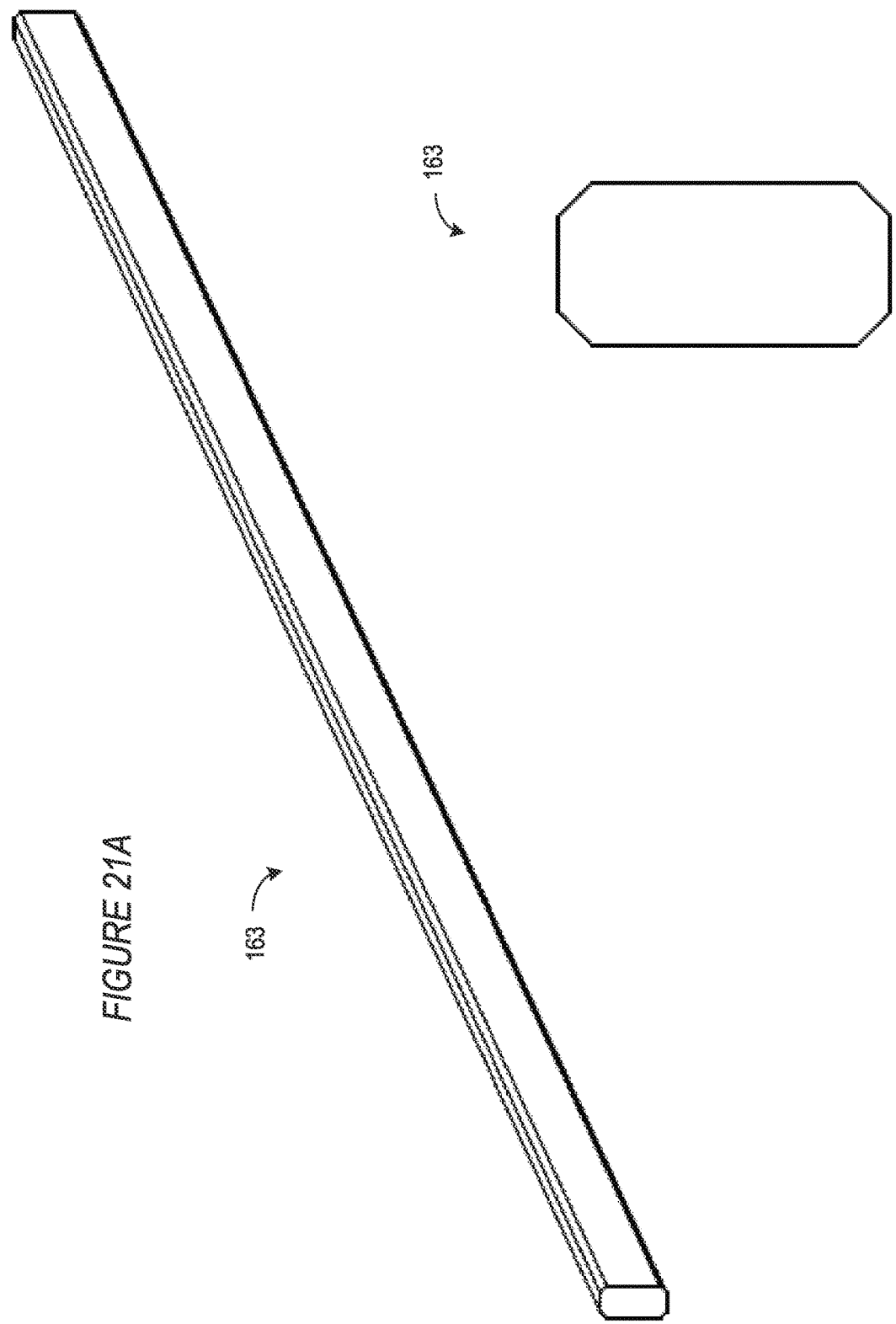
FIG. 21A shows a perspective view of a longitudinally-extended alignment bar.
FIG. 21B shows a transverse cross-section view of the alignment bar of FIG. 21A.

As best seen in FIG. 19, the first semi-cylindrical shell 111A may be assembled from curved panels 151A by laying the panels 151A, which may be one-by-one in sequence, in the cradle 570 to form the first semi-cylindrical shell 111A. The cradle 570 supports the panels 151A thus assembled to maintain the semi-cylindrical shape of the first semi-cylindrical shell 111A. Laying the panels 151A in the cradle 570 to form the first semi-cylindrical shell 111A may include joining the panels 151A at abutting longitudinal edges by mating the tongue 158 of one panel 151A with the groove 159 of an abutting panel 151A to form a joint 160, and joining the multiple panels 151A in sequence to form the first semi-cylindrical shell 111A.

Figure 17:
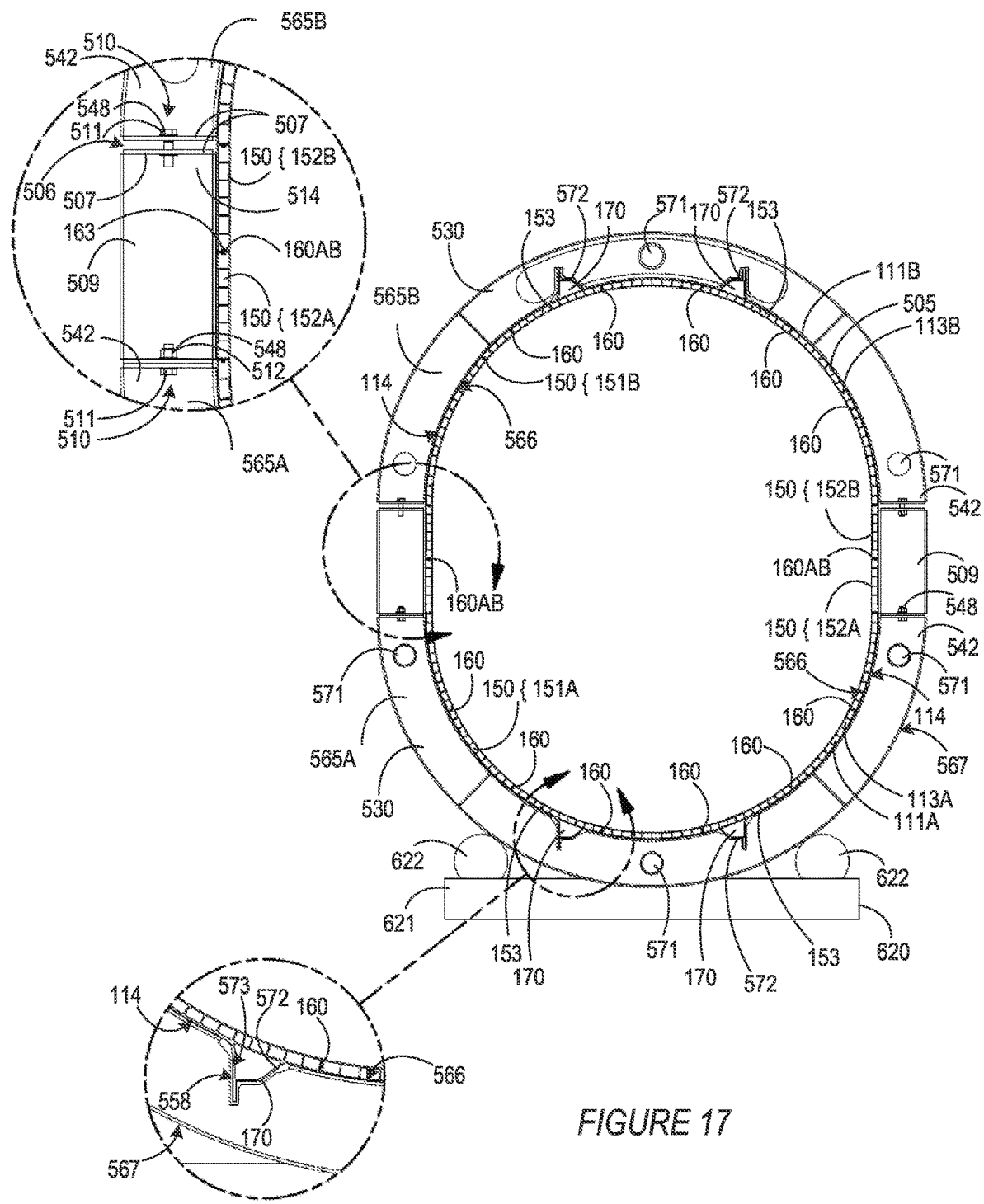
FIG. 17 shows an end view of an assembled full-round shell and manufacturing apparatus including collars and tank roller.

As noted above, one or more of the panels 151A may be panels 153 formed with a profile or projection, which may be a longitudinal rail 170. In such case, and as best seen in FIG. 17, the ring segments 565A which form the cradle 570 may be formed with one or more recesses 572 sized, shaped, and positioned so as fittingly to receive the longitudinal rail 170 when the panel 153 is laid in the cradle 570. The recesses 572 may be sized and shaped such that an inner surface 573 of the recess 572 fittingly contacts an outer surface 558 of the longitudinal rail 170, or they may be sized and shaped to provide a gap between the inner surface 573 of the recess 572 and the outer surface 558 of the longitudinal rail 170. In this way, although the first semi-cylindrical shell 111A including panels 153 having longitudinal rails 170 would not have a radially outer surface that is an unbroken semi-cylinder, the ring segments 565A with recesses 572 provide radially outer surfaces 567 that are smooth, unbroken semi-annuli. The usefulness of this feature will become apparent below.

Having formed the first semi-cylindrical shell 111A in the cradle 570, the pair of flat extension panels 152A may be laid atop the first semi-cylindrical shell 111A. Laying the flat extension panels 152A atop the respectively opposing panels 151A of the first semi-cylindrical shell 111A may include joining the flat extension panels 152A at abutting longitudinal edges with the corresponding and opposing panel 151A by mating the tongue 158 of one panel 151A, 152A with the groove 159 of an abutting panel 151A, 152A, as the case may be, to form a joint 160.

In one embodiment, the flat extension panels 152A atop the first semi-cylindrical shell 111A may have at an upper longitudinal edge 162 thereof a groove 159, regardless of whether an opposite, lower longitudinal edge 164 of the flat extension panel 152A has a tongue or a groove 159. Thus, in some embodiments, and as shown in FIGS. 20A & 20B, at least one of the flat extension panels 152A may have a groove 159 at both the upper longitudinal edge 162 and lower longitudinal edge 164 thereof. Other arrangements are possible, so long as the upper longitudinal edges 162 of the flat extension panels 152A at each transverse side of the first semi-cylindrical shell 111A have respective grooves 159. Then, as shown particularly in FIG. 19, and as shown in isolation in FIGS. 21A & 21B, an alignment bar 163 may be longitudinally aligned and fittingly laid in the groove 159 at the upper longitudinal edge 162 of each one of the flat extension panels 152A. In particular the alignment bar 163 may be sized and shaped for sliding fit with the groove 159 at the upper longitudinal edge 162 of each one of the flat extension panels 152A, with at least a portion of the alignment bar 163, which may be an upper half thereof, extending above the upper longitudinal edge 162 of the flat extension panel 152A. The alignment bar 163 may have a longitudinal length which is the same as or different from a longitudinal length of the flat extension panel 152A or groove 159. Similarly, flat extension panels 152B may each have a groove 159 at the lower longitudinal edge 164 thereof, regardless of whether the opposite upper longitudinal edge 162 of the flat extension panel 152B has a tongue 158 or a groove 159. Thus, as explained above, in some embodiments at least one of the flat extension panels 152B may have a groove 159 at both the lower longitudinal edge 164 and the upper longitudinal edge 162 thereof. Then, as shown particularly in FIG. 19, the pair of flat extension panels 152B, and particularly the lower longitudinal edges 164 thereof with grooves 159, may be aligned longitudinally above corresponding and opposing flat extension panels 152A and installed alignment bars 163 below, and then lowered atop the corresponding flat extension panel 152A and alignment bar 163 such that the alignment bar 163 is slidingly and fittingly received in the groove 159 at the lower longitudinal edge 164 of the flat extension panel 152B. In this way, and as illustrated by arrow 311, the flat extension panels 152A, 152B may be coupled in alignment by the mating of the alignment bar 163 within the opposing grooves 159 of the flat extension panels 152A, 152B. In this arrangement, the alignment bar 163 may be regarded to function similarly to a two-way tongue, albeit removable.

As discussed above, a bridge segment 509 may be provided at each pair of opposing ends of the ring segments 565A,565B which together form one or more of the collars 530, and thus may be provided at an end 542 of each of the ring segments 565A which form the cradle 570. As shown particularly in FIG. 17, the bridge segment 509 at a lower end thereof may be affixed or fastened to the ring segment 565A by any suitable device or fastener 548, which may include bolts. The bridge segments 509 thus affixed to the ring segments 565A of the cradle 530 may be operable to maintain alignment or resist misalignment of the flat extension panels 152A, 152B once assembled with the first semi-cylindrical shell 111A as described above.

Having assembled the first semi-cylindrical shell 111A and flat extension panels 152A, 152B as described above, and as shown in FIG. 22, at least one spacer 580 may be placed in the first semi-cylindrical shell 111A, which may be upright in the first semi-cylindrical shell 111A. As shown, the spacer 580 may be sized, shaped, and configured to contact respective inside surfaces of at least some of the panels 151A which form the first semi-cylindrical shell 111A and the flat extension panels 152A, 152B.

Figure 22:
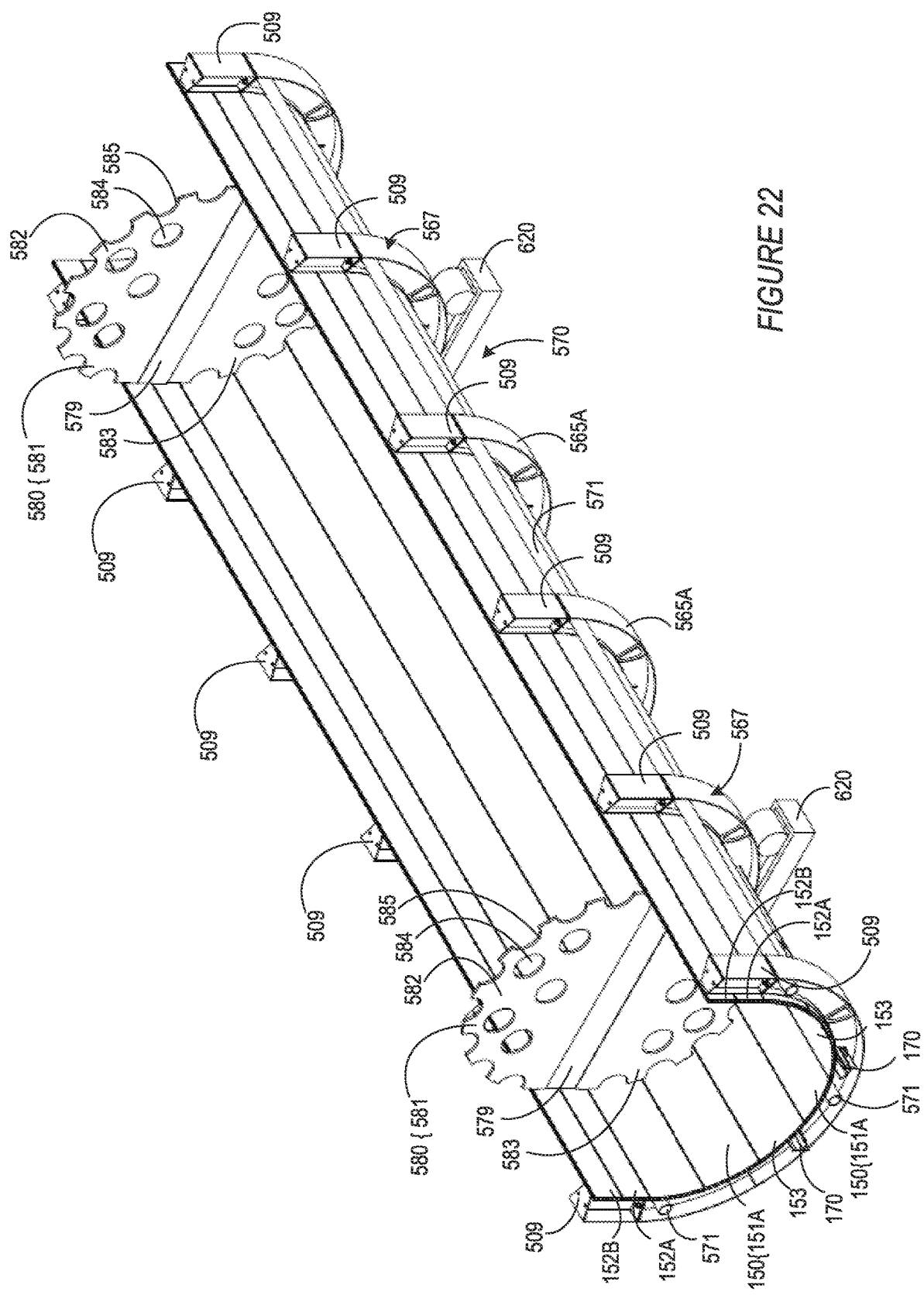
FIG. 22 shows a perspective view of the partial manufacturing apparatus of FIG. 18 and assembled first half-round shell with spacing disks emplaced within the assembled first half-round shell.

For example, as shown in FIG. 22, the at least one spacer 580 may include at least one spacing disk 581 having an obround shape, which may be placed upright in the first semi-cylindrical shell 111A so as to contact respective inside surfaces of at least some of the panels 151A of the first semi-cylindrical shell 111A. In this way, the first semi-cylindrical shell 111A may support the at least one spacing disk 581. The at least one spacing disk 581 may include a plurality of rigidly assembled parts, which may include a first semi-disk 582, a second semi-disk 583, and a rectangular plate 579 configured for rigid assembly to form the obround spacing disk 581. For this purpose, the first semi-disk 582, second semi-disk 583, and rectangular plate 579 may include any suitable fastening means (not shown) configured reversibly, but rigidly, to assemble the first semi-disk 582, the second semi-disk 583, and the rectangular plate 579 to form the obround spacing disk 581. For example, the first semi-disk 582, second semi-disk 583, and rectangular plate 579 may each have one or more cooperating through holes (not shown) sized and spaced to receive cooperating bolts, such that when the through holes are aligned, bolts are passed therethrough, and affixed using cooperating nuts, the first semi-disk 582 and rectangular plate 579, on the one hand, and also the rectangular plate 579 and second semi-disk 583, on the other hand, are respectively rigidly, but reversibly, assembled into the obround spacing disk 581. The spacing disk 581 may be provided with one or more openings 584, which may be circular, and/or one or more scallops 585, which may be semi-circular, along a periphery thereof. The spacing disk 581 may be formed of any suitable material, and in some embodiments is formed of a metal which may include steel or aluminum.

Figure 23:
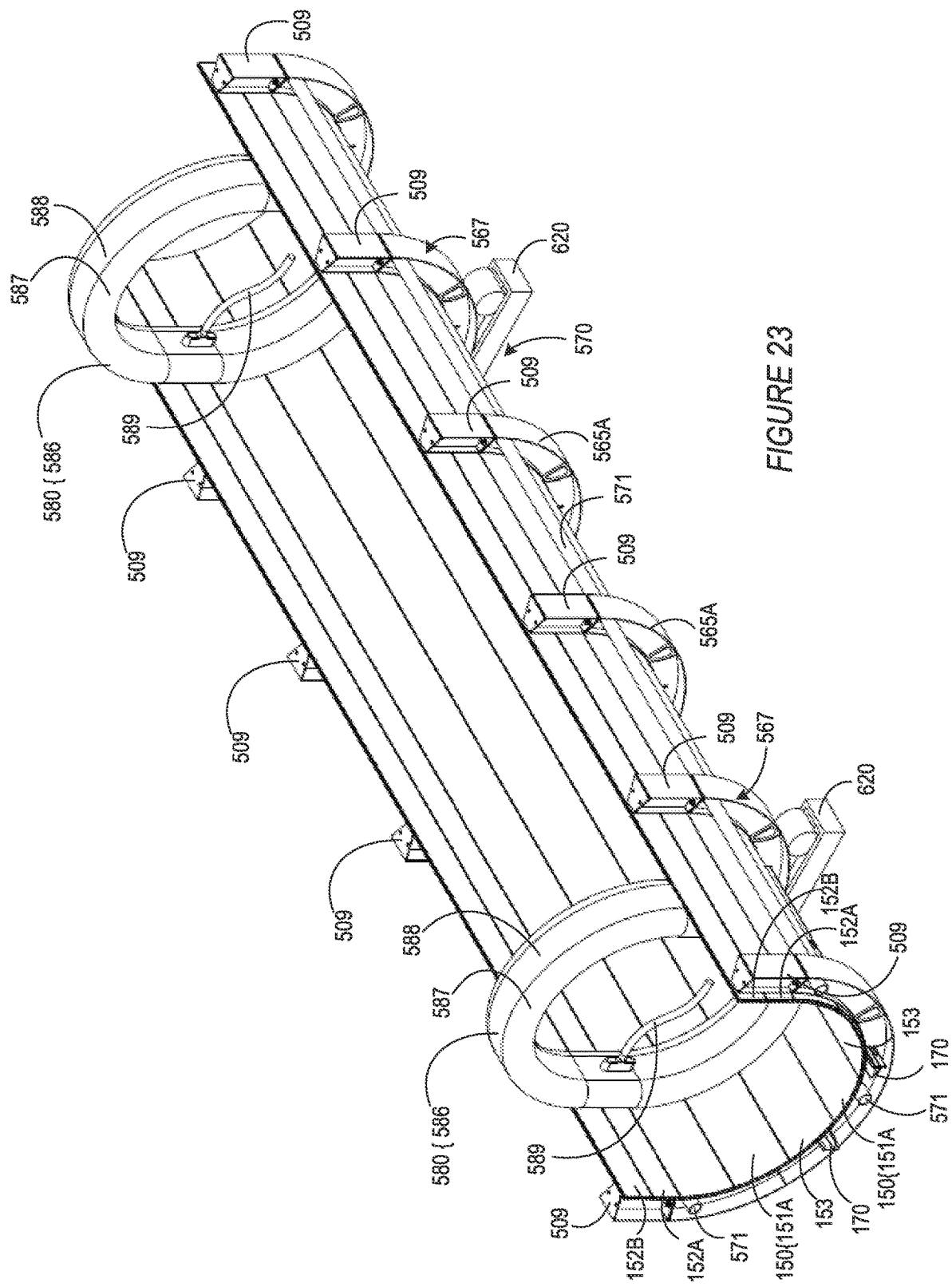
FIG. 23 shows a perspective view of the assembly of FIG. 22 with spacing rings emplaced within the assembled first half-round shell.

Alternatively, as shown in FIG. 23, the spacer 580 may include at least one obround spacing ring 586 comprising an obround rim 587 formed with an outer U-shaped channel sized and shaped fittingly to receive an inflatable tube 588. The rim 587 may be formed of any suitable material, and in some embodiments is formed of a metal, which may include aluminum or steel. The inflatable tube 588 may be formed of any suitable material, and in some embodiments is formed of rubber or plastic. The inflatable tube 588 may comprise any connection means 510 suitable to connect the inflatable tube 588 to a pressure source (not shown), such as a hydraulic or pneumatic pump, operable to pressurize the inflatable tube 588 and thereby to expand an outer periphery of the inflatable tube 588.

In some embodiments, the spacer 580 may be placed in the first semi-cylindrical shell 111A before one or more, or any, of the flat extension panels 152A are placed, or before one or more, or any, of the flat extension panels 152B are placed.

Figure 24:
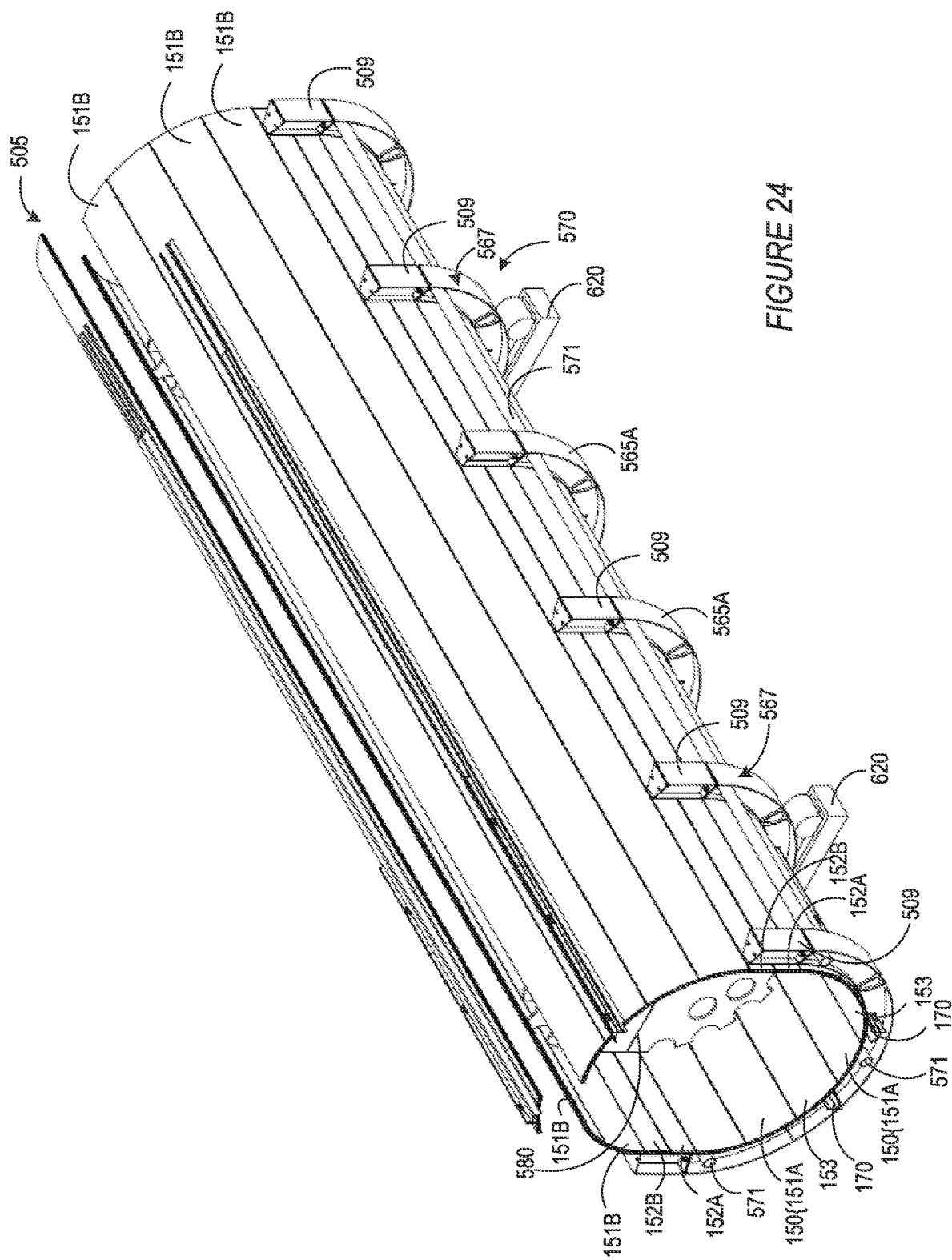
FIG. 24 shows a perspective view of the assembly of FIG. 23 with longitudinally-extended panels of an upper-half round shell emplaced and showing assembly thereof.

As shown in FIG. 24, having placed the at least one spacer 580, as described above, the second semi-cylindrical shell 111B may then be formed from curved panels 151B in substantially the same way as the first semi-cylindrical shell 111A, except instead of laying the panels 151A in the cradle 570 as described, the panels 151B may be laid atop the flat extension panels 152A, 152B and the at least one spacer 580 to form the second semi-cylindrical shell 111B. The at least one spacer 580 may contact respective inside surfaces of at least some of the panels 151B of the second semi-cylindrical shell 111B, and thereby support the second semi-cylindrical shell 111B while maintaining a semi-cylindrical shape of the second semi-cylindrical shell 111B. First ones of the panels 151B may be laid in longitudinal alignment atop corresponding flat extension panels 152B, which may include mating a tongue 158 or groove 159 of a panel 152B with a groove 159 or tongue 158, respectively, at upper longitudinal edge 162 of the corresponding flat extension panel 152B. Laying the remaining panels 151B as described above to form the second-semi-cylindrical shell 111B may include joining the panels 151B at abutting longitudinal edges by mating the tongue 158 of one panel 151B with the groove 159 of an abutting panel 151B to form a joint 160, and joining the multiple panels 151B in sequence.

In this way, an obround shell 505 may be formed from the first semi-cylindrical shell 111A, the flat extension panels 152A, 152B, and the second semi-cylindrical shell 111B. The at least one spacer 580 may space the panels 151A, 151B, 152A, 152B to maintain the obround shape of the obround shell 505. Importantly, the obround shell 505 may be thus assembled without requiring any tack welding. It is common in the art of welding to position items to be welded together and then form tack, or spot, welds as a temporary means to hold the components in the desired positions until final welding can be performed. In some embodiments, the panels 150, including panels 151A, 151B, 152A, 152B and all other panels constituting instances, embodiments, or variants of panels 150 described herein, are free, or substantially free, of tack welds prior to creation of final welds joining adjacent panels 150. The above-described method including use of the cradle 570 and the at least one spacer 580 enables assembly of the obround shell 505 without need for tack welds to maintain the desired positions of the panels 150. Further advantages of the absence of tack welds are discussed below.

Alternatively, in some embodiments tack welds may be used to dispense with the at least one spacer 580. For example, following assembly of the first semi-cylindrical shell 111A and flat extension panels 152A as described above, the curved panels 151A and flat extension panels 152A may be partly fastened, which may be by partial welding, which may be by tack welding, at seams of the joints 160 of the curved panels 151A and flat extension panels 152A, thereby to give the first semi-obround shell 113A a preconfigured partial rigidity. Then, the first semi-obround shell 113A may be removed from the cradle 570, which may be by craning or any other suitable conveyancing means, and the second semi-obround shell 113B may be formed in the cradle 570 in the manner described above with respect to the first semi-obround shell 113A, by sequential assembly of the curved panels 151B and flat extension panels 152B followed by tack welding. Then, the alignment bars 163 may be laid in the upper grooves 159 of flat extension panels 152B, and the first semi-obround shell 113A may be inverted and placed atop the flat extension panels 152B, aligning the respective longitudinal edges of the flat extension panels 152A, 152B, such that the portions of the alignment bars 163 extending from the upper grooves 159 of the flat extension panels 152B are received in the opposing grooves 159 of the flat extension panels 152A, to form the obround shell 505 described above. Alternative methods are also possible, and the principles disclosed herein are applicable to any method wherein the obround shell 505 is formed from panels 150 while maintaining the obround shape of the shell 505.

Figure 25:
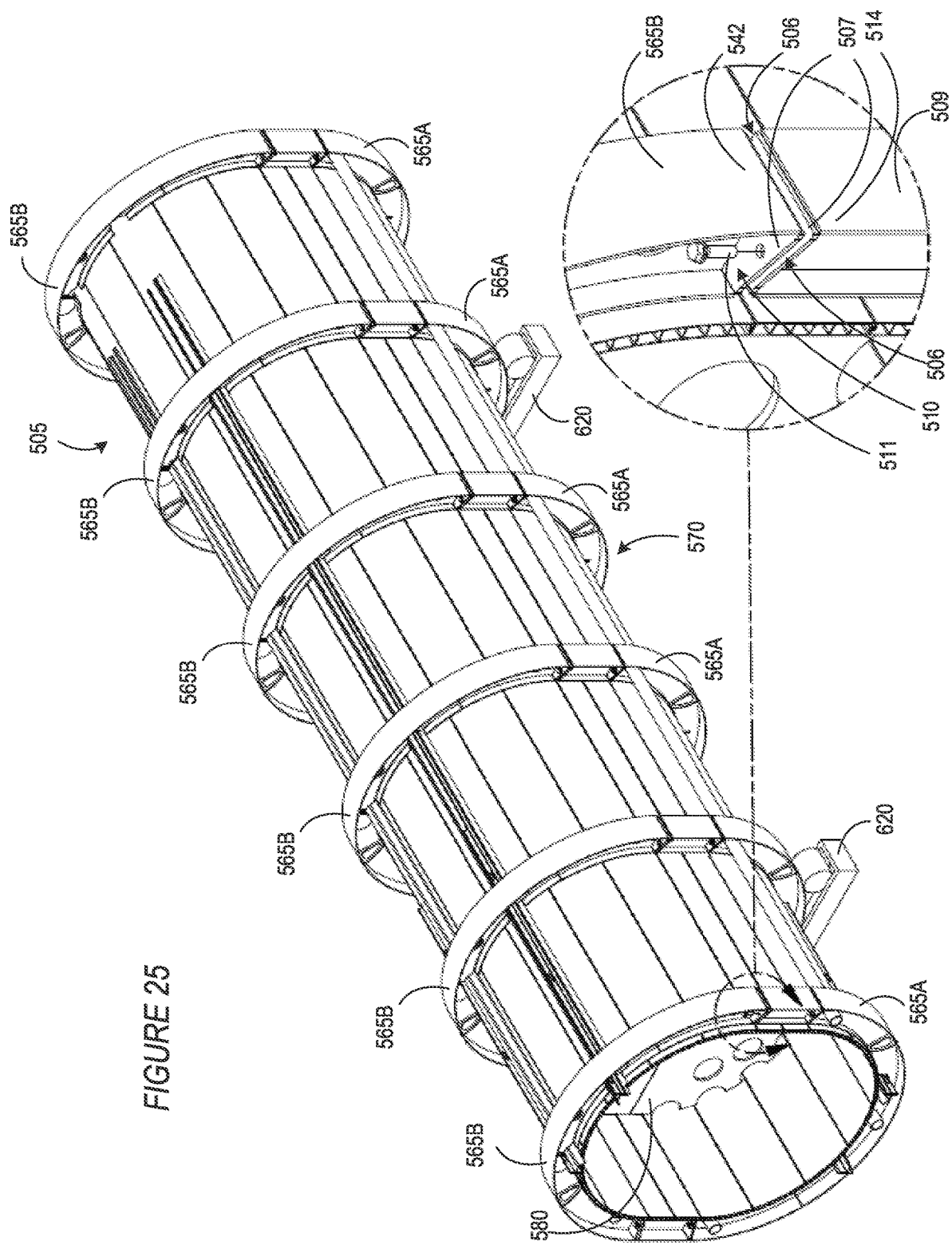
FIG. 25 shows a perspective view of an assembled full-round shell with manufacturing apparatus including multiple collars and tank rollers, with spacing disks in place.

As shown particularly in FIG. 25, having formed the obround shell 505 as described, a second set of the ring segments 565 may be ring segments 565B respectively paired with ring segments 565A which form the cradle 570. As shown especially in FIGS. 17 and 25, the ring segments 565B may be laid atop the obround shell 505 and the bridge segments 509 in pairwise fashion so as to oppose respective adjacent ends 542 of each pair of ring segments 565 (see especially FIG. 17) to form the one or more collars 530 conformably encompassing the obround shell 505. As noted above, the bridge segments 509 may be affixed, which may be by fasteners 548, which may be bolts, to the ring segments 565A at an abutting end 542 of the ring segment 565A. Similarly, the bridge segments 509 may be affixed, which may be by fasteners 548, which may be bolts, to the ring segments 565B at an abutting end 542 of the ring segment 565B. So assembled, the bridge segments 509 may function to urge, guide, or maintain the paired ring segments 565 into lateral, transverse alignment, or to resist transverse misaligned of the pair of opposing adjacent ends 542.

As shown particularly in FIGS. 17 and 25, the collar 530 may be provided with constricting means 510 where the respective ends 542 of the ring segments 565A,565B oppose corresponding ends of the bridge segments 509. For example, the ring segments 565A,565B and bridge segments 509 may include through holes 513 in flanges 507 at the respective adjacent ends 542 of the ring segments 565 where they oppose as noted, and a bolt 511 and nut 512 combination. By inserting the bolt 511 into the through holes 513, threading the nut 512 onto the bolt 511, and tightening the nut 512 in the known manner, the ends 542 may be drawn together, reducing a gap 506 between the end 542 of at least one of the ring segments 565 and the opposing end 514 of the bridge segment 509, causing an inner surface 566 of the collar 530 to apply a substantially uniform force of the outer surface 114 about the periphery of the obround shell 505. In particular, the bridge segments 509 may be sized and shaped, and in particular have a length extending between the opposing ends 542 of the ring segments 565A,565B, so as always to provide a gap 506 between at least one end 542 of the ring segment 565 and the opposing end 514 of the bridge segment 509, so as to provide leeway for operation of the construction means 510 without causing the ring segment 565 and bridge segment 509 to contact and resist or prevent further constriction. In this way, at least some of the pairs of panels 150 may be compressed at their respective joints 160. One or more of the collars 530 may be provided with substantially similar constricting means 510 at each of the respective adjacent ends 542 where the pair of ring segments 565 oppose the bridge segments 509. Alternatively, the pair of ring segments 565 and bridge segment 509 assembly may be provided with a fixed attachment, for example a hinge, at one side, and constricting means 510 at the other side. In some embodiments, the constricting means 510 may include one or more of a ratchet, a cam lever, or a motor. Other configurations are possible to provide the function of constricting the obround shell 505 in order to compress at least some of the pairs of panels 150 at their respective joints 160.

Figure 26:
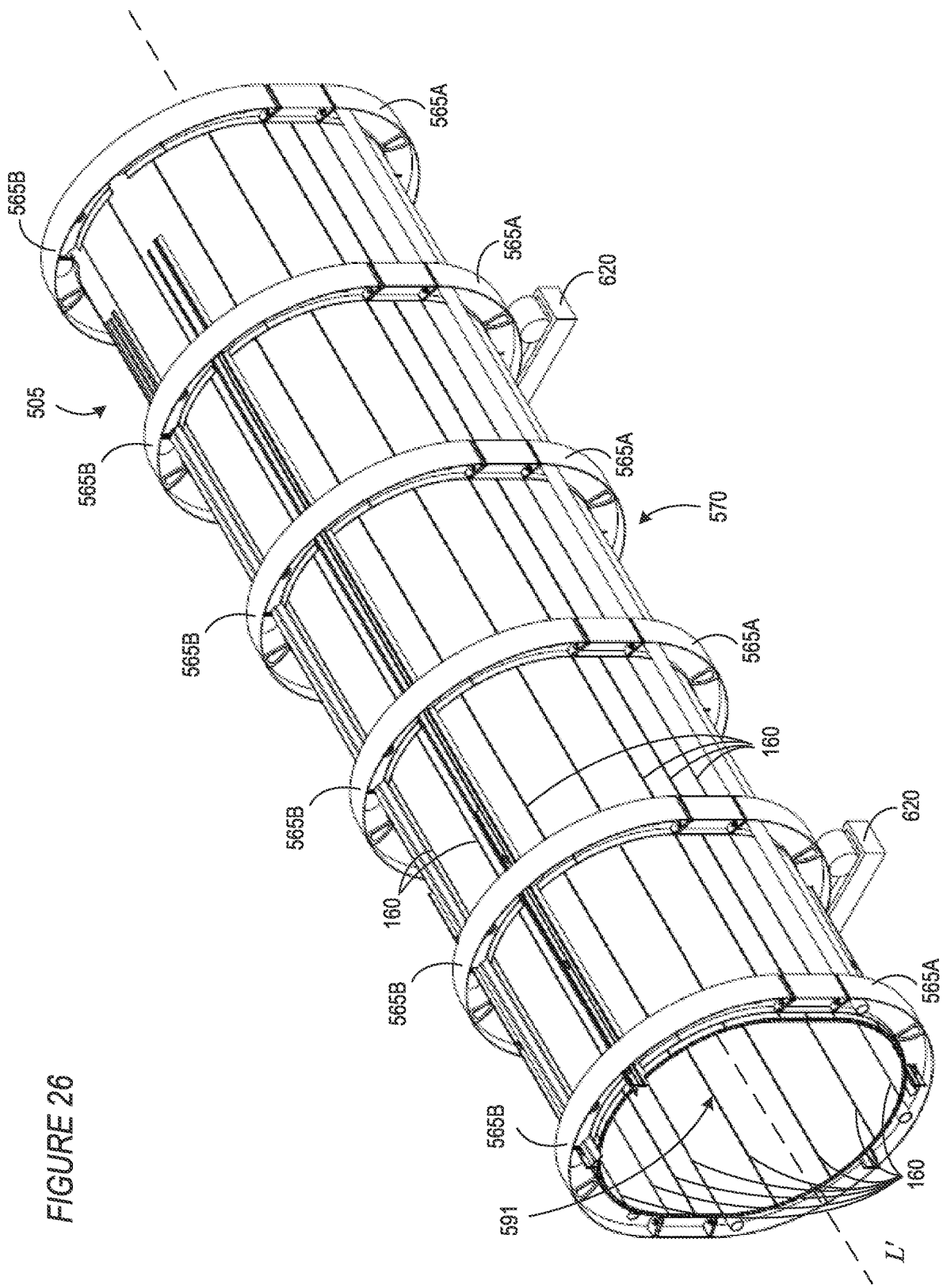
FIG. 26 shows the perspective view of FIG. 25 with spacing disks removed.

Having clamped and constricted the obround shell 505 in this way, it may become unnecessary to retain the spacers 580 in order to maintain the obround shape of the obround shell 505. The pressure developed at the joints 160 may be sufficient to rigidly maintain the obround shape of the obround shell 505. Accordingly, as shown in FIG. 26, the spacers 580 (not shown in FIG. 26, but shown in FIGS. 22 through 25) may be removed leaving the obround shell 505 with an unobstructed hollow interior 591. For example, where the spacers 580 include at least one obround spacing disk 581, removal may include disassembling it into the first semi-disk 582, rectangular plate 579, and second semi-disk 583, for example by loosening of the nuts and removal of the bolts in the aligned through holes which hold the first semi-disk 582, rectangular plate 579, and second semi-disk 583 together, followed by removal of the first semi-disk 582, rectangular plate 579, and second semi-disk 583 from the interior 591 of the obround shell 505. Where the spacers 580 include at least one spacing ring 586, removal may include at least partial release of pressure from the inflatable tube 588 so as at least partially to deflate it thereby to reduce pressure between the inflatable tube 588 and the inside surface of the obround shell 505, followed by removal of the spacing ring 586 from the interior 591 of the obround shell 505.

As discussed above, the obround shell 505 may be formed free, or substantially free, of tack welds or other adjoining alterations or fasteners prior to the formation of final welds to join the panels 150. In such case, the additional advantage may be achieved that the constriction of the obround shell 505 using the collars 530 and constricting means 510 to compress at least some of the pairs of panels 150 at their respective joints 160 may do so more effectively or more optimally, as compared to when tack welds are used, inasmuch as the panels 150, when free or substantially free of tack welds, are more free to move at the joints 160, and thus a more compressed joint 160 may be achieved, thereby enabling a superior final weld.

Figure 27:
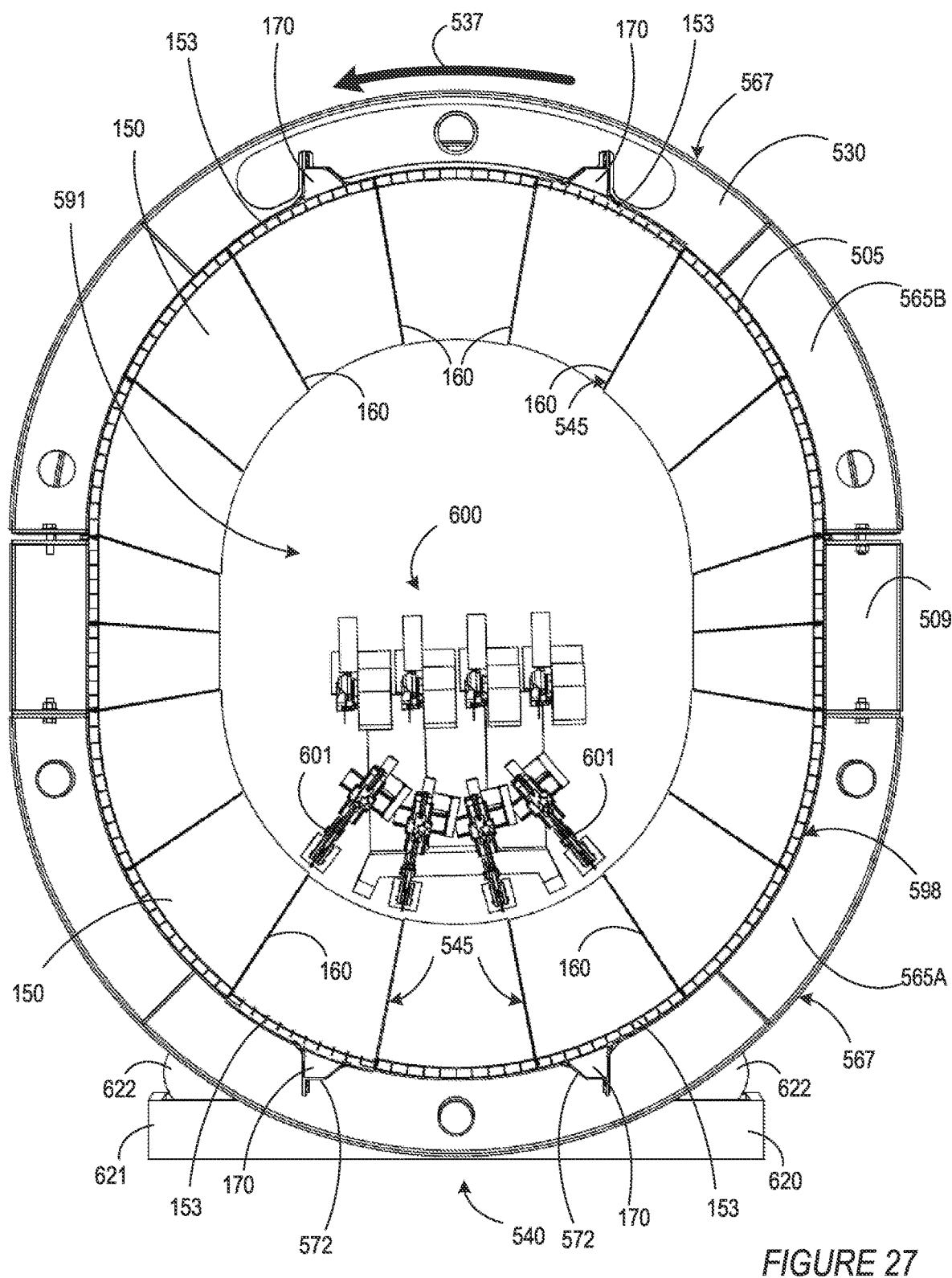
FIG. 27 shows an end view of an assembled full-round shell with manufacturing apparatus including multiple collars and tank rollers, showing a welding apparatus for welding inner seams of the full-round shell.

As shown in FIG. 27, with the hollow interior 591 of the obround shell 505 unobstructed, the inner seams 545 of the joints 160 of respective pairs of panels 150 may be welded in a single welding operation to produce a welded inner seam. The welded inner seams may be formed using any suitable welding technique or equipment, which may include manual welding, or automated or robotic welding. For example, as shown in FIG. 27, multiple inner seams 545 may be welded using a welding carriage 600 having multiple, which may be four, welding torches 601 operative to weld multiple, which may be four or any other number, of the inner seams 545 in a single welding operation. Alternative suitable arrangements are contemplated.

As is known in the art, superior welds are usually formed when the heat source is applied directly vertically above the seam to be welded, such that the weld pool formed by fusion of the materials at the joint rests in the seam and is not drawn, or is minimally drawn, by gravity away from the joint. When the heat source is not directly vertically above the seam, but is displaced angularly from this position, and especially if it is directly vertically below the seam, then there may occur at least some flow of the weld pool away from an optimal position in the joint, and the quality of the weld may be reduced. Thus, it is preferable to weld 'downwardly', that is with the heat source directly vertically above the seam to be welded, or at least to minimize the degree of departure from this arrangement.

Thus, in order to produce a superior welded seam, the assembly of the obround shell 505 and collars 530 may be rolled, or rotated (illustrated by arrow 537) about the longitudinal axis L' of the obround shell 505 (shown in FIG. 26) to bring each joint 160 to a lower position 540 (shown in FIG. 27), and the inner seam 545 may be welded to produce the welded inner seam when at the lower position 540. The lower position 540 may be substantially the lowermost point on the inner periphery of the obround shell 505, or in other words the lower position 540 may be plumb the longitudinal axis L'. Alternatively, as shown in FIG. 27, when multiple inner seams 545 are welded at the same time as described above, the welding position for a given seam 545 may be angularly displaced from the lowermost point 540 by a predetermined or limited amount. Without limitation, a joint 160 may be angularly displaced from the lowermost point by less than about 90°, or less than about 70°, or less than about 45°, or less than about 10°. Positioning of the inner seam 545 in this way which enables the production of a welded inner seam of superior strength and quality as compared to a welded seam when the seam must be welded not downwardly, but instead upwardly or at an intermediate angle.

In order to roll the assembly of the obround shell 505 and the collars 530, the assembly may be placed on a rolling apparatus configured to enable the above-described rolling of the assembly of the obround shell 505 and the collars 530. For example, the rolling apparatus may include one or more, which may be at least a pair, of tank rollers 620 including a base 621 and at least a pair of cylindrical rollers 622 mounted on the base. As shown in FIGS. 17 to 19 and 22 to 27, the rollers 622 may contact and support outer surfaces 567 of corresponding collars 530. The tank rollers 620 may include one or more motors (not shown) to drive one or more of the rollers 622. The assembly of the obround shell 505 and the collars 530 may be smoothly and easily rolled about the longitudinal axis L' using the tank rollers 620. Moreover, by supporting the collars 530 with the rollers 622 of the tank rollers 620 as opposed to the outer surface 598 of the obround shell 505, if the obround shell 505 includes one or more panels 153 formed with a profile or projection, which may be longitudinal rails 170, and the collars 530 include may ring segments 565 formed with corresponding recesses 572 (best shown in FIG. 17), then the projections impose no obstacle to the smooth and uninterrupted rolling of the assembly of the obround shell 505 and the collars 530 through one or more full rotations about the longitudinal axis L'.

The assembly of the obround shell 505 and the collars 530 may be placed on the tank rollers 620 after assembly, by using a crane or other conveyancing means, for example, or as shown in FIGS. 18, 19 and 22 to 27, the cradle 570 may initially be formed and positioned on the tank rollers 620 and the assembly of the obround shell 505 and the collars 530 may be assembled while the cradle 570 is supported by the tank rollers 620.

The inner seam 545 of each joint 160 may be welded by any suitable means. For example, each inner seam 545 may be welded manually by a human welder using a welding apparatus, and this may be facilitated by the absence of any obstacle within the unobstructed hollow interior 591 of the obround shell 505. The welding apparatus may include a handheld torch, or alternatively, as shown in FIG. 27, may include a welding carriage 600 including one or more welding torches 601. When the welding carriage 600 has multiple welding torches 601, the welding carriage 600 may be operable to weld multiple inner seams 545 at a time, per motion of the of the welding carriage 600 from one end of the obround shell 505 to the other end, and for each set of multiple seams 545 the obround shell 505 may be rolled either to position one of the multiple seams 545 at the lowermost position 540, or instead to position a midpoint amongst the multiple seams 545 at the lowermost position 540 so as to minimize a displacement of each seam from the lowermost position 540.

The form and nature of the welding apparatus may depend on the material of the panels 150, and in general will be selected according to the material of the panels 150. For example, when the panels 150 are formed of aluminum, the welding apparatus may include any suitable welding technology, appropriate for the material to be welded, and in some embodiments includes steel or aluminum welding technologies, which may include constant voltage, constant current, pulsed welding, or laser welding technology.

Figure 28:
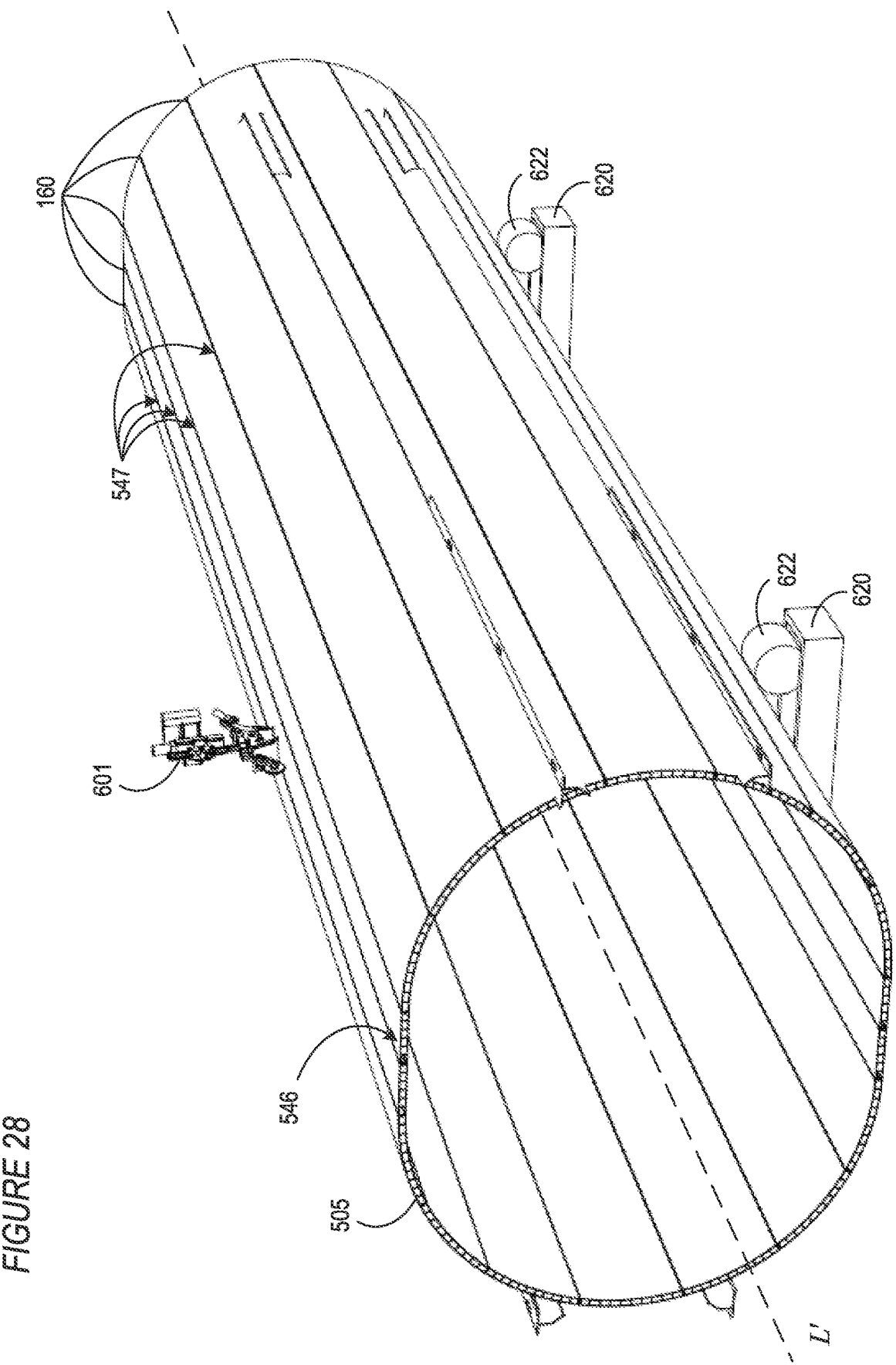
FIG. 28 shows a perspective view of an assembled full-round shell with manufacturing apparatus including tank rollers, showing a welding apparatus for welding outer seams of the full-round shell.
Figure 29:
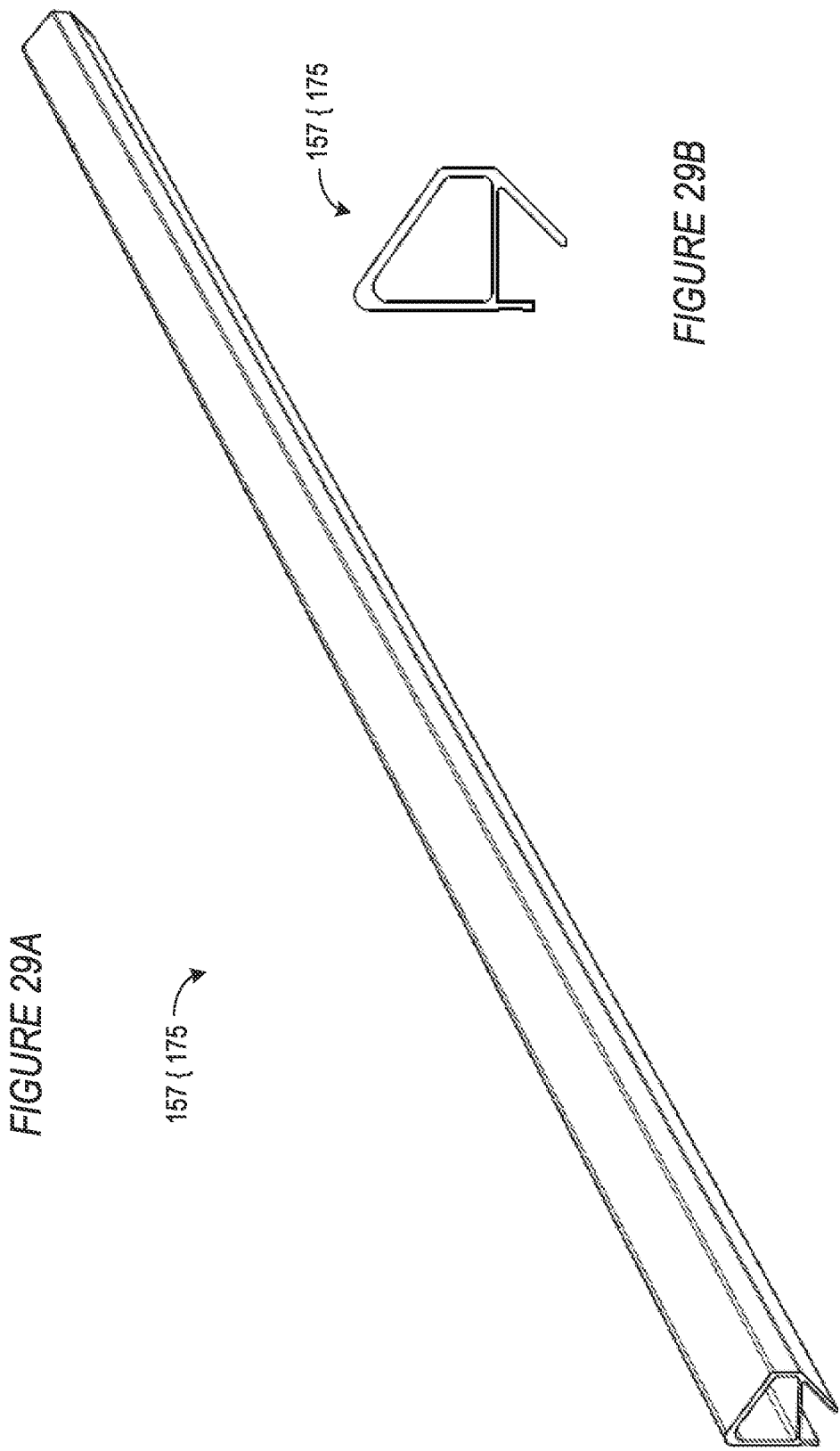
FIGS. 29A & 29B respectively show perspective and end views of a top rail.
Figure 30:
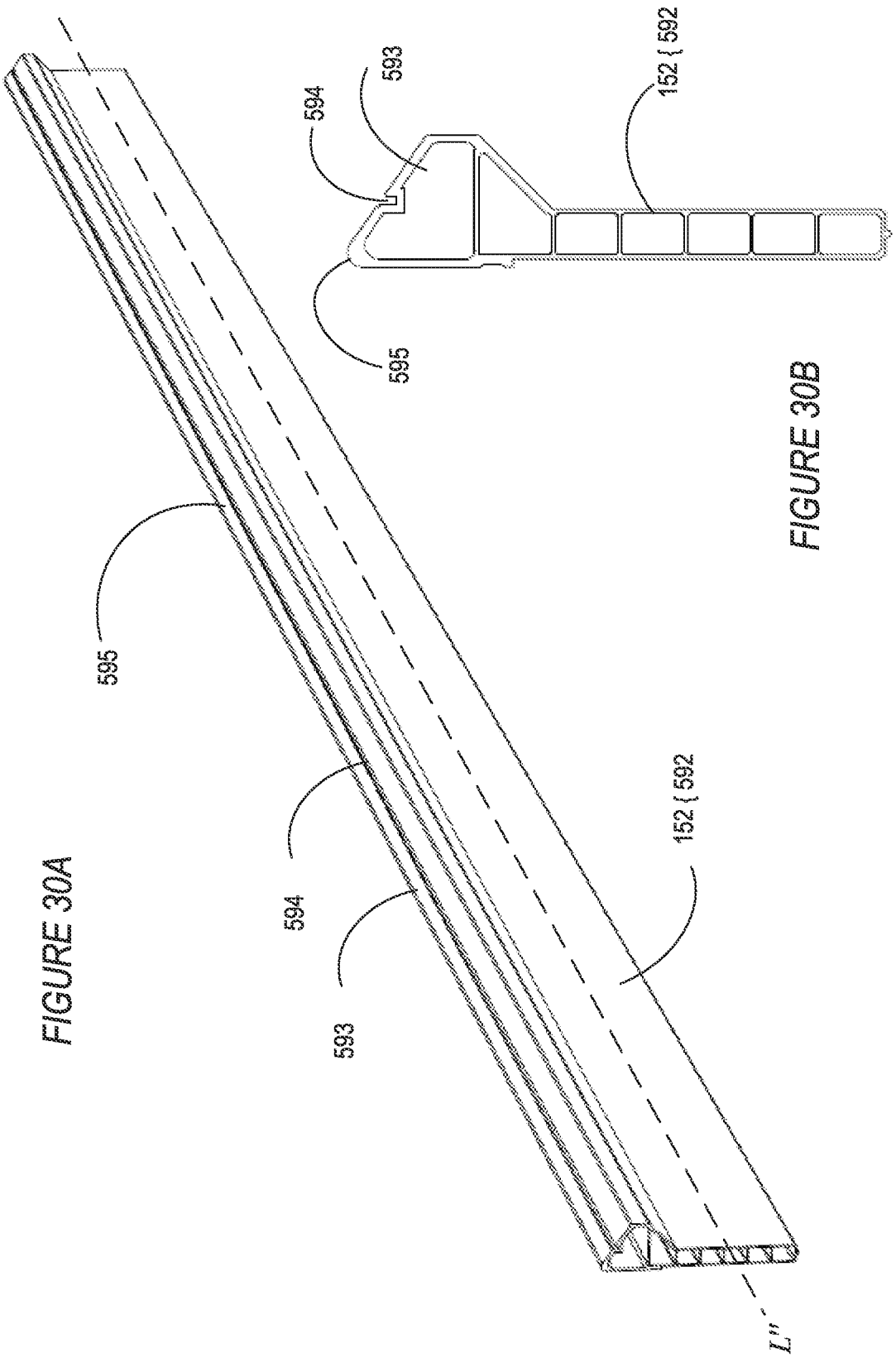
FIGS. 30A & 30B respectively show perspective and end views of a longitudinally-extended flat extension panel with an integrated top rail.

As shown in FIG. 28, once all of the inner seams 545 of the joints 160 are welded to form welded inner seams, the outer seams 547 of the joints 160 may be welded to form welded outer seams. The collars 530 may be removed in order to expose the entire outer surface 598 of the obround shell 505, including the entire length of each outer seam 547 without obstacle. For example, the assembly of the obround shell 505 and collars 530 may be lifted using a crane or other conveyancing means, the collars 530 may be removed by unfastening the constricting means 510 and separating and removing the ring segments 565, and the obround shell 505 may be replaced on the tank rollers 620. The welded inner seams 545 may provide sufficient structural strength to the obround shell 505 that substantially no movement, or minimal movement, or movement within preconfigured tolerances, occurs of the panels 150 relative to one another during movement of the obround shell 505.

When the rolling apparatus includes the tank rollers 620, as shown in FIG. 28, the obround shell 505 may be rolled, or rotated, about its longitudinal axis L' to bring each outer seam 547 in turn to an upper position 546, which may be substantially the uppermost point on the outer periphery of the obround shell 505. Each outer seam 547 may be welded to form a welded outer seam 547 in substantially the same way as the inner seams 545 are welded to form the welded inner seams 545. Thus, as shown in FIG. 28, a welding apparatus, such as welding torch 601, may be provided and suspended above the obround shell 505. As was the case with the inner seams 545, positioning of the outer seam 547 at the upper position 546 and disposition of the welding apparatus 601 directly above the outer seam 547, thereby enabling vertically downward welding of the outer seam 547, may enable the production of a welded outer seam 547 of superior strength and quality as compared to a welded seam when the seam must be welded not downwardly, but instead upwardly or at an intermediate angle.

Alternatively, the rolling apparatus may include or be similar to the raised roller apparatus substantially as disclosed in WIPO International Publication No. WO 2018/112622 A1, the entirety of which is incorporated herein by reference.

Providing welded inner seams 545 and welded outer seams 547 may provide for a stronger and more water-tight weld, as compared to providing only welded inner seams 545 or only welded outer seams 547. In some embodiments, however, it may be sufficient to provide only welded inner seams 545 or only welded outer seams 547, and yet provide a welded shell with sufficient strength, integrity, and/or water-tightness, for the particular application of the embodiment. In such case, manufacture of the obround shell 505 may be simplified.

As indicated above, the method 300 may be useful to make two containers 110A, 110B in a single manufacturing process. As noted above, the obround shell 505 may constitute two instances 113A, 113B of semi-obround shell 113. Thus, in the above-described process of welding the joints 160 of adjacent pairs of panels 150, the joint 160AB formed between the respectively opposing flat extension panels 152A, 152B coupled using the alignment bars 163 may be left unwelded. Once all of the remaining joints 160 are welded as described above, the two semi-obround shells 113A, 113B may then be separated and assembled with any further components described herein or otherwise to form completed containers 110A, 110B.

For example, and as described above and shown in FIGS. 5, 10 & 11, the container 110 may include longitudinal top rails 157 atop each flat extension panel 152. One embodiment of the top rails 157 may be top rails 175 which are separate members, shown in FIGS. 29A & 29B, mounted atop each flat extension panel 152. In such case, following the manufacture of the two instances 113A, 113B of semi-obround shell 113 as described above, corresponding longitudinal top rails 175 may be mounted in longitudinal alignment atop each flat extension panel 152A, 152B, as shown particularly in FIG. 11. As described above, the top rail 175 may have legs 161 sized, shaped, and configured to sandwich and contact opposing surfaces of the flat extension panel 152A, 152B at or near a top end of the flat extension panel 152A, 152B, and the legs 161 may be fastened to the flat extension panel 152A, 152B at or about portions of the legs 161 which contact the flat extension panel 152A, 152B, which may be by welds.

The assembly of the two semi-obround shells 113A, 113B having flat extension panels 152A, 152B held in alignment using alignment bars 163 provides certain important advantages. The welding of workpiece joints often generates mechanical stress and strain in the workpieces which is not always fully predictable in nature. Without securing the workpieces in place in their entirety, the workpieces can strain, twist, and bend during the welding of the joint, with the result that the workpieces are not only maintained in such twisted or bent configuration following welding, but also in that the weld is of less-than-optimal integrity or strength given the relative motion of the workpieces at the joint during the welding process. It is therefore desirable for both workpieces to be held rigidly in place during the welding of the joint formed therebetween, both so that the welded joint is of maximum integrity and strength, but also so that the workpieces maintain the same general shape and relative configuration that they possessed prior to welding. The above-described method 300 provides such advantages.

In this connection, and as an alternative to the method described above, a single semi-obround shell 113 may be manufactured separately by following the procedure to the point where the flat extension panels 152 are laid atop the respectively opposing panels 151 of the semi-cylindrical shell 111. The upper end 542s of the flat extension panels 152 at each transverse side of the semi-obround shell 113 could then be held in place along part of or an entire length of the flat extension panels 152 with clamps, jigs, or other structures, in order to resist or prevent the above-describe twisting or bending of the members of the semi-obround shell 113 during the welding of the multiple joints 160. However, the above-described method using the flat extension panels 152A, 152B and alignment bars 163 not only advantageously holds each semi-obround shell 113A, 113B in place during the welding process, thereby minimizing or preventing twisting or bending of the members of the semi-obround shells 113A, 113B during welding of the multiple joints 160, it also provides the advantage of reduced time and increased efficiency of the manufacturing process, inasmuch as the coupling of the corresponding flat extension panels 152A, 152B at each transverse side using the alignment bars 163 may be done quickly in a single step, and moreover once the joints 160 have been welded the two semi-obround shells 113A, 113B may be quickly and easily separated into two without requiring the removal of any clamps, jigs, or other structure.

In this connection, and as a variant of the above-described method, and as shown in FIGS. 30A & 30B, a flat extension panel 592 may be substantially similar to flat extension panel 152, and may include and be integral with a top rail 593, which may be substantially similar to top rail 175, except in that it is integral with flat extension panel 592. In particular the flat extension panel 592 with top rail 593 may be characterized by a uniform transverse cross-section perpendicular to a longitudinal axis L" of the flat extension panel 592 and along an entire length of the longitudinal axis L". Consequently, and advantageously, the flat extension panel 592 with integral top rail 593 may be manufactured by extrusion in a single extrusion operation. In order, then, that two instances 113A, 113B of semi-obround container 113 may be manufactured in a single operation as described above, flat extension panels 592A,592B may be provided in place of flat extension panels 152A, 152B, and the method 300 may be performed substantially as described and shown.

Figure 31:
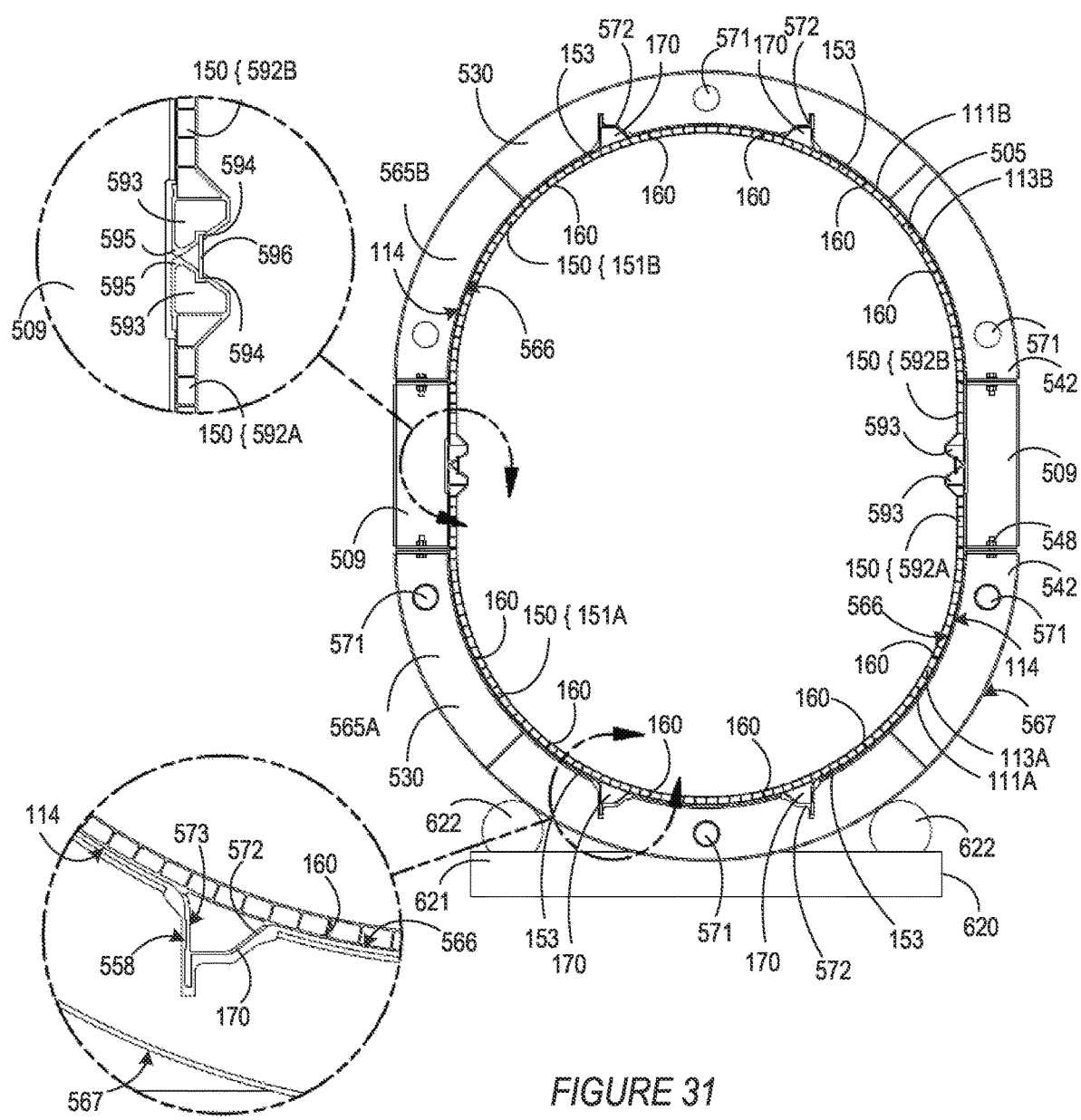
FIG. 31 shows an end view of an assembled full-round shell and manufacturing apparatus including collars and tank roller.
Figure 32:
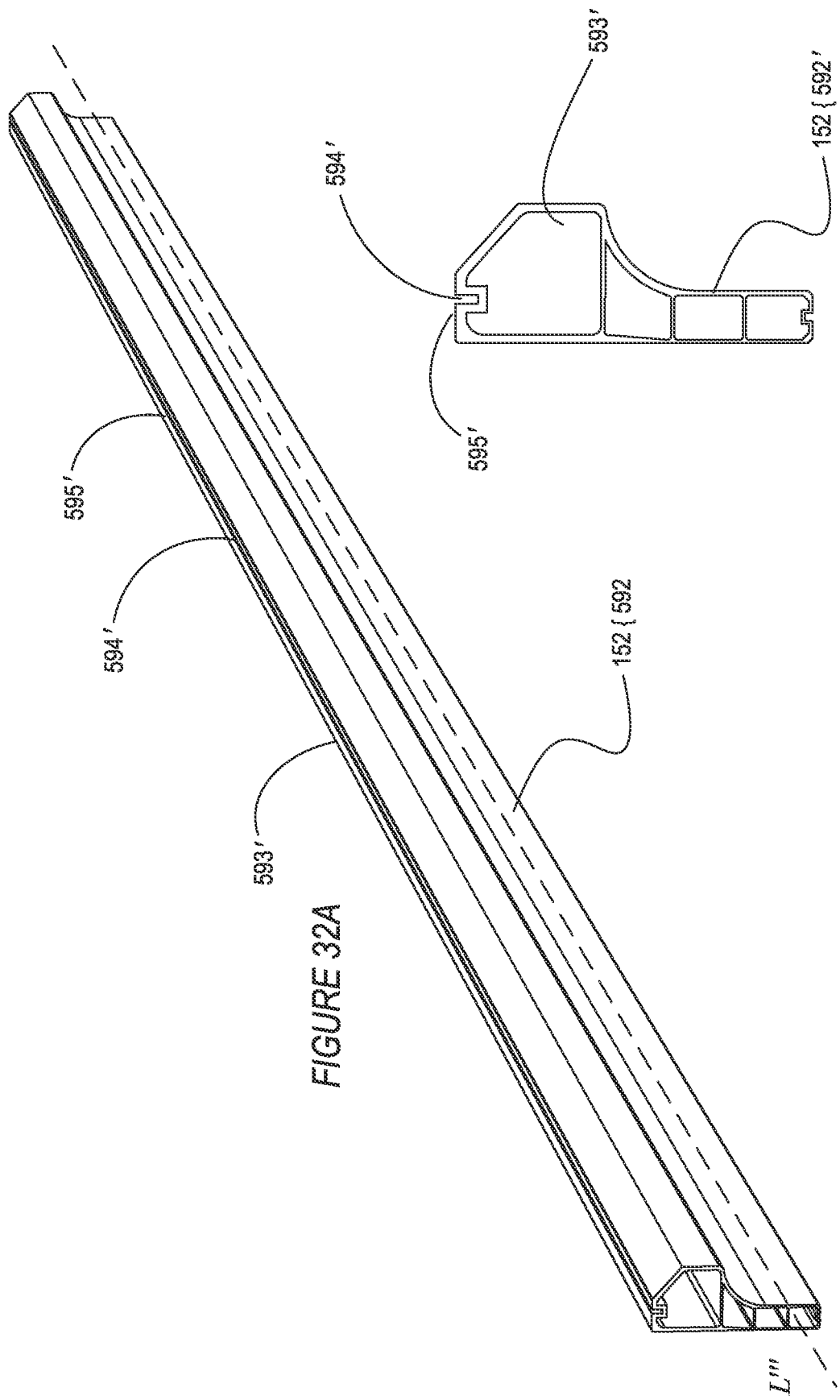
FIGS. 32A & 32B respectively show perspective and end views of a longitudinally-extended flat extension panel with an integrated top rail.

Specifically, the integral top rails 593 of the corresponding flat extension panels 592 mounted atop opposing first semi-cylindrical shell 111A and second semi-cylindrical shell 111B, as described above, may include upper grooves 594, which may be substantially similar to and perform a substantially similar function as the upper grooves 159 of flat extension panels 152A, 152B. Specifically, and as shown in FIG. 31, the method 300 may proceed substantially as described above, except that flat extension panels 592 with integral top rails 593 may be provided in place of each instance of the flat extension panels 152A, 152B. The result is that opposing upper edges 595 of the corresponding flat extension panels 595 may be brought into alignment and contact or close proximity, and alignment bar 596, which may be substantially similar in characteristics and function to alignment bar 163, may be received in corresponding opposing longitudinally extended grooves 594. As described above in connection with alignment bar 163, the use of alignment bar 596 in this way advantageously holds each semi-obround shell 113A, 113B including flat extension panels 592A,592B in place during the welding process, thereby minimizing or preventing twisting or bending of the members of the semi-obround shells 113A, 113B during welding of the multiple joints 160, and also provides the advantage of reduced time and increased efficiency of the manufacturing process, inasmuch as the coupling of the corresponding flat extension panels 592A,592B at each transverse side using the alignment bars 596 may be done quickly in a single step, and once the joints 160 have been welded the two semi-obround shells 113A, 113B may be quickly and easily separated into two without requiring the removal of any clamps, jigs, or other structure. In addition, by providing flat extension panels 595A,595B with integrated top rails 592 having grooves 594 useful with alignment bars 596 as described above, the additional step of installing top rails 175 following assembly of the semi-obround shells 113A, 113B can be avoided, or in other words semi-obround shells 113A, 113B having integrated top rails 592 can be assembled in a single manufacturing procedure, thereby reducing manufacturing time, complexity, and cost.

In a further variant of the above-described method, and as shown in FIGS. 32A & 32B, a flat extension panel 592' may be substantially similar to flat extension panel 592, and may include and be integral with a top rail 593'. The flat extension panel 592' with top rail 593' may be characterized by a uniform transverse cross-section perpendicular to a longitudinal axis L''' of the flat extension panel 592' and along an entire length of the longitudinal axis L'''. Consequently, and advantageously, the flat extension panel 592' with integral top rail 593' may be manufactured by extrusion in a single extrusion operation. In order, then, that two instances 113A, 113B of semi-obround container 113 may be manufactured in a single operation as described above, flat extension panels 592'A,592'B may be provided in place of flat extension panels 152A, 152B, and the method 300 may be performed substantially as described and shown.

Figure 33:
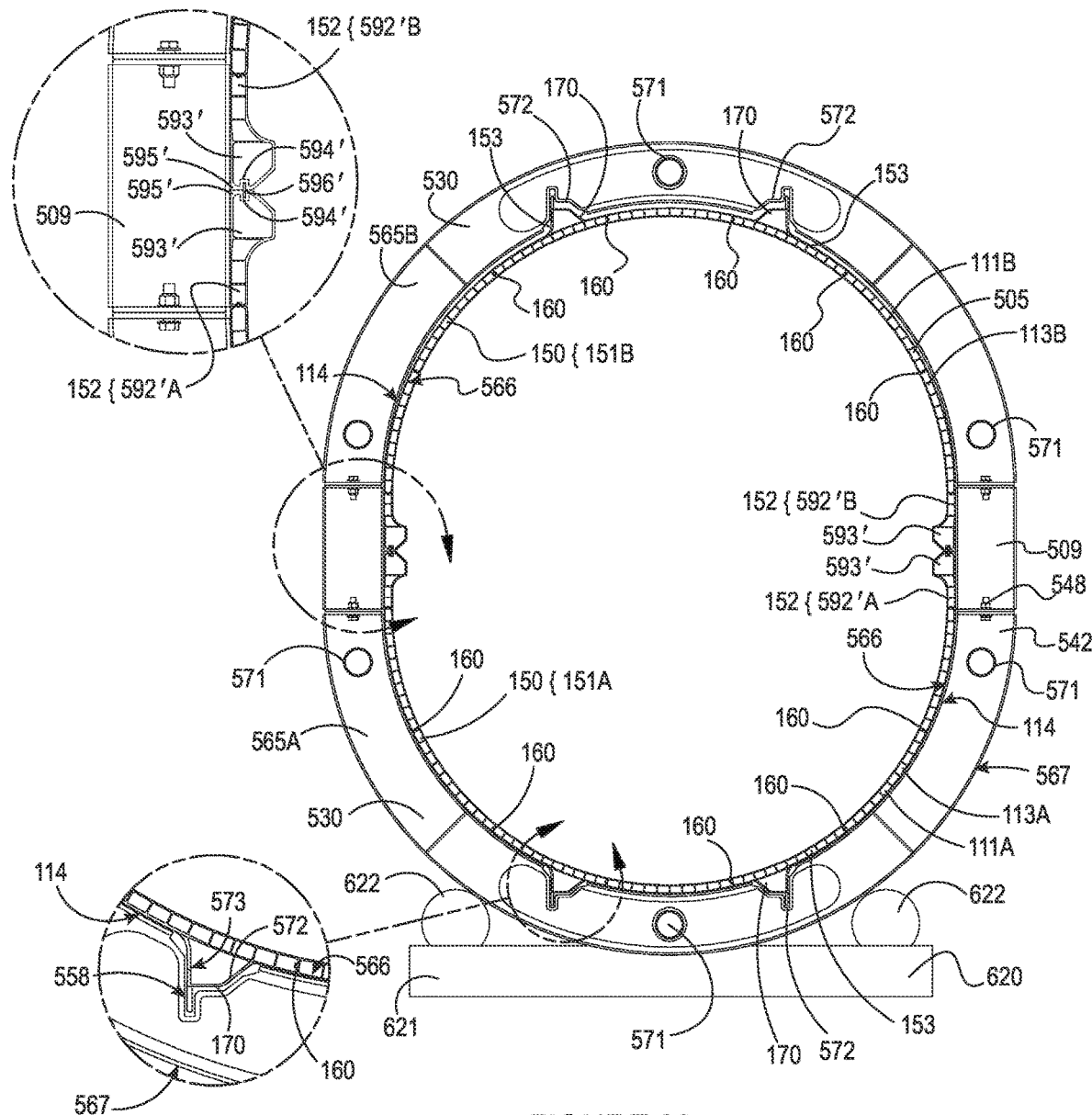
FIG. 33 shows an end view of an assembled full-round shell and manufacturing apparatus including collars and tank roller.
Figure 36:
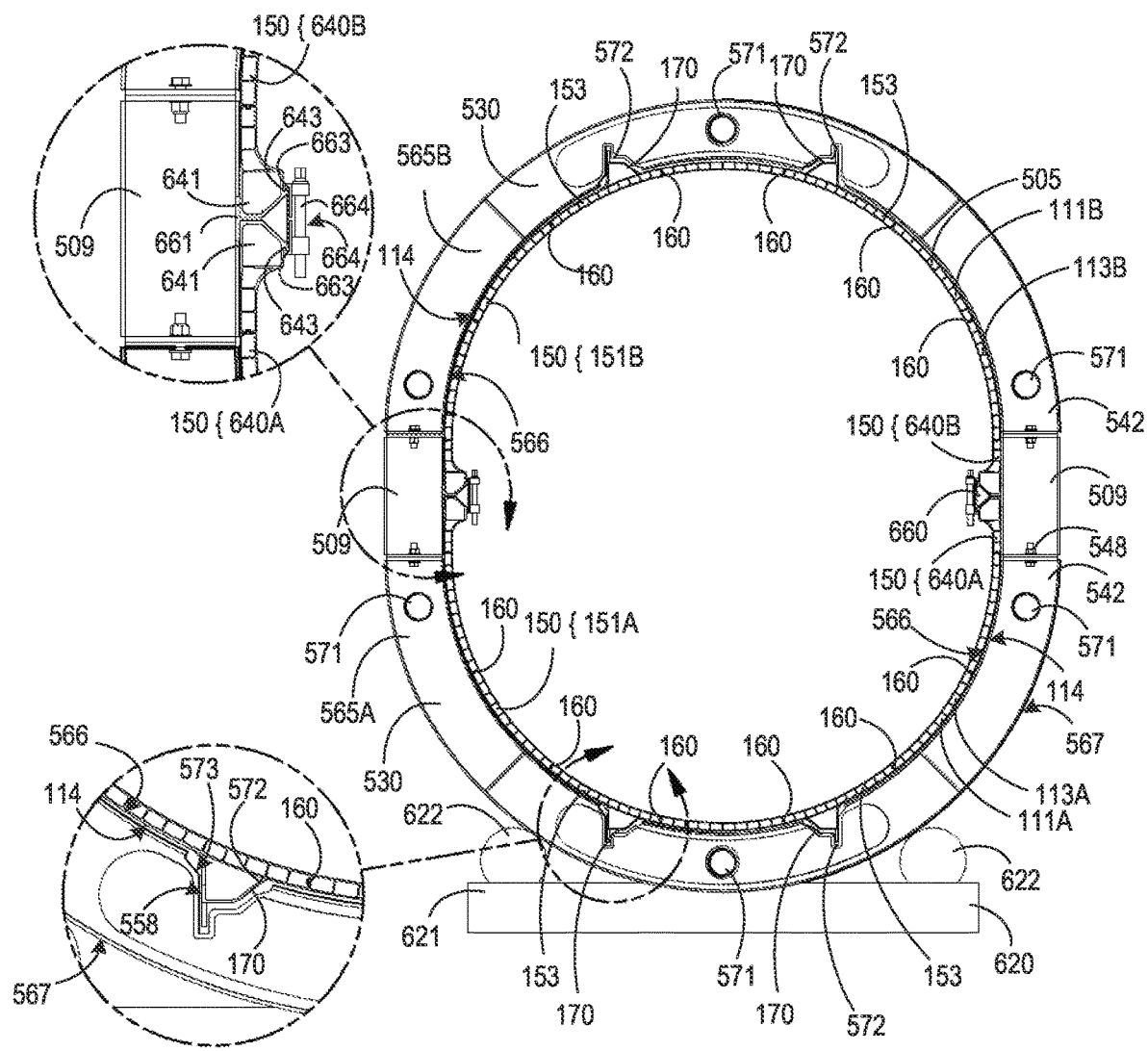
FIG. 36 shows an end view of an assembled full-round shell and manufacturing apparatus including collars and tank roller.
Figure 37:
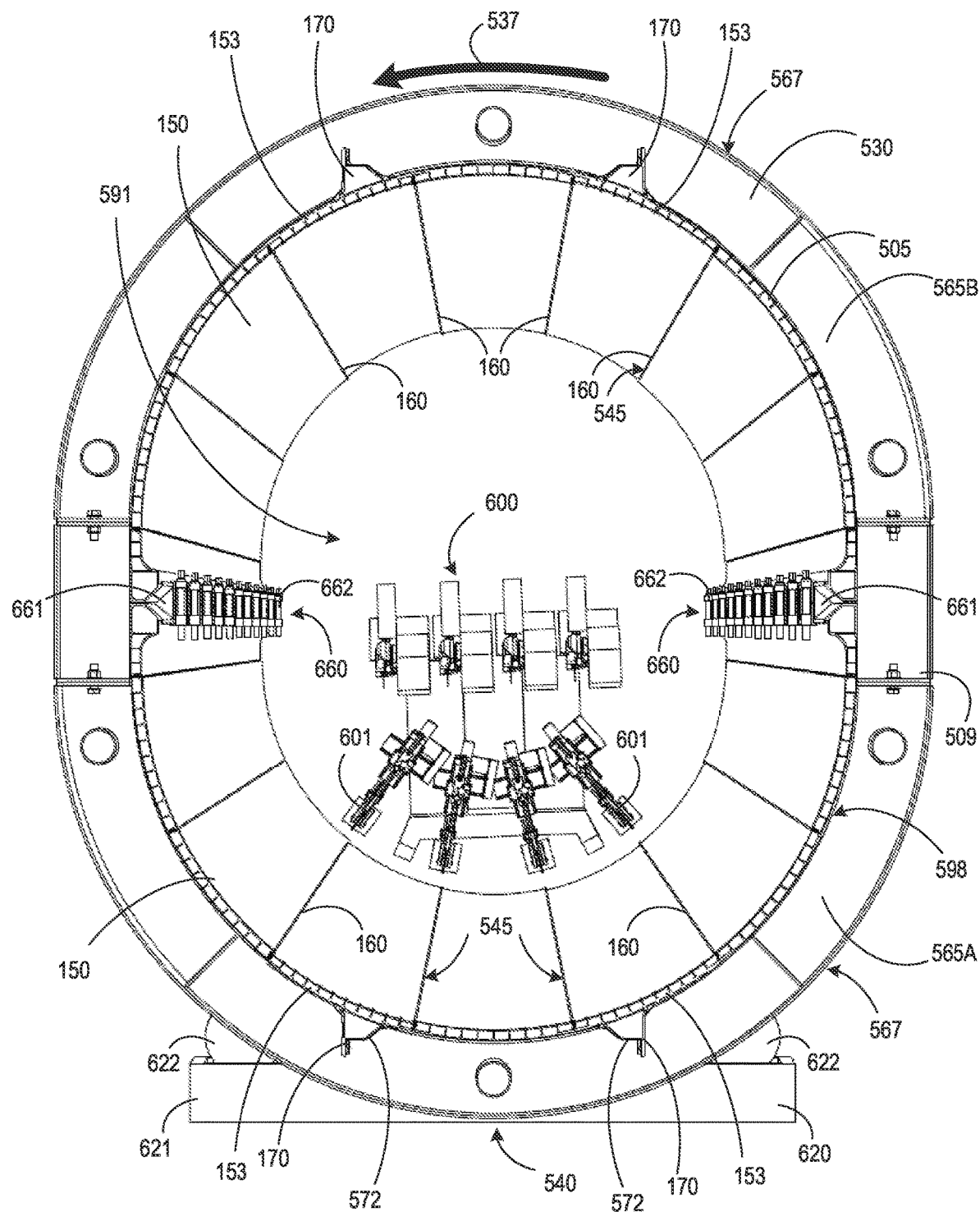
FIG. 37 shows an end view of an assembled full-round shell with manufacturing apparatus including multiple collars and tank rollers, showing a welding apparatus for welding inner seams of the full-round shell.

Specifically, the integral top rails 593' of the corresponding flat extension panels 592' mounted atop opposing first semi-cylindrical shell 111A and second semi-cylindrical shell 111B, as described above, may include upper grooves 594', which may be substantially similar to and perform a substantially similar function as the upper grooves 159 of flat extension panels 152A, 152B. Specifically, and as shown in FIG. 33, the method 300 may proceed substantially as described above, except that flat extension panels 592' with integral top rails 593' may be provided in place of each instance of the flat extension panels 152A, 152B. The result is that opposing upper flat edges 595' of the corresponding flat extension panels 595' may be brought into alignment and contact or close proximity, and alignment bar 596', which may be substantially similar in characteristics and function to alignment bar 163, may be received in corresponding opposing longitudinally extended grooves 594'. As described above in connection with alignment bar 163, the use of alignment bar 596' in this way advantageously holds each semi-obround shell 113A, 113B including flat extension panels 592'A,592'B in place during the welding process, thereby minimizing or preventing twisting or bending of the members of the semi-obround shells 113A, 113B during welding of the multiple joints 160, and also provides the advantage of reduced time and increased efficiency of the manufacturing process, inasmuch as the coupling of the corresponding flat extension panels 592'A,592'B at each transverse side using the alignment bars 596' may be done quickly in a single step, and once the joints 160 have been welded the two semi-obround shells 113A, 113B may be quickly and easily separated into two without requiring the removal of any clamps, jigs, or other structure. In addition, by providing flat extension panels 595'A,595'B with integrated top rails 592' having grooves 594' useful with alignment bars 596' as described above, the additional step of installing top rails 175 following assembly of the semi-obround shells 113A, 113B can be avoided, or in other words semi-obround shells 113A, 113B having integrated top rails 592' can be assembled in a single manufacturing procedure, thereby reducing manufacturing time, complexity, and cost.

A yet further alternative is illustrated in FIGS. 34 to 37. The flat extension panel 152 may be flat extension panel 640 which, similar to flat extension panel 592, has an integral top rail 641, and has a uniform transverse cross-section perpendicular to a longitudinal axis L'''' of the flat extension panel 640 and along an entire length of the longitudinal axis L''''. Consequently, and advantageously, the flat extension panel 640 with integral top rail 641 may be manufactured by extrusion in a single extrusion operation. In order, then, that two instances 113A, 113B of semi-obround container 113 may be manufactured in a single operation as described above, flat extension panels 640A,640B may be provided in place of flat extension panels 152A, 152B, and the method 300 may be performed substantially as described and shown.

The integral top rails 641 of the corresponding flat extension panels 640 mounted atop opposing first semi-cylindrical shell 111A and second semi-cylindrical shell 111B, as described above, may include a clamping lip 643, as shown best in FIG. 34B. As shown in FIGS. 35A to 37, the method 300 may proceed substantially as described above, except that flat extension panels 640A,640B with integral top rails 641 may be provided in place of each instance of the flat extension panels 152A, 152B. In place of the alignment bar 163 discussed above, at least one clamping jig 660 may instead be provided atop the top rails 641 of the flat extension panels 640A of the first semi-obround shell 113A, and the flat extension panels 640B of the second semi-obround shell 113B may be laid atop the at least one clamping jig 660 with corresponding end surfaces 642 of pairs of flat extension panels 640A,640B opposing. For example, as shown best in FIG. 35C, the at least one clamping jig 660 may include an alignment form 661 which is sandwiched between the opposing end surfaces 642 (shown in FIG. 36), as well as a pair of clamps 662 including corresponding engagement lips 663 sized, shaped, and configured for engagement with corresponding clamping lips 643 of the opposing top rails 641 of the flat extension panels 640A,640B. The at least one clamping jig 660 may further have a contraction device 664 operable selectively to draw together the engagement lips 663 (illustrate by arrows 665) and therefore the clamping lips 643 when engaged respectively with the engagement lips 663. The at least one clamping jig 660 may be operable when in coupling engagement with the corresponding flat extension panels 640A, 640B as described and shown to maintain longitudinal alignment or resist longitudinal misalignment of the top rails 641 of the flat extension panels 640A,640B.

The use of clamping jigs 660 in this way advantageously holds each semi-obround shell 113A, 113B including flat extension panels 640A,640B in place during the welding process, thereby minimizing or preventing twisting or bending of the members of the semi-obround shells 113A, 113B during welding of the multiple joints 160. Once the inside seams of the joints 160 of each semi-obround shell 113A, 113B have been welded, the clamping jigs 660 may be further operable to hold the two semi-obround shells 113A, 113B with joints 160 having welded inner seams together, which may facilitate rolling of the obround shell 505 about the longitudinal axis L' for welding of the outer seams of the joints 160, as described above, once the collars 530 are removed. The two semi-obround shells 113A, 113B may then be quickly and easily separated into two, and by providing flat extension panels 640A,640B with integrated top rails 641 as described above, the additional step of installing top rails 175 following assembly of the semi-obround shells 113A, 113B can be avoided, or in other words semi-obround shells 113A, 113B having integrated top rails 641 can be assembled in a single manufacturing procedure, thereby reducing manufacturing time, complexity, and cost.

The half-round shell manufactured as described herein may form and be used to construct a half-round cargo container, including a half-round cargo container for a tanker truck, or a trailer, or a railcar, which in turn may be used to construct a tanker truck, a trailer, or a railcar respectively, by assembly with any desired additional components, as discussed hereinabove and as known in the art.

The following are non-limiting embodiments according to the present disclosure.

Embodiment 1. A half-round cargo container comprising a plurality of longitudinally extended rigid curved panels having a longitudinal axis, each curved panel having a cross-sectional profile in a plane perpendicular to the longitudinal axis, wherein the respective cross-sectional profiles of the curved panels have curved shapes with a common curvature, wherein adjacent pairs of the curved panels are joined at respective abutting longitudinal edges to form a semi-cylindrical shell, wherein the half-round cargo container has a top opening.

Embodiment 2. The half-round cargo container of Embodiment 1, wherein the curved panels are extruded curved panels, and respective extrusion axes of the extruded curved panels are parallel to the longitudinal axis.

Embodiment 3. The half-round cargo container of Embodiments 1 or 2, wherein the respective curved shapes of the curved panels have a common arc length.

Embodiment 4. The half-round cargo container of Embodiment 1 or 2, wherein the curved shape of at least a first one of the curved panels has a first arc length different from a second arc length of the curved shape of at least a second one of the curved panels.

Embodiment 5. The half-round cargo container of any one of Embodiments 1 to 4, wherein each one of the curved panels has a common longitudinal length.

Embodiment 6. The half-round cargo container of any one of Embodiments 1 to 4, wherein at least a first one of the curved panels has a first longitudinal length different from a second longitudinal length of at least a second one of the panels.

Embodiment 7. The half-round cargo container of any one of Embodiments 1 to 6, wherein at least one of the curved panels comprises a projection configured for coupling to a support.

Embodiment 8. The half-round cargo container of Embodiment 7, wherein the projection comprises a rail integral with and extending along a length of the at least one curved panel and configured for mounting to the support.

Embodiment 9. The half-round cargo container of any one of Embodiments 1 to 6, wherein each of two of the curved panels comprises a projection configured for coupling to a support, the projection comprising a rail integral with and extending along at least a part of a length of the curved panel and configured for mounting to the support, wherein the two curved panels are relatively positioned to form the semi-cylindrical shell such that the corresponding rails are symmetrically positioned relative to a transverse center of the container.

Embodiment 10. The half-round cargo container of any one of Embodiments 7 to 9, wherein the support comprises landing gear, a fifth wheel, or a hitch.

Embodiment 11. The half-round cargo container of any one of Embodiments 1 to 10, wherein the adjacent pairs of the curved panels are joined at the respective abutting edges in a tongue-and-groove joint, wherein a tongue provided at the abutting edge of one of the curved panels is mated in a groove provided at the abutting edge of the other one of the curved panels.

Embodiment 12. The half-round cargo container of any one of Embodiments 1 to 11, wherein adjacent curved panels are joined at the respective abutting edges using fasteners or welds.

Embodiment 13. The half-round cargo container of any one of Embodiments 1 to 12, wherein the curved panels are formed of aluminum.

Embodiment 14. The half-round cargo container of any one of Embodiments 1 to 13, wherein each curved panel comprises an inner skin and an outer skin sandwiching a plurality of webs bridging a space between the inner skin and the outer skin.

Embodiment 15. The half-round cargo container of Embodiment 14, wherein the outer skin has a thickness of at least 1 mm, the inner skin has a thickness of at least 2 mm, the webs each have a thickness of at least 1 mm, the outer skin and the inner skin are spaced by a gap of at least 30 mm, and the webs are spaced by a gap of at least 15 mm.

Embodiment 16. The half-round cargo container of Embodiment 14, wherein the outer skin has a thickness of about 2.5 mm, the inner skin has a thickness of about 3.5 mm, the webs each have a thickness of about 2.5 mm, the outer skin and the inner skin are spaced by a gap of about 38 mm, and the webs are spaced by a gap of about 25 mm.

Embodiment 17. The half-round cargo container of Embodiment 14, wherein the outer skin has a thickness of from 2 mm to 3 mm, the inner skin has a thickness of from 3 mm to 4 mm, the webs each have a thickness of from 2 mm to 3 mm, the outer skin and the inner skin are spaced by a gap of from 35 mm to 40 mm, and the webs are spaced by a gap of from 20 mm to 30 mm.

Embodiment 18. The half-round cargo container of any one of Embodiments 14 to 17, wherein for at least one of the panels, the outer skin, the inner skin, and the webs form a channel.

Embodiment 19. The half-round cargo container of any one of Embodiments 14 to 18 when dependent on any one of Embodiments 7 to 10, wherein for the at least one of the curved panels comprising the projection is an extruded projection integral with the at least one curved panel.

Embodiment 20. The half-round cargo container of Embodiment 19, wherein, for the at least one of the curved panels comprising the extruded projection, at least one of the outer skin, the inner skin, or at least one of the webs, has a thickness, at or about a portion of the curved panel adjoining the extruded projection, greater than a thickness of the outer skin, the inner skin, or at least one other one of the webs, other than at or about the portion.

Embodiment 21. The half-round cargo container of Embodiment 19, wherein, for the at least one of the curved panels comprising the extruded projection, respective thicknesses of the outer skin, the inner skin, and the webs, are greater than respective thicknesses of the outer skin, the inner skin, and the webs of the panels different from the at least one of the panels comprising the extruded projection.

Embodiment 22. The half-round cargo container of any one of Embodiments 1 to 21 having a front wall and an end wall enclosing the container.

Embodiment 23. The half-round cargo container of any one of Embodiments 1 to 21 having a front wall and a rear opening for passage of cargo, and a tailgate hingedly mounted at or adjacent a perimeter of the rear opening closeable to retain the cargo in the container and openable to permit passage of the cargo through the rear opening.

Embodiment 24. The half-round cargo container of any one of Embodiments 1 to 23 substantially free from reinforcing bands or ribs.

Embodiment 25. The half-round cargo container of any one of Embodiments 1 to 24, wherein an inside surface of the cylindrical cargo container is free from projections.

Embodiment 26. The half-round cargo container of any one of Embodiments 1 to 25, further comprising top rails mounted atop upper longitudinal edges at each transverse side of the semi-cylindrical shell.

Embodiment 27. The half-round cargo container of any one of Embodiments 1 to 25, further comprising: flat extension panels respectively mounted vertically atop and in longitudinal alignment with transversely opposite upper longitudinal edges of the semi-cylindrical shell.

Embodiment 28. The half-round cargo container of Embodiment 27, further comprising: top rails respectively mounted atop upper longitudinal edges of the pair of flat extension panels.

Embodiment 29. The half-round cargo container of Embodiment 27, wherein each of the flat extension panels has an integral top rail extending longitudinally at an upper longitudinal edge of the flat extension panel.

Embodiment 30. The half-round cargo container of Embodiment 29, wherein the flat extension panels are extruded flat extension panels, extrusion axes of the extruded flat extension panels are parallel to the longitudinal axis, and extrusion profiles of the extruded flat extension panels include the top rails.

Embodiment 31. The half-round cargo container of any one of Embodiments 27 to 30 having a transverse cross-section in a shape of a 'U'.

Embodiment 32. The half-round cargo container of any one of Embodiments 27 to 30 having a semi-obround shape.

Embodiment 33. The half-round cargo container of any one of Embodiments 27 to 32, wherein each of the flat extension panels comprises an inner skin and an outer skin sandwiching a plurality of webs bridging a space between the inner skin and the outer skin.

Embodiment 34. The half-round cargo container of any one of Embodiments 1 to 33, wherein the adjacent pairs of the curved panels are joined by single final welds and are free or substantially free of tack welds.

Embodiment 35. The half-round cargo container of any one of Embodiments 1 to 34, wherein for at least one of the curved panels a longitudinal length of the curved panel is greater than an arc length of the curved shape of the curved panel.

Embodiment 36. The half-round cargo container of any one of Embodiments 1 to 34, wherein for at least one of the curved panels a longitudinal length of the panel is at least 2× an arc length of the curved shape of the curved panel.

Embodiment 37. The half-round cargo container of any one of Embodiments 1 to 34, wherein for at least one of the curved panels a longitudinal length of the panel is at least 5× an arc length of the curved shape of the curved panel.

Embodiment 38. The half-round cargo container of any one of Embodiments 1 to 34, wherein for at least one of the curved panels a longitudinal length of the curved panel is at least 10× an arc length of the curved shape of the curved panel.

Embodiment 39. The half-round cargo container of any one of Embodiments 1 to 34, wherein for at least one of the curved panels a longitudinal length of the curved panel is at least 20× an arc length of the curved shape of the curved panel.

Embodiment 40. The half-round cargo container of any one of Embodiments 1 to 34, wherein for at least one of the curved panels a longitudinal length of the curved panel is at least 30× an arc length of the curved shape of the curved panel.

Embodiment 41. The half-round cargo container of any one of Embodiments 1 to 34, wherein for each of the curved panels a longitudinal length of the curved panel is greater than an arc length of the curved shape of the curved panel.

Embodiment 42. The half-round cargo container of any one of Embodiments 1 to 34, wherein for each of the curved panels a longitudinal length of the curved panel is at least 2× an arc length of the curved shape of the curved panel.

Embodiment 43. The half-round cargo container of any one of Embodiments 1 to 34, wherein for each of the curved panels a longitudinal length of the curved panel is at least 5× an arc length of the curved shape of the curved panel.

Embodiment 44. The half-round cargo container of any one of Embodiments 1 to 34, wherein for each of the curved panels a longitudinal length of the curved panel is at least 10× an arc length of the curved shape of the curved panel.

Embodiment 45. The half-round cargo container of any one of Embodiments 1 to 34, wherein for each of the curved panels a longitudinal length of the curved panel is at least 20× an arc length of the curved shape of the curved panel.

Embodiment 46. The half-round cargo container of any one of Embodiments 1 to 34, wherein for each of the curved panels a longitudinal length of the curved panel is at least 30× an arc length of the curved shape of the curved panel.

Embodiment 47. The half-round cargo container of any one of Embodiments 1 to 46, wherein the top opening is unobstructed.

Embodiment 48. The half-round cargo container of any one of Embodiments 1 to 47 free from any cross-member traversing the top opening.

Embodiment 49. A trailer or truck comprising the half-round cargo container of any one of Embodiments 1 to 48 mounted to a chassis supported by a wheeled suspension.

Embodiment 50. A railcar comprising the half-round cargo container of any one of Embodiments 1 to 48 mounted to a chassis supported by a wheeled suspension.

Embodiment 51. A frameless dump trailer comprising: the half-round cargo container of any one of Embodiments 1 to 48 mounted to a chassis supported by a wheeled suspension; a lifting mechanism mounted at or proximal a front end of the half-round cargo container; a draft arm assembly pivotably coupled with the lifting mechanism at or proximal the front end of the half-round cargo container and at or proximal a forward end of the draft arm assembly, the draft arm assembly comprising transversely opposing arms pivotably coupled at a rearward end of the draft arm assembly with the half-round cargo container at transversely opposite sides of the half-round cargo container at a position along the longitudinal axis of the half-round cargo container rearward of the front end of the half-round cargo container and forward of the wheeled suspension.

Embodiment 52. The frameless dump trailer of Embodiment 51 when dependent on Embodiment 9, wherein the transversely opposing arms of the draft arm assembly are respectively pivotably coupled with the rails symmetrically positioned relative to the transverse center of the container.

Embodiment 53. The frameless dump trailer of Embodiment 51 further comprising: a cradle coupled with the half-round cargo container at the position along the longitudinal axis of the half-round cargo container, the cradle comprising transversely opposite arms respectively extending upwardly partway of a vertical height of the container along a vertical axis of the container; wherein the transversely opposing arms of the draft arm assembly are respectively pivotably mounted with the cradle.

Embodiment 54. The frameless dump trailer of Embodiment 53, wherein the cradle arms extend upwardly on each transverse side of the container no more than 75% of the vertical height of the container.

Embodiment 55. The frameless dump trailer of Embodiment 53, wherein the cradle arms extend upwardly on each transverse side of the container no more than 70% of the vertical height of the container.

Embodiment 56. The frameless dump trailer of Embodiment 53, wherein the cradle arms extend upwardly on each transverse side of the container no more than ⅔ of the vertical height of the container.

Embodiment 57. The frameless dump trailer of Embodiment 53, wherein the cradle arms extend upwardly on each transverse side of the container no more than 60% of the vertical height of the container.

Embodiment 58. The frameless dump trailer of Embodiment 53, wherein the cradle arms extend upwardly on each transverse side of the container no more than 50% of the vertical height of the container.

Embodiment 59. The frameless dump trailer of Embodiment 53, wherein the cradle arms extend upwardly on each transverse side of the container no more than 40% of the vertical height of the container.

Embodiment 60. The frameless dump trailer of Embodiment 53, wherein the cradle arms extend upwardly on each transverse side of the container no more than ⅓ of the vertical height of the container.

Embodiment 61. The frameless dump trailer of Embodiment 53, wherein the cradle arms extend upwardly on each transverse side of the container no more than 30% of the vertical height of the container.

Embodiment 62. The frameless dump trailer of Embodiment 53, wherein the cradle arms extend upwardly on each transverse side of the container no more than 20% of the vertical height of the container.

Embodiment 63. The frameless dump trailer of Embodiment 53, wherein the cradle arms extend upwardly on each transverse side of the container no more than 10% of the vertical height of the container.

Embodiment 64. The frameless dump trailer of any one of Embodiments 51 to 63, further comprising a hitch assembly, wherein the lifting mechanism is pivotably coupled with the hitch assembly, and the draft arm assembly is pivotably coupled with the hitch assembly at or proximal the forward end of the draft arm assembly.

Embodiment 65. A method of manufacturing a half-round cargo container with a top opening, the half-round cargo container comprising a first half-round shell, the method comprising: providing a plurality of longitudinally extended rigid panels comprising a plurality of curved panels, each curved panel having a cross-sectional profile perpendicular to a longitudinal axis of the panel, the cross-sectional profile having a curved shape; forming the first half-round shell from a first set of the panels; forming a second half-round shell from a second set of the panels; forming a full-round shell from the first half-round shell and the second half-round shell; forming at least one collar conformably encompassing the full-round shell; constricting the at least one collar to compress joints formed at abutting longitudinal edges of adjacent pairs of the panels; and welding the respective joints of the adjacent pairs of the panels forming the first half-round shell.

Embodiment 66. The method of Embodiment 65, wherein rolling the full-round shell and the at least one collar comprises rolling the full-round shell and at least one collar together using a rolling apparatus.

Embodiment 67. The method of Embodiment 66, wherein the rolling apparatus comprises a tank roller.

Embodiment 68. The method of any one of Embodiments 65 to 67, wherein each of the at least one collar comprises a pair of ring segments formable into the collar sized and shaped conformably to encompass the full-round shell.

Embodiment 69. The method of Embodiment 68, wherein constricting the at least one collar to compress the longitudinal joints formed at abutting edges of pairs of adjacent panels comprises clamping the full-round shell by constricting the collars using constricting means provided at opposing adjacent ends of each pair of ring segments, thereby compressing at least some of the pairs of longitudinal panels at their respective joints.

Embodiment 70. The method of Embodiment 68 or 69, wherein forming the first half-round shell from the first set of the panels comprises: providing a cradle comprising a first set of the ring segments longitudinally spaced and aligned concentrically to form a semi-cylindrical frame; and assembling the first set of the panels sequentially in the cradle so as to abut respective longitudinal edges of each pair of adjacent panels to form the first half-round shell.

Embodiment 71. The method of Embodiment 70, wherein forming the full-round shell from the first half-round shell and the second half-round shell comprises, after forming the first half-round shell in the cradle, assembling the second set of panels above the first half-round shell to form the second half-round shell in longitudinal alignment with and in vertical opposition to the first half-round shell so as to form the full-round shell, comprising assembling the second set of panels sequentially so as to abut respective longitudinal edges of pairs of adjacent ones of the second set of panels.

Embodiment 72. The method of Embodiment 71 further comprising, after forming the first half-round shell from the first set of the panels, and before forming the full-round shell from the first half-round shell and the second half-round shell, placing at least one spacer in the first half-round shell, the at least one spacer spacing at least some of the panels to maintain a full-round shape of the full-round shell.

Embodiment 73. The method of Embodiment 72, wherein placing at least one spacer in the first half-round shell comprises placing the at least one spacer upright in the first half-round shell so as to contact respective inside surfaces of at least some of the panels of the first half-round shell whereby the first half-round shell supports the at least one spacer.

Embodiment 74. The method of Embodiment 73, wherein forming the second half-round shell from the second set of the panels, and forming the full-round shell from the first half-round shell and the second half-round shell comprises laying the second set of the panels atop the at least one spacer so as to abut the respective longitudinal edges of each pair of the adjacent panels to form the second half-round shell, wherein the at least one spacer contacts respective inside surfaces of at least some of the panels of the second half-round shell, supports the second half-round shell, and maintains the full-round shape of the full-round shell.

Embodiment 75. The method of Embodiment 73 or 74, wherein the at least one spacer comprises at least one spacing disk.

Embodiment 76. The method of Embodiment 75, wherein the at least one spacing disk comprises components configured for rigid assembly to form the spacing disk and configured for disassembly, wherein removing the at least one spacer comprises disassembling the at least one spacing disk and removing the components from the interior of the full-round shell.

Embodiment 77. The method of Embodiment 73 or 74, wherein the at least one spacer comprises at least one spacing ring comprising a rim formed with an outer U-shaped channel sized and shaped fittingly to receive an inflatable tube.

Embodiment 78. The method of Embodiment 77, wherein removing the at least one spacer comprises deflating the inflatable tube to reduce pressure between the inflatable tube and an inner surface of the full-round shell, and removal of the spacing ring from the interior of the full-round shell.

Embodiment 79. The method of any one of Embodiments 68 to 78, wherein forming the at least one collar conformably encompassing the full-round shell comprises laying a second set of the ring segments atop the full-round shell and above the first set of ring segments in pairwise fashion so as to oppose respective adjacent ends of each pair of ring segments thereby forming the collars conformably encompassing the full-round shell.

Embodiment 80. The method of any one of Embodiments 65 to 79, wherein forming the full-round shell from the first half-round shell and the second half-round shell comprises coupling the first half-round shell and the second half-round shell at opposing longitudinal edges using at least one alignment device.

Embodiment 81. The method of Embodiment 80, wherein the at least one alignment device maintains alignment or resists misalignment of pairs of opposing longitudinal edges of the first half-round shell and the second half-round shell.

Embodiment 82. The method of Embodiment 81, wherein the at least one alignment device comprises longitudinally extended alignment bars respectively coupling the pairs of opposing longitudinal edges of the first half-round shell and the second half-round shell.

Embodiment 83. The method of Embodiment 82, wherein the opposing longitudinal edges of the first half-round shell and the second half-round shell respectively comprise longitudinally extended grooves sized and shaped to fittingly receive a corresponding one of the alignment bars for coupling the first half-round shell and second half-round shell at the opposing longitudinal edges.

Embodiment 84. The method of Embodiment 82 or 83, wherein the first half-round shell and the second half-round shell respectively comprise top rails, the opposing longitudinal edges are at opposing ones of the top rails, and the longitudinally extended grooves are formed in the top rails.

Embodiment 85. The method of any one of Embodiments 65 to 79, wherein welding respective joints of the adjacent pairs of the panels forming the first half-round shell comprises rolling the full-round shell and the at least one collar about a longitudinal axis of the full-round shell to sequentially bring each joint to a lower position and welding an inner seam of the joint while at the lower position.

Embodiment 86. The method of Embodiment 85 when dependent on Embodiment 72, further comprising, after constricting the at least one collar to compress the longitudinal joints formed at the abutting edges of pairs of adjacent panels, removing the at least one spacer, whereby an interior of the full-round shell is unobstructed, and then welding the respective inner seams of the joints when at the lower position.

Embodiment 87. The method of Embodiment 85 or 86, further comprising, after welding the inner seams of the respective joints of the adjacent pairs of the panels forming the first half-round shell: removing the at least one collar; and subsequently, welding the outer seams of the respective joints of the adjacent pairs of the panels forming the first half-round shell.

Embodiment 88. The method of Embodiment 65 or 86, further comprising welding the respective joints of the adjacent pairs of the panels forming the second half-round shell.

Embodiment 89. The method of Embodiment 88, wherein: welding respective joints of the adjacent pairs of the panels forming the second half-round shell comprises rolling the full-round shell and at least one collar about the longitudinal axis of the full-round shell to sequentially bring each joint to the lower position and welding an inner seam of the joint while at the lower position.

Embodiment 90. The method of Embodiment 88 or 89, wherein forming the full-round shell from the first half-round shell and the second half-round shell comprises coupling the first half-round shell and the second half-round shell at opposing longitudinal edges using at least one alignment device.

Embodiment 91. The method of Embodiment 90, wherein the at least one alignment device maintains alignment or resists misalignment of pairs of opposing longitudinal edges of the first half-round shell and the second half-round shell.

Embodiment 92. The method of Embodiment 90 or 91, further comprising, after welding the inner seams of the respective joints of the adjacent pairs of the panels forming the first half-round shell, and after welding the inner seams of the respective joints of the adjacent pairs of the panels forming the second half-round shell: removing the at least one collar; and subsequently, welding the outer seams of the respective joints of the adjacent pairs of the panels forming the first half-round shell and the outer seams of the respective joints of the adjacent pairs of the panels forming the second half-round shell.

Embodiment 93. The method of Embodiment 92, wherein welding the outer seams of the respective joints of the adjacent pairs of the panels forming the first half-round shell and welding the outer seams of the respective joints of the adjacent pairs of the panels forming the second half-round shell comprises rolling the full-round shell about the longitudinal axis of the full-round shell to sequentially bring each joint to an upper position and welding the outer seam of the joint while at the upper position.

Embodiment 94. The method of Embodiment 93, wherein the at least one alignment device comprises at least one clamping jig.

Embodiment 95. The method of Embodiment 94, wherein the at least one clamping jig comprises an alignment form sandwiched between the opposing longitudinal edges of the first half-round shell and the second half-round shell, wherein the alignment form comprises opposing alignment recesses sized and shaped respectively to fittingly receive the corresponding opposing longitudinal edges of the first half-round shell and the second half-round shell for maintaining longitudinal alignment or resisting misalignment of the opposing longitudinal edges of the first half-round shell and the second half-round shell.

Embodiment 96. The method of Embodiment 94 or 95, further comprising the at least one clamping jig clamping together the opposing longitudinal edges of the first half-round shell and the second half-round shell.

Embodiment 97. The method of Embodiment 96, wherein the first half-round shell and the second half-round shell comprise clamping lips at the opposing longitudinal edges, and the at least one clamping jig comprises opposing engagement lips sized, shaped, and configured for mating engagement with the clamping lips, the at least one clamping jig further comprising a contraction device operable selectively to draw together the engagement lips thereby to draw together the clamping lips to clamp together the opposing longitudinal edges of the first half-round shell and the second half-round shell.

Embodiment 98. The method of any one of Embodiments 94 to 97, wherein the first half-round shell and the second half-round shell comprise respective top rails, the opposing longitudinal edges are at opposing ones of the top rails, and the at least one clamping jig is configured to engage the opposing ones of the top rails.

Embodiment 99. The method of Embodiment 98, wherein rolling the full-round shell about the longitudinal axis of the full-round shell to sequentially bring each joint to the upper position comprises using the at least one alignment jig to hold together or resist separation of the first half-round shell and the second half-round shell to maintain the shape of the full-round shell.

Embodiment 100. The method of any one of Embodiments 93 to 98, wherein the upper position is angularly displaced from an uppermost point by less than 90°.

Embodiment 101. The method of any one of Embodiments 93 to 98, wherein the upper position is angularly displaced from an uppermost point by less than 70°.

Embodiment 102. The method of any one of Embodiments 93 to 98, wherein the upper position is angularly displaced from an uppermost point by less than 45°.

Embodiment 103. The method of any one of Embodiments 93 to 98, wherein the upper position is angularly displaced from an uppermost point by less than 10°.

Embodiment 104. The method of any one of Embodiments 85 to 103, wherein the lower position is angularly displaced from a lowermost point by less than 90°.

Embodiment 105. The method of any one of Embodiments 85 to 103, wherein the lower position is angularly displaced from a lowermost point by less than 70°.

Embodiment 106. The method of any one of Embodiments 85 to 103, wherein the lower position is angularly displaced from a lowermost point by less than 45°.

Embodiment 107. The method of any one of Embodiments 85 to 103, wherein the lower position is angularly displaced from a lowermost point by less than 10°.

Embodiment 108. The method of any one of Embodiments 65 to 107, wherein the respective longitudinal edges of each pair of adjacent panels comprise a tongue and a groove, and the joint is formed by mating the tongue of one panel with the groove of the abutting panel.

Embodiment 109. The method of any one of Embodiments 65 to 108, wherein at least one of the curved panels comprises a projection, and the at least one collar comprises a recess sized and shaped fittingly to receive the projection.

Embodiment 110. The method of Embodiment 109, wherein the projection comprises a longitudinally extended rail.

Embodiment 111. The method of any one of Embodiments 65 to 110, wherein: the first half-round shell is a first semi-cylindrical shell, the second half-round shell is a second semi-cylindrical shell, and the full-round shell is a cylindrical shell; the first set of the panels comprises a first set of the curved panels; and the second set of the panels comprises a second set of the curved panels.

Embodiment 112. The method of any one of Embodiments 65 to 110, wherein the first half-round shell is a first semi-obround shell, the second half-round shell is a second semi-obround shell, and the full-round shell is an obround shell.

Embodiment 113. The method of Embodiment 112, wherein: the plurality of longitudinally extended rigid panels further comprises a first set of flat extension panels and a second set of flat extension panels; the first set of panels comprises a first set of the curved panels and the first set of flat extension panels; and the second set of panels comprises a second set of the curved panels and the second set of flat extension panels.

Embodiment 114. The method of Embodiment 113, wherein forming the first half-round shell from the first set of panels comprises: forming a first semi-cylindrical shell from the first set of the curved panels; and laying the first set of flat extension panels atop the first semi-cylindrical shell so as to abut respective longitudinal edges of outermost curved panels of the first set of curved panels and longitudinal edges of adjacent ones of the first set of flat extension panels, wherein the first set of curved panels and the first set of flat extension panels when assembled together form the first semi-obround shell.

Embodiment 115. The method of Embodiment 114, wherein forming the second half-round shell from the second set of panels comprises: laying the second set of flat extension panels above and in longitudinal alignment with the first set of flat extension panels so as to oppose respective longitudinal edges of adjacent ones of the first set of flat extension panels and the second set of flat extension panels, and coupling the first set of flat extension panels and the second set of flat extension panels at the respective opposing longitudinal edges of adjacent ones of the first set of flat extension panels and the second set of flat extension panels; and laying the second set of the curved panels atop the second set of flat extension panels so as to abut respective longitudinal edges of outermost curved panels of the second set of curved panels and adjacent ones of the second set of flat extension panels to form a second semi-cylindrical shell atop the second set of flat extension panels, wherein the second set of curved panels and the second set of flat extension panels when assembled together form the second semi-obround shell.

Embodiment 116. The method of any one of Embodiments 111 to 115 when dependent on Embodiment 79, further comprising, before laying the second set of the ring segments atop the full-round shell and above the first set of ring segments, placing bridge segments respectively atop upper ends of the first set of ring segments, and then laying the second set of the ring segments atop the bridge segments to as to oppose respective adjacent ends of the second set of the ring segments and adjacent ones of the bridge segments, whereby the at least one collar when assembled is sized and shaped so as to fittingly encompass the obround shell.

Embodiment 117. The method of any one of Embodiments 111 to 116 when dependent on Embodiment 80 or 90, comprising coupling opposing longitudinal edges of abutting ones of the first set of flat extension panels and the second set of flat extension panels, so as to couple the first half-round shell and the second half-round shell at opposing longitudinal edges using at least one alignment device.

Embodiment 118. The method of any one of Embodiments 65 to 117, wherein, prior to welding the respective joints of the adjacent pairs of the panels, the full-round shell is free, or substantially free, of tack welds.

Embodiment 119. The method of any one of Embodiments 65 to 118, wherein, prior to constricting the at least one collar, the full-round shell is free, or substantially free, of tack welds.

Embodiment 120. The method of any one of Embodiments 65 to 119, wherein the full-round shell remains free of any welds joining the first half-round shell and the second half-round shell.

Embodiment 121. The method of any one of Embodiments 65 to 120, wherein the half-round cargo container constitutes at least a part of a truck, a trailer, or a railcar.

Embodiment 122. A half-round cargo container manufactured by the method of any one of Embodiments 65 to 121.

Embodiment 123. A half-round cargo container formed of a plurality of longitudinally extended rigid panels into a half-round shell, wherein adjacent pairs of the panels are joined by single final welds and are free or substantially free of tack welds.

Embodiment 124. The half-round cargo container of Embodiment 123, wherein the half-round shell has a substantially semi-cylindrical shape.

Embodiment 125. The half-round cargo container of Embodiment 123, wherein the half-round shell has a substantially semi-obround shape.

So that the present disclosure may be more readily understood, certain terms are defined. Unless defined otherwise, all technical and scientific terms used herein have the same meaning as commonly understood by one of ordinary skill in the art to which embodiments of the invention pertain. While many methods and materials similar, modified, or equivalent to those described herein can be used in the practice of the embodiments of the present invention without undue experimentation, the preferred materials and methods are described herein.

All terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6, and decimals and fractions, for example, 1.2, 3.8, 1½, and 4¾. This applies regardless of the breadth of the range.

The terms "about" or "approximately" as used herein refer to variation in the numerical quantity that can occur, for example, through typical measuring techniques and equipment, with respect to any quantifiable variable, including, but not limited to, mass, volume, time, distance, voltage, and current. Further, given solid and liquid handling procedures used in the real world, there is certain inadvertent error and variation that is likely through differences in the manufacture, source, or purity of the ingredients used to make the compositions or carry out the methods and the like. The terms "about" and "approximately" also encompass these variations. Whether or not modified by either of the terms "about" or "approximately", the claims include equivalents to the quantities.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of manufacturing a half-round cargo container with a top opening, the half-round cargo container comprising a first half-round shell, the method comprising:
   providing a plurality of longitudinally extended rigid panels comprising a plurality of curved panels, each curved panel having a cross-sectional profile perpendicular to a longitudinal axis of the panel, the cross-sectional profile having a curved shape;
   forming the first half-round shell from a first set of the panels;
   forming a second half-round shell from a second set of the panels;
   forming a full-round shell from the first half-round shell and the second half-round shell;
   forming at least one collar conformably encompassing the full-round shell;
   constricting the at least one collar to compress joints formed at abutting longitudinal edges of adjacent pairs of the panels;
   welding the respective joints of the adjacent pairs of the panels forming the first half-round shell without welding the respective joints formed between opposing adjacent panels of the first half-round shell and the second half-round shell; and separating the first half-round shell from the second half-round shell, wherein forming the full-round shell from the first half-round shell and the second half-round shell comprises coupling the first half-round shell and the second half-round shell at opposing longitudinal edges using at least one alignment device operable to maintain alignment or to resist misalignment of pairs of opposing longitudinal edges of the first half-round shell and the second half-round shell, and wherein the at least one alignment device comprises at least one clamping jig, the method further comprising using the at least one clamping jig to clamp together the opposing longitudinal edges of the first half-round shell and the second half-round shell.

2. The method of claim 1, wherein:

each of the at least one collar comprises a pair of ring segments formable into the collar sized and shaped conformably to encompass the full-round shell;

forming the first half-round shell from the first set of the panels comprises:
   providing a cradle comprising a first set of the ring segments longitudinally spaced and aligned concentrically to form a semi-cylindrical frame; and
   assembling the first set of the panels sequentially in the cradle so as to abut respective longitudinal edges of each pair of adjacent panels to form the first half-round shell; and forming the at least one collar conformably encompassing the full-round shell comprises laying a second set of the ring segments atop the full-round shell and above the first set of ring segments in pairwise fashion so as to oppose respective adjacent ends of each pair of ring segments thereby forming the collars conformably encompassing the full-round shell.

3. The method of claim 2, wherein forming the full-round shell from the first half-round shell and the second half-round shell comprises, after forming the first half-round shell in the cradle, assembling the second set of panels above the first half-round shell to form the second half-round shell in longitudinal alignment with and in vertical opposition to the first half-round shell so as to form the full-round shell, comprising assembling the second set of panels sequentially so as to abut respective longitudinal edges of pairs of adjacent ones of the second set of panels.

4. The method of claim 3 further comprising, after forming the first half-round shell from the first set of the panels, and before forming the full-round shell from the first half-round shell and the second half-round shell, placing at least one spacer in the first half-round shell, the at least one spacer spacing at least some of the panels to maintain a full-round shape of the full-round shell.

5. The method of claim 1, wherein welding respective joints of the adjacent pairs of the panels forming the first half-round shell comprises rolling the full-round shell and the at least one collar about a longitudinal axis of the full-round shell to sequentially bring each joint to a lower position and welding an inner seam of the joint while at the lower position.

6. The method of claim 5, further comprising welding the respective joints of the adjacent pairs of the panels forming the second half-round shell by rolling the full-round shell and at least one collar about the longitudinal axis of the full-round shell to sequentially bring each joint to the lower position and welding an inner seam of the joint while at the lower position.

7. The method of claim 6, further comprising, after welding the inner seams of the respective joints of the adjacent pairs of the panels forming the first half-round shell, and after welding the inner seams of the respective joints of the adjacent pairs of the panels forming the second half-round shell:
   removing the at least one collar; and
   subsequently, welding the outer seams of the respective joints of the adjacent pairs of the panels forming the first half-round shell and the outer seams of the respective joints of the adjacent pairs of the panels forming the second half-round shell.

8. The method of claim 7, wherein welding the outer seams of the respective joints of the adjacent pairs of the panels forming the first half-round shell and welding the outer seams of the respective joints of the adjacent pairs of the panels forming the second half-round shell comprises rolling the full-round shell about the longitudinal axis of the full-round shell to sequentially bring each joint to an upper position and welding the outer seam of the joint while at the upper position.

9. The method of claim 8, wherein the first half-round shell and the second half-round shell comprise clamping lips at the opposing longitudinal edges, and the at least one clamping jig comprises opposing engagement lips sized, shaped, and configured for mating engagement with the clamping lips, the at least one clamping jig further comprising a contraction device operable selectively to draw together the engagement lips thereby to draw together the clamping lips to clamp together the opposing longitudinal edges of the first half-round shell and the second half-round shell, wherein rolling the full-round shell about the longitudinal axis of the full-round shell to sequentially bring each joint to the upper position comprises using the at least one alignment jig to hold together or resist separation of the first half-round shell and the second half-round shell to maintain the shape of the full-round shell.

10. The method of claim 1, wherein the at least one clamping jig comprises an alignment form sandwiched between the opposing longitudinal edges of the first half-round shell and the second half-round shell, wherein the alignment form comprises opposing alignment recesses sized and shaped respectively to fittingly receive the corresponding opposing longitudinal edges of the first half-round shell and the second half-round shell for maintaining longitudinal alignment or resisting misalignment of the opposing longitudinal edges of the first half-round shell and the second half-round shell.

11. The method of claim 1, wherein the respective longitudinal edges of each pair of adjacent panels comprise a tongue and a groove, and the joint is formed by mating the tongue of one panel with the groove of the abutting panel.

12. The method of claim 1, wherein:
   the first half-round shell is a first semi-cylindrical shell, the second half-round shell is a second semi-cylindrical shell, and the full-round shell is a cylindrical shell;
   the first set of the panels comprises a first set of the curved panels; and
   the second set of the panels comprises a second set of the curved panels.

13. The method of claim 1, wherein the first half-round shell is a first semi-obround shell, the second half-round shell is a second semi-obround shell, and the full-round shell is an obround shell.

14. The method of claim 13, wherein:
the plurality of longitudinally extended rigid panels further comprises a first set of flat extension panels and a second set of flat extension panels;
the first set of panels comprises a first set of the curved panels and the first set of flat extension panels; and
the second set of panels comprises a second set of the curved panels and the second set of flat extension panels;
forming the first half-round shell from the first set of panels comprises:
forming a first semi-cylindrical shell from the first set of the curved panels; and
laying the first set of flat extension panels atop the first semi-cylindrical shell so as to abut respective longitudinal edges of outermost curved panels of the first set of curved panels and longitudinal edges of adjacent ones of the first set of flat extension panels, wherein the first set of curved panels and the first set of flat extension panels when assembled together form the first semi-obround shell;
forming the second half-round shell from the second set of panels comprises:
laying the second set of flat extension panels above and in longitudinal alignment with the first set of flat extension panels so as to oppose respective longitudinal edges of adjacent ones of the first set of flat extension panels and the second set of flat extension panels, and coupling the first set of flat extension panels and the second set of flat extension panels at the respective opposing longitudinal edges of adjacent ones of the first set of flat extension panels and the second set of flat extension panels; and
laying the second set of the curved panels atop the second set of flat extension panels so as to abut respective longitudinal edges of outermost curved panels of the second set of curved panels and adjacent ones of the second set of flat extension panels to form a second semi-cylindrical shell atop the second set of flat extension panels, wherein the second set of curved panels and the second set of flat extension panels when assembled together form the second semi-obround shell.

15. The method of claim 14 wherein:
each of the at least one collar comprises a pair of ring segments formable into the collar sized and shaped conformably to encompass the full-round shell;
forming the at least one collar conformably encompassing the full-round shell comprises laying a second set of the ring segments atop the full-round shell and above the first set of ring segments in pairwise fashion so as to oppose respective adjacent ends of each pair of ring segments thereby forming the collars conformably encompassing the full-round shell; and
the method further comprises, before laying the second set of the ring segments atop the full-round shell and above the first set of ring segments, placing bridge segments respectively atop upper ends of the first set of ring segments, and then laying the second set of the ring segments atop the bridge segments so as to oppose respective adjacent ends of the second set of the ring segments and adjacent ones of the bridge segments, whereby the at least one collar when assembled is sized and shaped so as to fittingly encompass the obround shell.

16. The method of claim 1, wherein, after constricting the at least one collar and prior to welding the respective joints of the adjacent pairs of the panels, the full-round shell is free, or substantially free, of tack welds.

17. A method of manufacturing a half-round cargo container with a top opening, the half-round cargo container comprising a first half-round shell, the method comprising:
providing a plurality of longitudinally extended rigid panels comprising a plurality of curved panels, each curved panel having a cross-sectional profile perpendicular to a longitudinal axis of the panel, the cross-sectional profile having a curved shape;
forming the first half-round shell from a first set of the panels;
forming a second half-round shell from a second set of the panels;
forming a full-round shell from the first half-round shell and the second half-round shell;
forming at least one collar conformably encompassing the full-round shell;
constricting the at least one collar to compress joints formed at abutting longitudinal edges of adjacent pairs of the panels;
welding the respective joints of the adjacent pairs of the panels forming the first half-round shell without welding the respective joints formed between opposing adjacent panels of the first half-round shell and the second half-round shell; and
separating the first half-round shell from the second half-round shell;
wherein:
the first half-round shell is a first semi-obround shell, the second half-round shell is a second semi-obround shell, and the full-round shell is an obround shell;
the plurality of longitudinally extended rigid panels further comprises a first set of flat extension panels and a second set of flat extension panels;
the first set of panels comprises a first set of the curved panels and the first set of flat extension panels; and
the second set of panels comprises a second set of the curved panels and the second set of flat extension panels;
forming the first half-round shell from the first set of panels comprises:
forming a first semi-cylindrical shell from the first set of the curved panels; and
laying the first set of flat extension panels atop the first semi-cylindrical shell so as to abut respective longitudinal edges of outermost curved panels of the first set of curved panels and longitudinal edges of adjacent ones of the first set of flat extension panels, wherein the first set of curved panels and the first set of flat extension panels when assembled together form the first semi-obround shell;
forming the second half-round shell from the second set of panels comprises:
laying the second set of flat extension panels above and in longitudinal alignment with the first set of flat extension panels so as to oppose respective longitudinal edges of adjacent ones of the first set of flat extension panels and the second set of flat extension panels, and coupling the first set of flat extension panels and the second set of flat extension panels at the respective opposing longitudinal edges of adjacent ones of the first set of flat extension panels and the second set of flat extension panels; and laying the second set of the curved panels atop the second set of flat extension panels so as to abut respective longitudinal edges of outermost curved panels of the second set of curved panels and adjacent ones of the second set of flat extension panels to form a second semi-cylindrical shell atop the second set of flat extension panels, wherein the second set of curved panels and the second set of flat extension panels when assembled together form the second semi-obround shell; and the method further comprising coupling opposing longitudinal edges of abutting ones of the first set of flat extension panels and the second set of flat extension panels, so as to couple the first half-round shell and the second half-round shell at opposing longitudinal edges using at least one alignment device.

* * * * *